US007652623B2

(12) United States Patent
Oomuro

(10) Patent No.: US 7,652,623 B2
(45) Date of Patent: Jan. 26, 2010

(54) NULL-FILL ANTENNA, OMNI ANTENNA, AND RADIO COMMUNICATION EQUIPMENT

(75) Inventor: Norihiko Oomuro, Tokyo (JP)

(73) Assignee: NEC Corporation (JP)

( * ) Notice: Subject to any disclaimer, the term of this patent is extended or adjusted under 35 U.S.C. 154(b) by 414 days.

(21) Appl. No.: 11/178,948

(22) Filed: Jul. 12, 2005

(65) Prior Publication Data

US 2006/0007041 A1 Jan. 12, 2006

(30) Foreign Application Priority Data

Jul. 12, 2004 (JP) ............................ 2004-205149
Dec. 17, 2004 (JP) ............................ 2004-365860
Mar. 3, 2005 (JP) ............................ 2005-059655

(51) Int. Cl.
*H01Q 3/00* (2006.01)
*G01S 3/10* (2006.01)

(52) U.S. Cl. ........................ 342/360; 342/379; 342/384

(58) Field of Classification Search ......... 342/379–384, 342/360
See application file for complete search history.

(56) References Cited

U.S. PATENT DOCUMENTS

| | | | | |
|---|---|---|---|---|
| 2,898,593 | A * | 8/1959 | Ruze | 343/853 |
| 3,594,811 | A * | 7/1971 | Pierrot | 342/350 |
| 3,877,033 | A * | 4/1975 | Unz | 343/844 |
| 4,090,203 | A * | 5/1978 | Duncan | 343/753 |
| 4,590,480 | A * | 5/1986 | Nikolayuk et al. | 343/771 |
| H173 | H * | 12/1986 | Claborn et al. | 342/372 |
| 4,819,000 | A * | 4/1989 | Meyer | 342/408 |
| 5,486,838 | A * | 1/1996 | Dienes | 343/781 R |
| 5,638,081 | A | 6/1997 | MacDonald et al. | |
| 5,818,385 | A * | 10/1998 | Bartholomew | 342/372 |
| 5,973,641 | A * | 10/1999 | Smith et al. | 342/372 |
| 6,137,448 | A * | 10/2000 | Schadler | 343/770 |
| 6,311,075 | B1 * | 10/2001 | Bevan et al. | 455/562.1 |
| 2005/0003864 | A1 * | 1/2005 | Elliot et al. | 455/562.1 |
| 2005/0088358 | A1 | 4/2005 | Larry et al. | |

FOREIGN PATENT DOCUMENTS

| | | |
|---|---|---|
| EP | 1 059 690 A2 | 12/2000 |
| JP | 4-369104 A | 12/1992 |

(Continued)

OTHER PUBLICATIONS

European Search Report issued Oct. 19, 2005.

*Primary Examiner*—Thomas H Tarcza
*Assistant Examiner*—Harry Liu
(74) *Attorney, Agent, or Firm*—Dickstein, Shapiro, LLP.

(57) ABSTRACT

A wide-angle null-fill antenna with no null in the depression angle range, an omni antenna using the same, and radio communication equipment. A null-fill antenna comprises a first antenna array including antenna elements arranged with a prescribed point as the center, and a second antenna array having amplitude characteristics substantially equal to those of the antenna elements forming the first antenna array. The first antenna array is excited so that the excitation amplitude distribution is to have symmetry with respect to the prescribed point, while the excitation phase distribution is to have point symmetry with respect to the prescribed point. The phase center of the first antenna array is substantially coincident with that of the second antenna array.

24 Claims, 46 Drawing Sheets

FOREIGN PATENT DOCUMENTS

| | | | |
|---|---|---|---|
| JP | 6-291535 | A | 10/1994 |
| JP | 7-183724 | A | 7/1995 |
| JP | 8-146119 | A | 6/1996 |
| JP | H09-246859 | | 9/1997 |
| JP | 9-304499 | A | 11/1997 |
| JP | 2001-211025 | A | 8/2001 |
| JP | 2001-320232 | A | 11/2001 |
| JP | 2005-506749 | A | 3/2005 |
| WO | WO-03/034547 | | 4/2003 |
| WO | WO 2004/051796 | A1 | 6/2004 |

* cited by examiner

PHASE CHARACTERISTICS OF RADIATION PATTERN IN VERTICAL PLANE OF NULL-FILL ANTENNA

VERTICAL DIRECTIVITY CHARACTERISTICS OF NULL-FILL ANTENNA

VERTICAL DIRECTIVITY CHARACTERISTICS OF NULL-FILL ANTENNA

HORIZONTAL DIRECTIVITY CHARACTERISTICS OF NULL-FILL ANTENNA

PHASE OF RADIATION PATTERN

-24° +30° -24°

HORIZONTAL DIRECTIVITY CHARACTERISTICS OF NULL-FILL ANTENNA

PHASE OF RADIATION PATTERN

-24° +30° -24°

VERTICAL DIRECTIVITY CHARACTERISTICS OF NULL-FILL ANTENNA

VERTICAL DIRECTIVITY CHARACTERISTICS OF NULL-FILL ANTENNA

VERTICAL DIRECTIVITY CHARACTERISTICS OF NULL-FILL ANTENNA (a)

(b)

PHASE CHARACTERISTIC OF RADIATION PATTERN (a)

(b)

NULL-FILL ANTENNA, OMNI ANTENNA, AND RADIO COMMUNICATION EQUIPMENT

FIELD OF THE INVENTION

The present invention relates to a wide-angle null-fill antenna having wide directivity in the depression angle direction, an omni antenna using the same, and radio communication equipment, more particularly, to a wide-angle null-fill antenna with no insensitive area or blind zone in the vicinity of the antenna, an omni antenna, and radio communication equipment.

BACKGROUND OF THE INVENTION

In general, a base station or BTS (Base Transceiver Station) antenna for mobile communication is placed in a high position such as the top of a building, and electric waves emitted from the antenna is received by mobile communication terminals on the ground.

Such a BTS antenna is provided with directivity so that mobile communication terminals on the ground receive electric waves at the same reception or input level regardless of their locations.

The BTS antenna forms a beam, e.g., cosecant squared beam (without a null in a depression angle range of up to 45 degrees from the horizontal plane) in the elevation plane, to cause substantially uniform input electric field on the ground in a predetermined depression angle range.

FIG. 1 is a diagram showing the construction of a conventional cosecant squared beam antenna. In the cosecant squared beam antenna, antenna elements are arrayed vertically, and hereinafter a description will be made on the assumption that antenna elements are arrayed vertically. In this construction, a beam emitted from each antenna element is formed with flares to achieve such directivity that electromagnetic waves are radiated within a predetermined angle in the horizontal plane.

Besides, a plurality of the antenna elements are arranged in a vertical linear array to form a beam in the vertical direction. The amplitudes of the antenna elements 2 or the upper half of the array and the antenna elements 3 or the lower half of the array are symmetrical about the center (e.g., the amplitude of the top antenna element is the same as that of the bottom one). The phases of all the antenna elements 2 are identical. Similarly, the phases of all the antenna elements 3 are identical. The phase of the antenna elements 2 is shifted with respect to that of the antenna elements 3 by a prescribed amount.

With this construction, the antenna radiation pattern assumes a cosecant squared pattern in the vertical plane, resulting in substantially uniform input level in a range of depression angle from the horizontal plane.

However, if a beam is formed in this manner, as shown in FIG. 2, in an area at a depression angle over 45 degrees from the horizontal plane with respect to the BTS antenna, i.e., around the foot of the antenna, the input level is necessarily reduced.

FIG. 3 is a diagram showing the phase characteristics of the conventional cosecant squared beam antenna. The phase characteristics indicates the relation between angles and phases in the vertical plane at points equally distant from the origin as an observation point at the center of the array.

Referring to FIG. 3, in an area lower than the horizontal plane or in an area at a depression angle of 0 (zero) degrees or more, the phase is at 0 degrees. On the other hand, in an area at a depression angle less than 0 degrees or in an area at an elevation angle, the phase is at 180 degrees at almost all angles. This means that, with the horizontal plane as a boundary face or an interface, electromagnetic waves radiated to below the horizontal plane and those radiated to above the horizontal plane are in phase opposition.

FIG. 4 is a diagram showing the radiation or directivity characteristics of the conventional cosecant squared beam antenna in the vertical plane. In FIG. 4, in an area at a depression angle of 45 degrees or more, the radiation characteristics deteriorate. That is, an area in the vicinity of the antenna, at a depression angle of not less than 45 degrees, involves a null.

In Japanese Patent Application laid open No. HEI9-246859, there has been disclosed "Antenna" as a conventional technique for improving the radiation characteristics in the vicinity of the antenna. In the conventional technique, an array antenna consists of a first antenna element with wide directivity in the zenith direction and second antenna elements with narrow directivity in a direction at a prescribed angle from the zenith direction, which are arranged around the first antenna element. Thus, the input level of mobile terminals is maintained constant.

However, the conventional technique is aimed at reducing nulls caused in the direction of the front of the antenna for a campus base station. Therefore, if the technique is applied to a base station for mobile communication, the gain of the antenna is significantly reduced in the direction at a depression angle of 90 degrees.

As just described, there has not been proposed a wide-angle null-fill antenna preventing a null or the presence of an insensitive area in the direction at a depression angle of 90 degrees.

SUMMARY OF THE INVENTION

It is therefore an object of the present invention to provide a wide-angle null-fill antenna permitting little decrease in reception or input level in the vicinity of the foot of the antenna, an omni antenna using the same, and radio communication equipment.

In accordance with the first aspect of the present invention, to achieve the object mentioned above, there is provided a null-fill antenna comprising a first antenna array including antenna elements arranged with a prescribed point as the center, and a second antenna array with an excitation amplitude substantially equal to or less than that of the antenna elements forming the first antenna array. The first antenna array is excited so that the excitation amplitude distribution is to have symmetry with respect to the prescribed point, while the excitation phase distribution is to have substantially point symmetry with respect to the prescribed point. The phase center of the first antenna array is substantially coincident with that of the second antenna array.

Preferably, in the null-fill antenna of the first aspect, the excitation amplitude of the second antenna array is substantially equal to or less than that of the antenna elements adjacent to the phase center among those forming the first antenna array.

Preferably, in the null-fill antenna of the first aspect, the prescribed point is the phase center of the first antenna array. Besides, the second antenna array includes at least two antenna elements, and the antenna element closer to the phase center is provided with larger excitation amplitude.

Preferably, in the null-fill antenna of the first aspect, the antenna elements forming the second antenna array are arranged in a line with the phase center as the center to intersect the first antenna array as the axis of symmetry at right angles.

Preferably, in the null-fill antenna of the first aspect, the antenna elements forming the second antenna array are arranged not to overlap the phase center of the first antenna array.

Preferably, in the null-fill antenna of the first aspect, dipole antennas are used as the antenna elements forming the second antenna array. More preferably, each of the antenna elements forming the second antenna array is provided with an electromagnetic wave absorber around it. The electromagnetic wave absorber may be arranged along the direction of arrangement of the antenna elements forming the first antenna array with each of the antenna elements forming the second antenna array as the center. In addition, the electromagnetic wave absorber may have a length, in the direction of arrangement of the antenna elements forming the first antenna array, longer than the spacings between the phase center and antenna elements adjacent thereto among those forming the first antenna array.

Preferably, in the null-fill antenna of the first aspect, the antenna elements forming the second antenna array are arranged so that the maximum radiation direction of the second antenna array is tilted along the direction of arrangement of the antenna elements forming the first antenna array.

Among the antenna elements forming the first antenna array, antenna elements closest to the phase center may be spaced apart by a distance more than the spacing between other antenna elements. The antenna elements forming the first antenna array may be arranged with unequal spacing.

The null-fill antenna of the first aspect may further comprise, in place of the second antenna array, a third antenna array with an excitation amplitude larger than that of the antenna elements forming the first antenna array, the phase center of which is substantially coincident with that of the first antenna array.

The null-fill antenna of the first aspect may further comprise, in place of the second antenna array, a slot antenna or a dipole antenna with an excitation amplitude substantially equal to or less than that of the antenna elements forming the first antenna array, the phase center of which is substantially coincident with that of the first antenna array.

The null-fill antenna of the first aspect may further comprise, in place of the second antenna array, a parasitic element which is spaced a prescribed distance apart from the phase center of the first antenna array in the vertical direction with respect to the first antenna array.

Preferably, in the null-fill antenna of the first aspect, the excitation amplitude of the second antenna array, the slot antenna, the dipole antenna or the parasitic element is less than that of the antenna elements adjacent to the phase center of the first antenna array among those forming the first antenna array.

Preferably, in the null-fill antenna of the first aspect, when one of the antenna elements forming the first antenna array is placed at the phase center of the first antenna array, the phase difference between electromagnetic waves radiated from the antenna element and the second antenna array, the slot antenna, the dipole antenna or the parasitic element is within ±60 degrees.

The second antenna array, the slot antenna, the dipole antenna or the parasitic element may have directivity along the direction of arrangement of the antenna elements forming the first antenna array.

The null-fill antenna of the first aspect may further comprise, in place of the slot antenna or the dipole antenna, a second slot antenna or a second dipole antenna with an excitation amplitude larger than that of the antenna elements forming the first antenna array, the phase center of which is substantially coincident with that of the first antenna array.

In accordance with the second aspect of the present invention, to achieve the object mentioned above, there is provided a null-fill antenna comprising a first antenna array including antenna elements arranged to intersect a line passing through a prescribed point at right angles, and a center antenna element with an excitation amplitude substantially equal to or less than that of the antenna elements forming the first antenna array. The first antenna array is excited so that the excitation amplitude distribution is to have line symmetry with respect to the line passing through the prescribed point, while the excitation phase distribution is to have point symmetry with respect to the line passing through the prescribed point. The phase center of the first antenna array is substantially coincident with that of the center antenna element.

Preferably, in the null-fill antenna of the second aspect, the excitation amplitude of the center antenna element is substantially equal to or less than that of the antenna elements adjacent to the phase center among those forming the first antenna array.

Preferably, in the null-fill antenna of the second aspect, the prescribed point is the phase center of the first antenna array.

The first antenna array may be a two-dimensional array in which antenna elements are arranged parallel to the line passing through the prescribed point to form third antenna arrays, and the third antenna arrays are arranged to intersect the line passing through the prescribed point at right angles.

The first antenna array may include slot antennas each having longitudinal sides parallel to the line passing through the prescribed point, which are arranged to intersect the line passing through the prescribed point at right angles.

Preferably, in the null-fill antenna of the second aspect, a dipole antenna element is used as the center antenna element. More preferably, the center antenna element is provided with an electromagnetic wave absorber around it. The electromagnetic wave absorber may have a length, in the direction of arrangement of the antenna elements forming the first antenna array, longer than the spacings between the phase center and antenna elements adjacent thereto among those forming the first antenna array. In addition, the electromagnetic wave absorber may be set to surround the center antenna element and extend to adjacent antenna elements among those forming the first antenna array.

Preferably, in the null-fill antenna of the second aspect, the center antenna element is set so that the maximum radiation direction is tilted along the direction of arrangement of the antenna elements forming the first antenna array.

Among the antenna elements forming the first antenna array, antenna elements closest to the phase center may be spaced apart by a distance more than the spacing between other antenna elements. The antenna elements forming the first antenna array may be arranged with unequal spacing.

Preferably, in the null-fill antenna of the second aspect, the center antenna element is set in a position on the side of the direction of electromagnetic wave radiation as compared to the first antenna array.

Preferably, in the null-fill antenna of the second aspect, when one of the antenna elements forming the third antenna arrays or slot antennas is placed at the phase center of the first antenna array, the phase difference between electromagnetic waves radiated from the center antenna element and the third antenna arrays or the slot antennas is within ±60 degrees.

Preferably, in the null-fill antenna of the second aspect, the center antenna element has directivity along the direction of arrangement of the antenna elements forming the first antenna array.

The null-fill antenna of the second aspect may further comprise, in place of the center antenna element, a second center antenna element with an excitation amplitude larger than that of the antenna elements forming the first antenna array, the phase center of which is substantially coincident with that of the first antenna array.

Preferably, in the null-fill antenna of the first or second aspect, the maximum radiation direction of the first antenna array is tilted along the direction of arrangement of the antenna elements forming the first antenna array. More preferably, the maximum radiation direction of at least antenna elements in the vicinity of the center among those forming the first antenna array are tilted along the direction of arrangement of the antenna elements, in the maximum radiation direction of the first antenna array.

Preferably, in the null-fill antenna of the first or second aspect, among the antenna elements forming the first antenna array, antenna elements on one side of the phase center are advanced more in excitation phase as the distance from the phase center increases, while antenna elements on the other side of the phase center are delayed more in excitation phase as the distance from the phase center increases.

Preferably, in the null-fill antenna of the first or second aspect, each of the antenna elements forming the first antenna array is provided with a parasitic element.

An indirectly excited element, which is excited by radiation from the first antenna array, may be used as an antenna element added to the center.

Preferably, in the null-fill antenna of the first or second aspect, a substrate, on which the first antenna array is formed, is provided with flares on both sides thereof in the direction of arrangement of the antenna elements forming the first antenna array.

Preferably, in the null-fill antenna of the first or second aspect, the null-fill antenna is a wide-angle null-fill antenna.

Preferably, in the null-fill antenna of the first or second aspect, the first antenna array has cosecant squared pattern directivity in the direction of arrangement of the antenna elements.

In accordance with the third aspect of the present invention, to achieve the object mentioned above, there is provided radio communication equipment provided with the null-fill antenna of the first or second aspect.

Preferably, in the radio communication equipment of the third aspect, the null-fill antenna is placed in a high position so that the first antenna array is in the vertical direction. Or the null-fill antenna is placed in a high position so that a substrate, on which the first antenna array is formed, is substantially horizontal, and electromagnetic waves are radiated in the nadir direction. The null-fill antenna may be placed in a low position so that a substrate, on which the first antenna array is formed, is tilted at a prescribed angle with respect to the horizontal plane.

In accordance with the fourth aspect of the present invention, to achieve the object mentioned above, there is provided an omni antenna comprising a plurality of the null-fill antennas of the first or second aspect, in which the null-fill antennas are arranged in a concentric circle so that electromagnetic waves are radiated outward.

In accordance with the fifth aspect of the present invention, to achieve the object mentioned above, there is provided radio communication equipment provided with the omni antenna of the fourth aspect.

The radio communication equipment may be base station equipment.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Studies by the inventor has shown that, in a cosecant squared beam antenna including antenna elements of the same characteristics arrayed with equal spacing therebetween, the radiation characteristics of the antenna is improved in a directly downward direction when an antenna element is added to the phase center.

Figure 1:
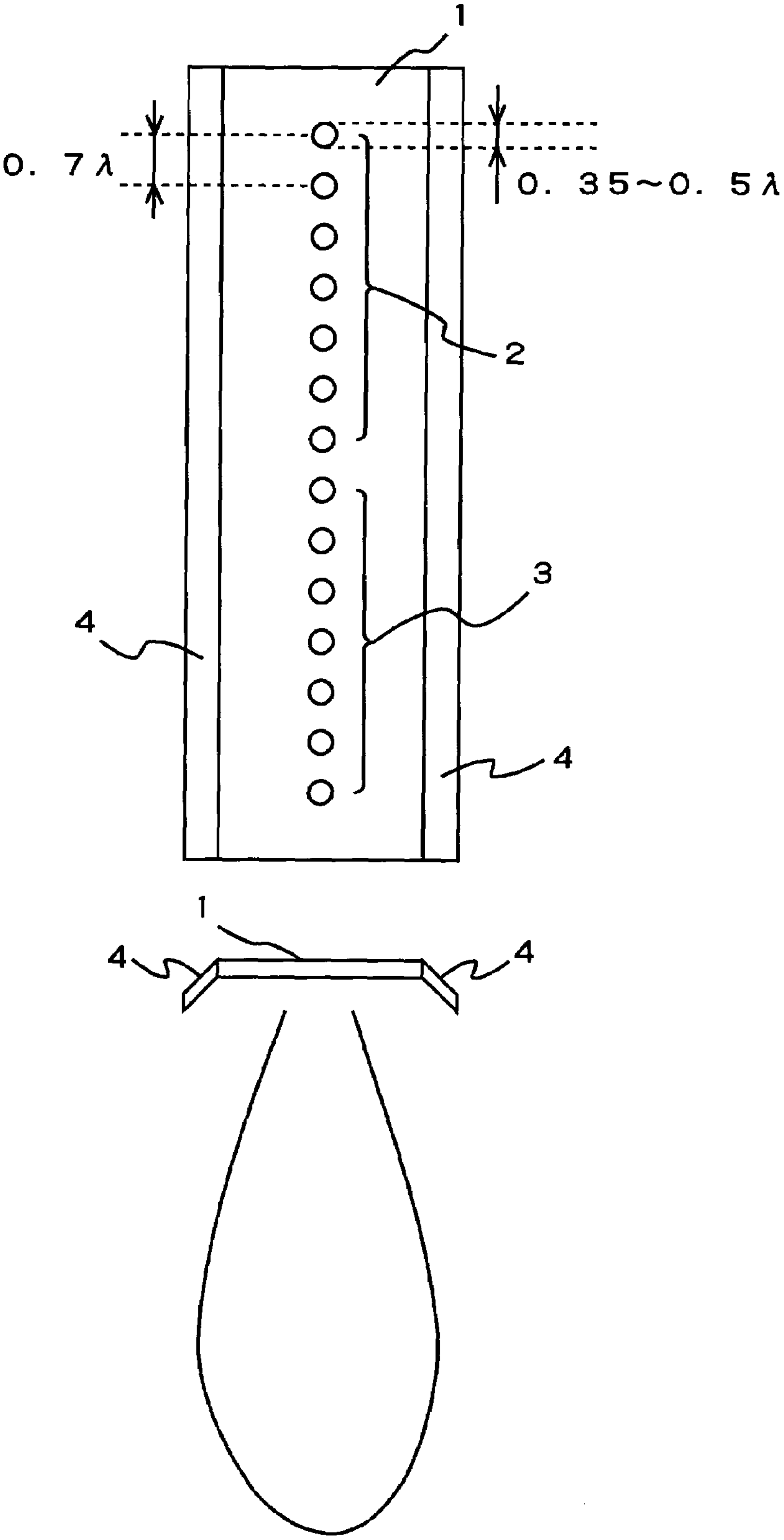
FIG. 1 PRIOR ART
FIG. 1 is a diagram showing the construction of a conventional cosecant squared beam antenna.
Figure 2:
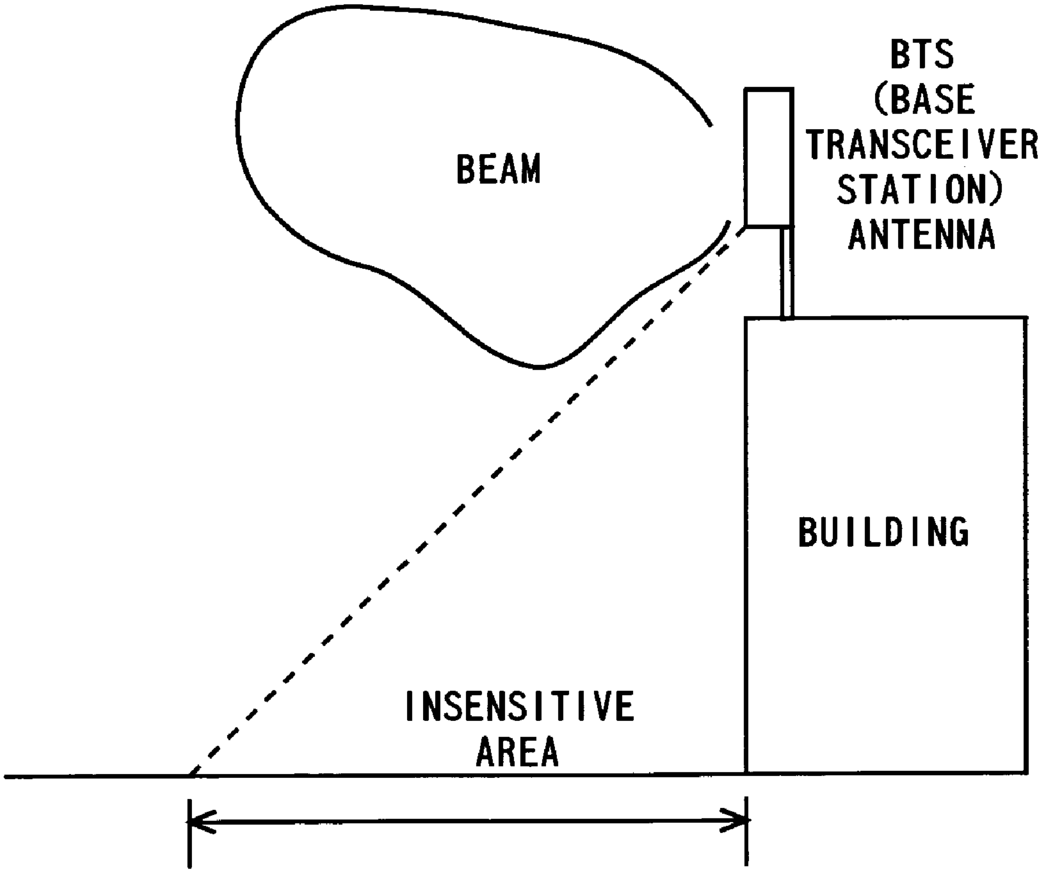
FIG. 2 PRIOR ART
FIG. 2 is a diagram showing the insensitive area of a conventional base station.
Figure 3:
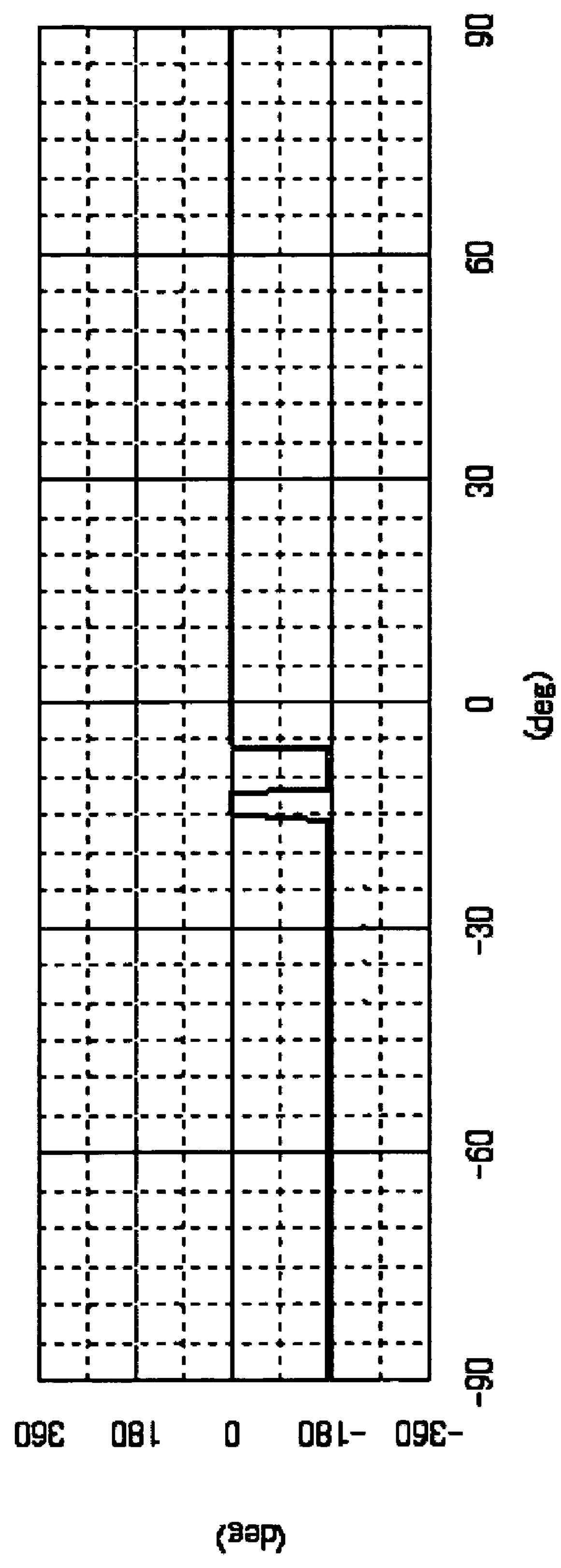
FIG. 3 PRIOR ART
FIG. 3 is a diagram showing the phase characteristics of the conventional cosecant squared beam antenna.
Figure 4:
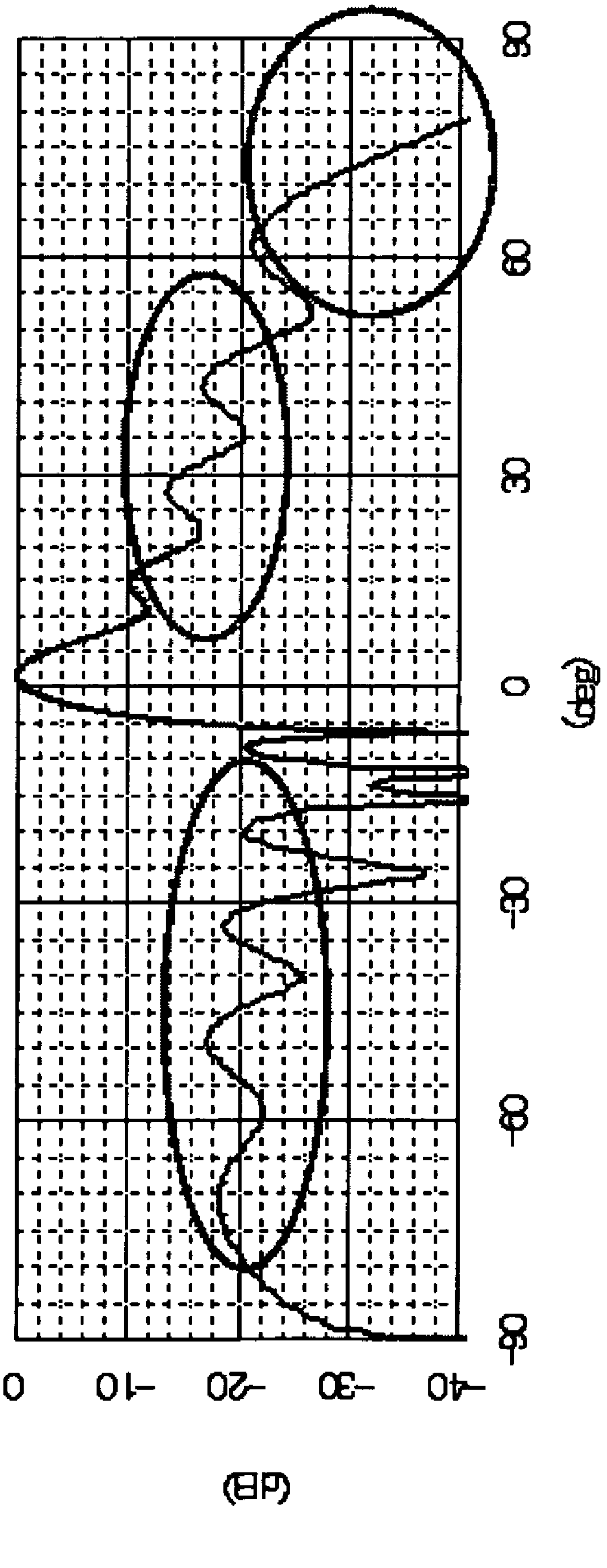
FIG. 4 PRIOR ART
FIG. 4 is a diagram showing the vertical directivity characteristics of the conventional cosecant squared beam antenna.
Figure 5:
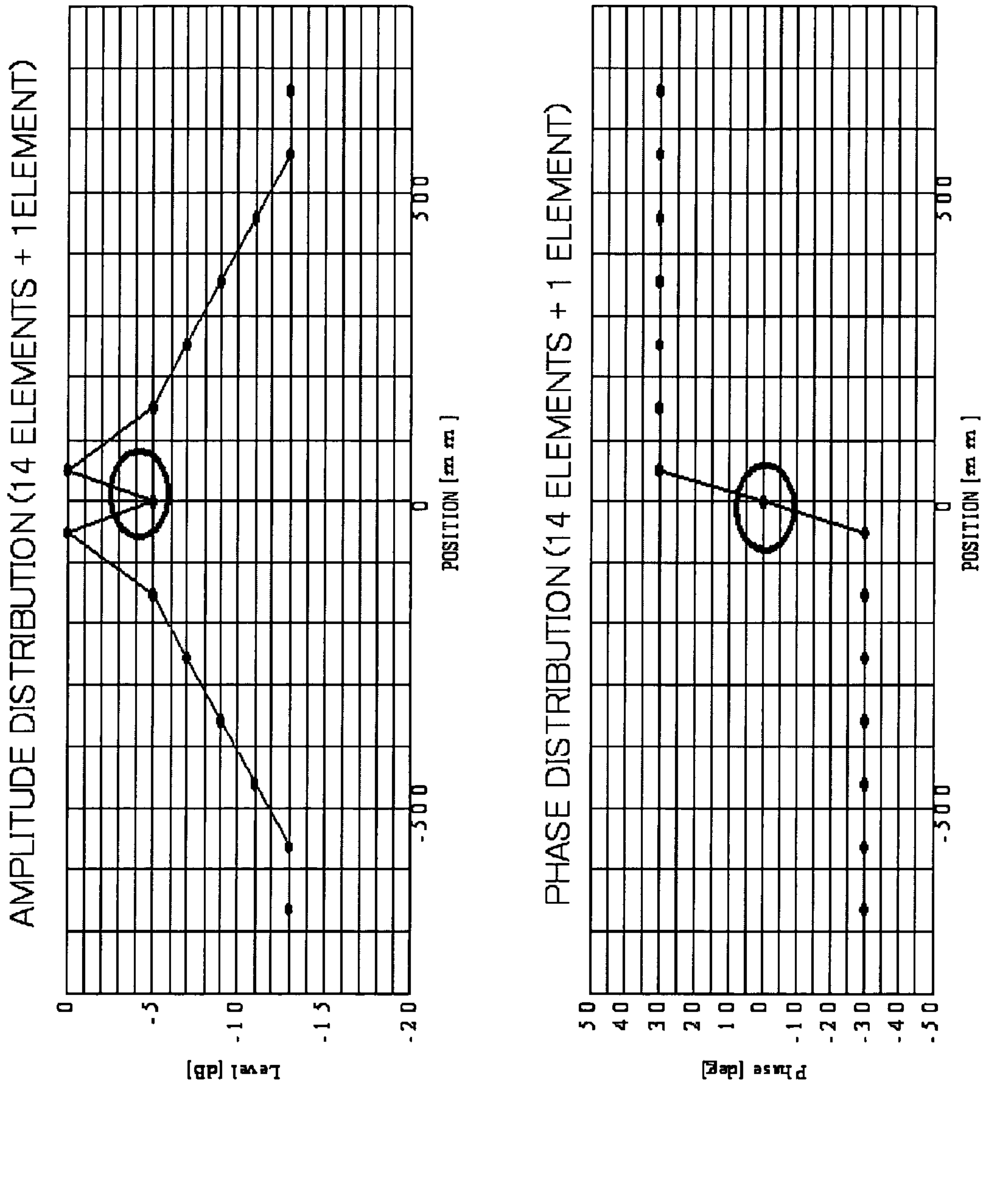
FIG. 5 is a diagram showing the amplitude distribution and phase distribution of respective antenna elements included in a wide-angle null-fill antenna of the present invention.

FIG. 5 is a diagram showing the amplitude and phase distributions of respective antenna elements when an antenna element is added to the phase center. The amplitude of the newly added antenna element is small (−5 dB in this example) as compared to that of antenna elements on both sides (those at positions spaced 0.35 wavelength apart from the phase center). The newly added antenna element is provided with a smaller amplitude than those on both sides to prevent a decrease in peak gain.

Figure 6:
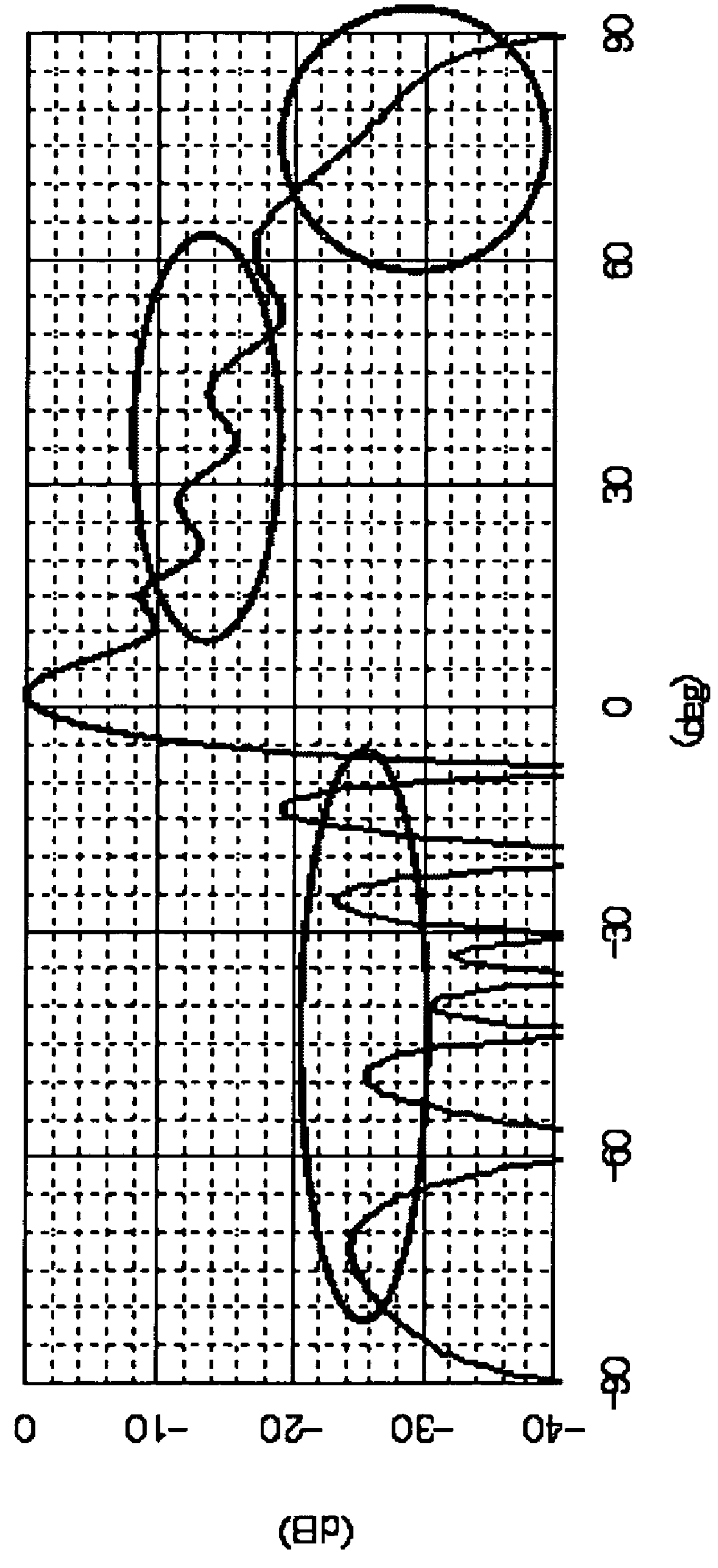
FIG. 6 is a diagram showing the vertical directivity characteristics of the wide-angle null-fill antenna of the present invention.

FIG. 6 is a diagram showing the directivity characteristics of the antenna in the vertical plane. When an antenna element is added to the phase center of a cosecant squared beam antenna and excited following the above conditions, the amplitude decreases in the elevation angle range, while it increases in the depression angle range. The antenna characteristics are improved in the vicinity of a depression angle of 90 degrees. Besides, in the depression angle range, variation (i.e., ripple) in the input electric field or voltage decreases, which allows receivers to receive electromagnetic waves stably.

In a cosecant squared beam antenna, however, antenna elements are arrayed with, e.g., 0.7 wavelength spacing, and they have a size or length of 0.35 to 0.5 wavelength. That is, if an antenna element is newly added to the phase center, the antenna element physically interferes or contacts with those adjacent to it. In other words, it is physically impossible to add an extra antenna element to the phase center of a cosecant squared beam antenna.

Therefore, in accordance with the present invention, one or more antenna elements are arranged in the vicinity of the phase center which have characteristics equivalent to those of antenna elements forming a cosecant squared beam antenna as well as making no physical interference with them. Thus, a null does not occur in the depression angle direction of the cosecant squared beam antenna.

Based on the principles described above, a description of preferred embodiments of the present invention will be given referring to the drawings.

First Embodiment

Figure 7:
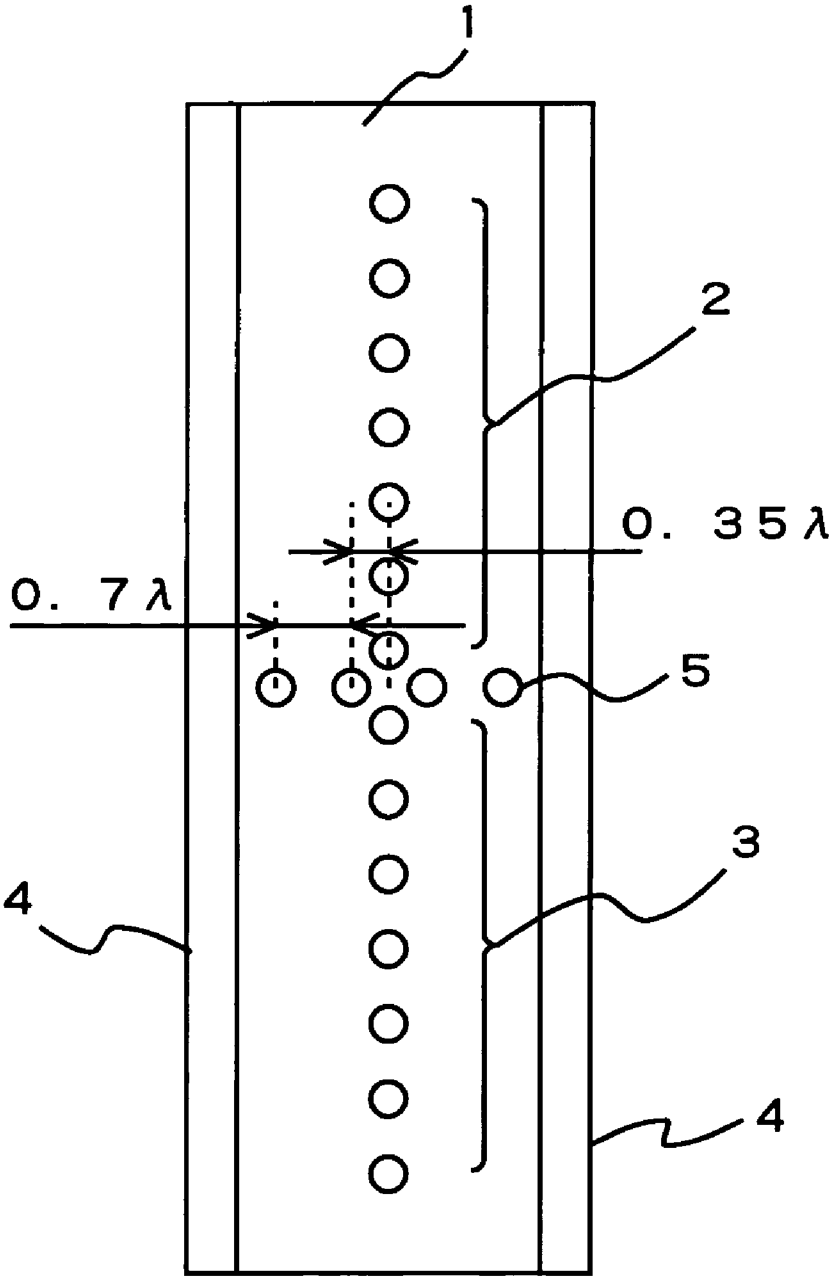
FIG. 7 is a diagram showing the construction of a wide-angle null-fill antenna according to the first embodiment of the present invention.

FIG. 7 is a diagram showing the construction of a wide-angle null-fill antenna according to the first embodiment of the present invention. As can be seen in FIG. 7, the wide-angle null-fill antenna comprises a substrate 1 and antenna elements 2 and 3 arrayed at regular intervals on the surface of the substrate 1. The antenna elements 2 are arranged with an equal spacing of 0.7λ (λ: the wavelength of electromagnetic waves radiated therefrom) from a position 0.35λ apart from the phase center in the zenith direction. On the other hand, the antenna elements 3 are arranged with an equal spacing of 0.7λ from a position 0.35λ apart from the phase center in the nadir direction. The substrate 1 is provided with flares 4 on both sides thereof in the longitudinal direction (the direction of arrangement of the antenna elements 2 and 3). Incidentally, all the antenna elements 2 and 3 have the same characteristics.

The wide-angle null-fill antenna further comprises an antenna array 5 on the substrate 1, in the same horizontal plane as the phase center. The antenna array 5 includes four antenna elements arranged at regular intervals with the phase center in the center of them. More specifically, on both sides of the phase center, two of the four antenna elements are placed at 0.35λ spacing from the phase center, and the other two are placed at 1.05λ spacing from the phase center in the horizontal plane of the substrate 1.

The antenna array 5 has radiation characteristics equivalent to those of the antenna elements 2 and 3.

Among the additional four antenna elements of the antenna array 5, inner two antenna elements (closer to the phase center) are delayed 30 degrees in phase and have an amplitude of −10 dB as compared to one of the antenna elements 2 closest to the phase center. Besides, outer two antenna elements (more distant from the phase center) are advanced 120 degrees in phase and have an amplitude of −6 dB as compared to the inner two.

The antenna elements 3 (on the lower side) are delayed 60 degrees in phase as compared to the antenna elements 2 (on the upper side). More specifically, assuming that the inner two antenna elements of the antenna array 5 have a phase of 0 degrees, the antenna elements 2 are advanced 30 degrees in phase, while the antenna elements 3 are delayed 30 degrees in phase as compared to the inner two elements.

Figure 8:
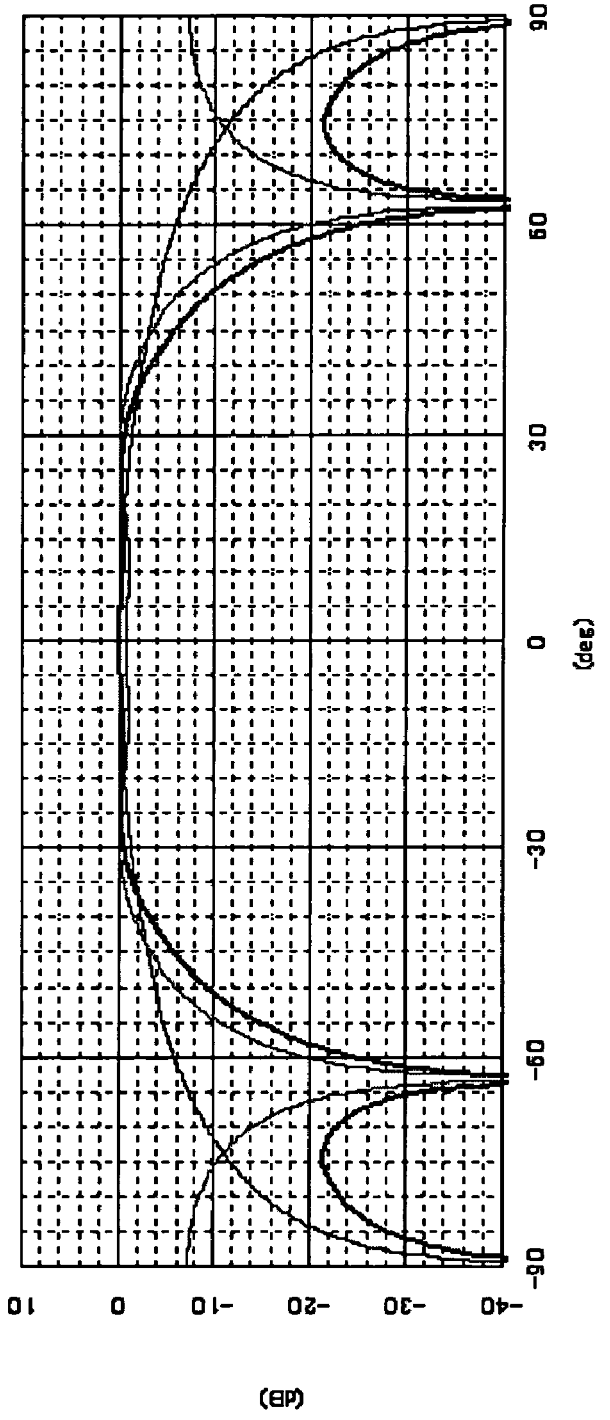
FIG. 8 is a diagram showing the directivity characteristics of an antenna array added to the vicinity of the phase center of the wide-angle null-fill antenna depicted in FIG. 7.

FIG. 8 is a diagram showing the radiation characteristics of the wide-angle null-fill antenna. In FIG. 8, "ELEMENT" indicates the radiation characteristics of the antenna element, "ARRAY" indicates the radiation characteristics (array factor) determined by the arrangement of antenna elements, and "TOTAL" indicates the integration of them, i.e., the radiation characteristics of the antenna as a whole. Incidentally, the three types of radiation characteristics are defined by the relation ELEMENT×ARRAY=TOTAL. That is, if the array factor is flat (=1), the radiation characteristics of the antenna as a whole corresponds to those of the antenna element.

In this case, in a required angle range (e.g., an angle range of ±30 degrees when the antenna is used as an omni antenna consisting of six sectors), if the array factor shows substantially flat characteristics, the antenna array 5 can be considered to have the same radiation characteristics as those of the antenna elements 2 and 3. In other words, the antenna array 5 is equivalent to an antenna element that is added to the phase center. Accordingly, it is possible to achieve such effects as to increase the amplitude of electromagnetic waves radiated in the depression angle direction and to reduce that of electromagnetic waves radiated in the elevation angle direction.

However, even if the antenna array 5 radiates electromagnetic waves of the same amplitude as in the case of an antenna element added to the phase center, actually, the phase of electromagnetic waves radiated from the antenna array 5 differs from that in the case where an antenna element is added to the phase center.

Figure 9:
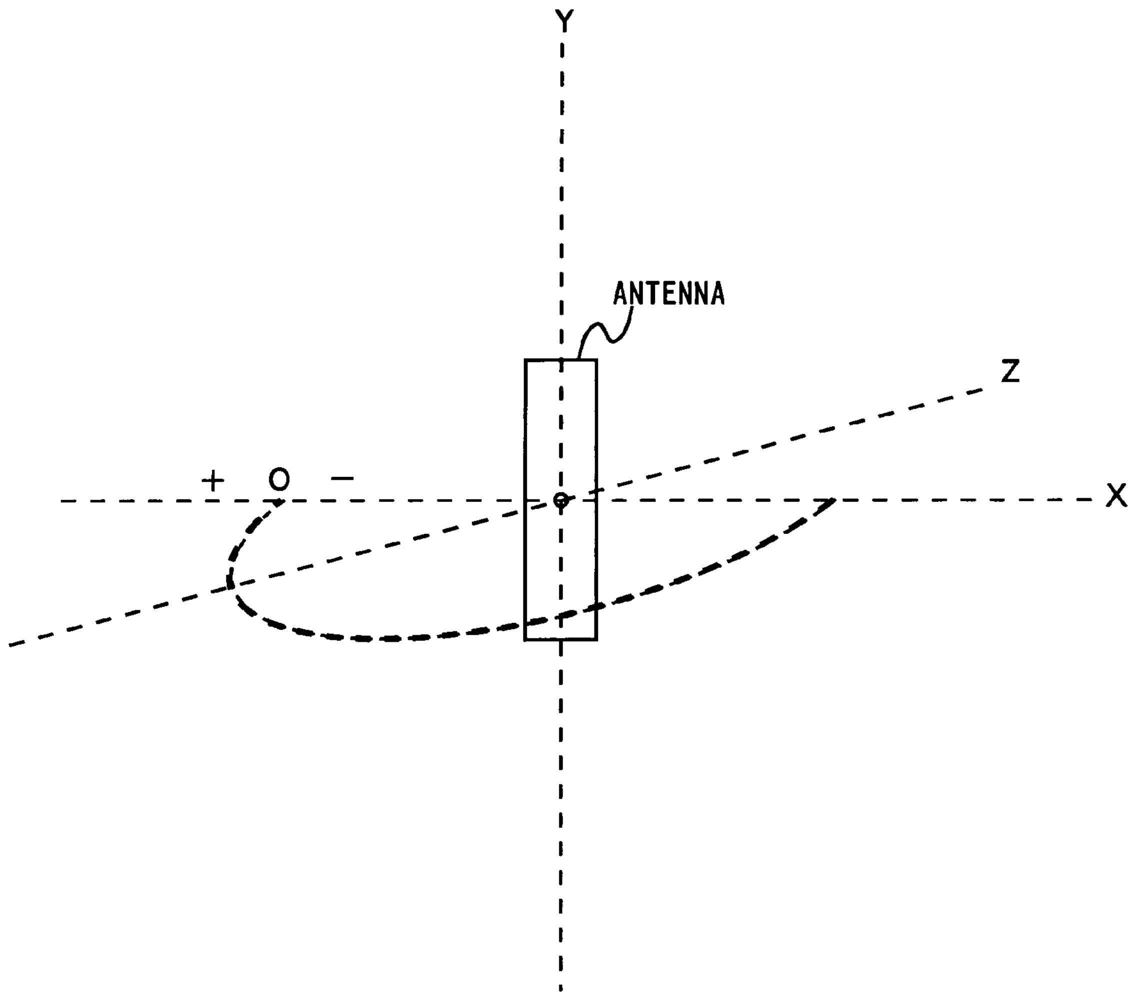
FIG. 9 is a diagram showing phase differences between electromagnetic waves observed at points equally distant from the phase center when an antenna element is added to the phase center.
Figure 10:
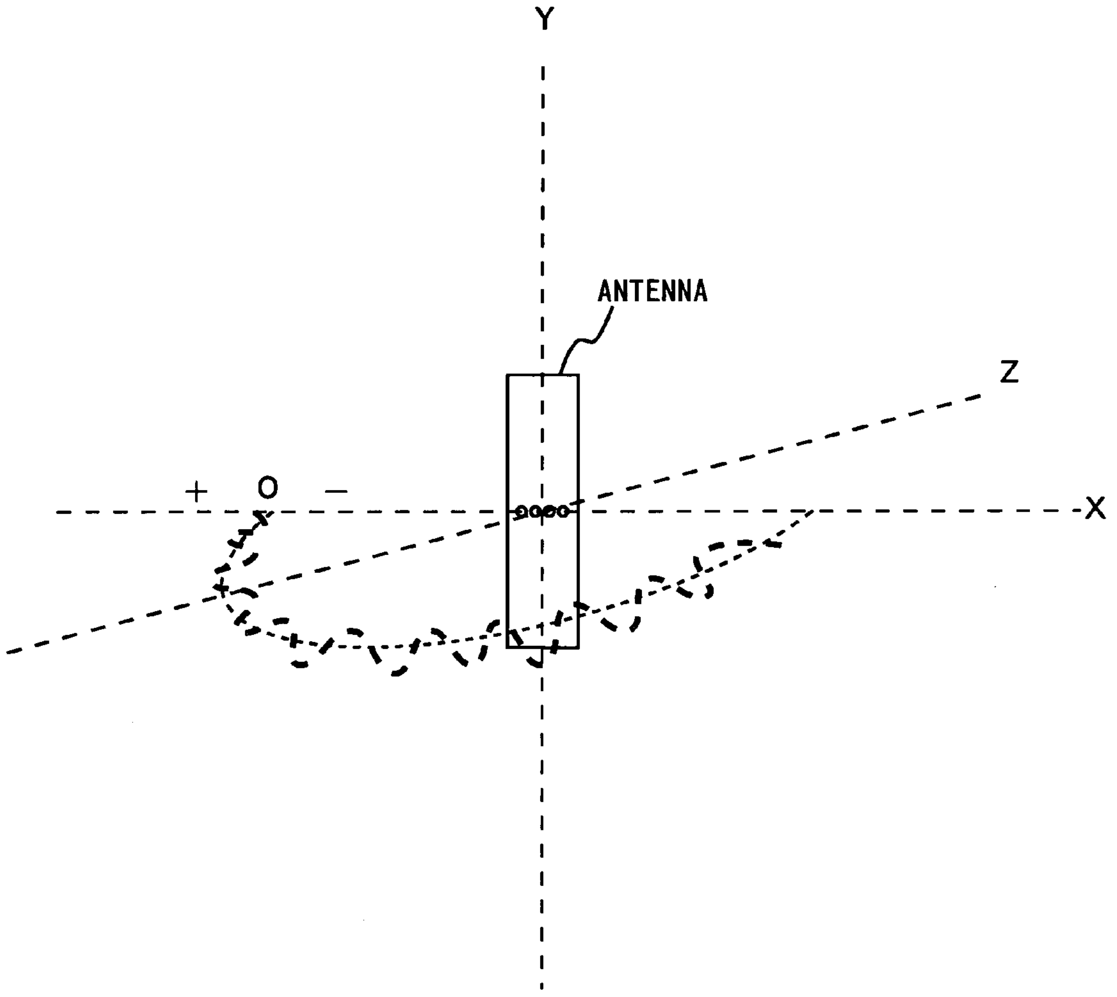
FIG. 10 is a diagram showing phase differences between electromagnetic waves observed at points equally distant from the phase center when an antenna array is added to the vicinity of the phase center.

FIGS. 9 and 10 are diagrams schematically showing the relation between a point at which electromagnetic waves radiated from the antenna are observed and the phase of electromagnetic waves observed at the point, when an antenna element is placed in the phase center and when an antenna array is arranged in the vicinity of the phase center, respectively. In FIG. 10, the heavy dotted line indicates phase shifts when electromagnetic waves radiated from the antenna are observed at points on the thin dotted line equally distant from the phase center in the horizontal plane. At the points where the heavy dotted line comes close to the phase center as compared to the thin dotted line, electromagnetic waves with a phase shifted to the minus side are observed. At the points where the heavy dotted line comes away from the phase center as compared to the thin dotted line, electromagnetic waves with a phase shifted to the plus side are observed. As can be seen in FIG. 9, when an antenna element is placed at the phase center, the phases of observed electromagnetic waves radiated from the antenna element are identical at all points equally distant from the phase center. On the other hand, as can be seen in FIG. 10, when an antenna array is placed, even at points equally distant from the phase center, the phases of observed electromagnetic waves radiated from the antenna array vary depending on the points.

Figure 11:
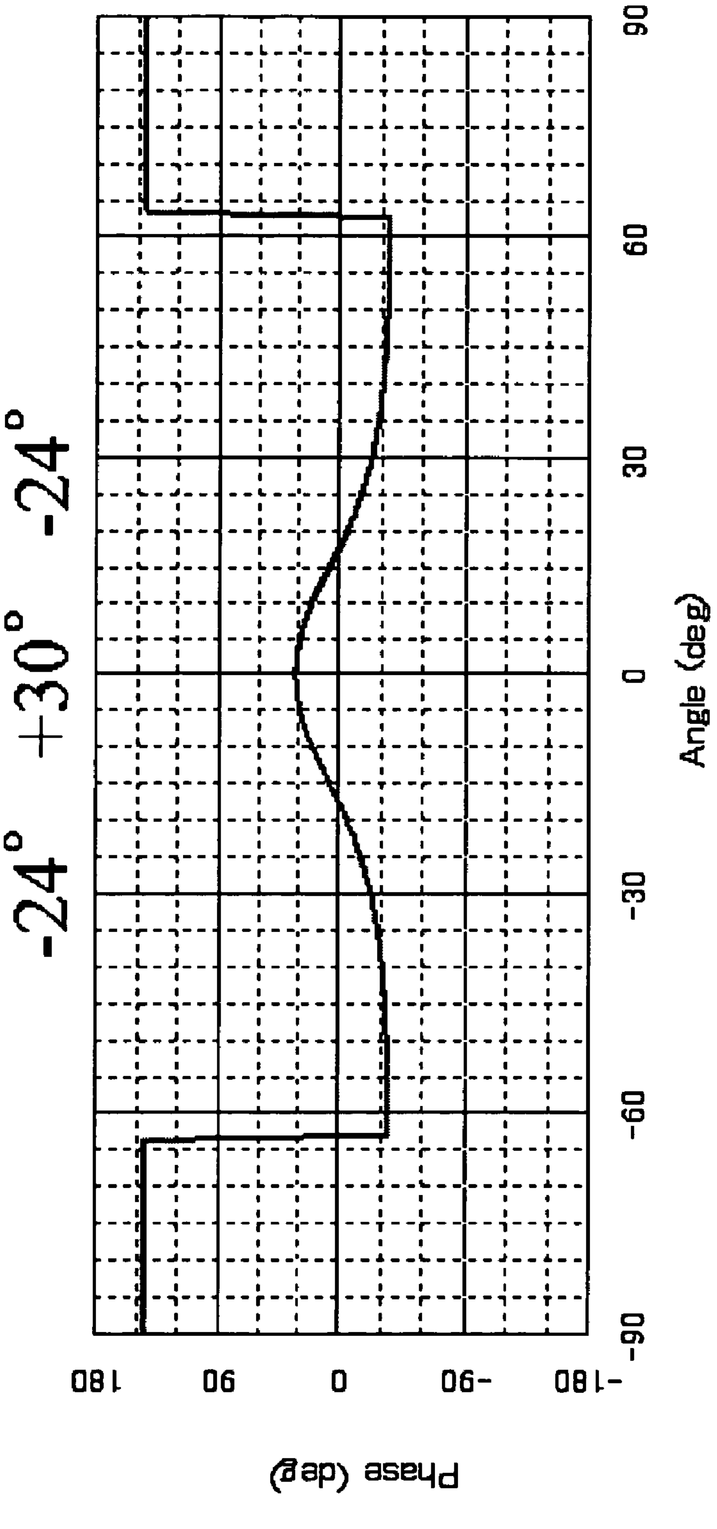
FIG. 11 is a diagram showing the radiation pattern phase characteristics of an antenna array added to the vicinity of the phase center of the wide-angle null-fill antenna depicted in FIG. 7 in the horizontal plane.

FIG. 11 is a diagram showing the directivity characteristics of the antenna array 5. As shown in FIG. 11, in an angle range of ±30 degrees in the horizontal direction, the phase varies approximately ±30 degrees.

Figure 12:
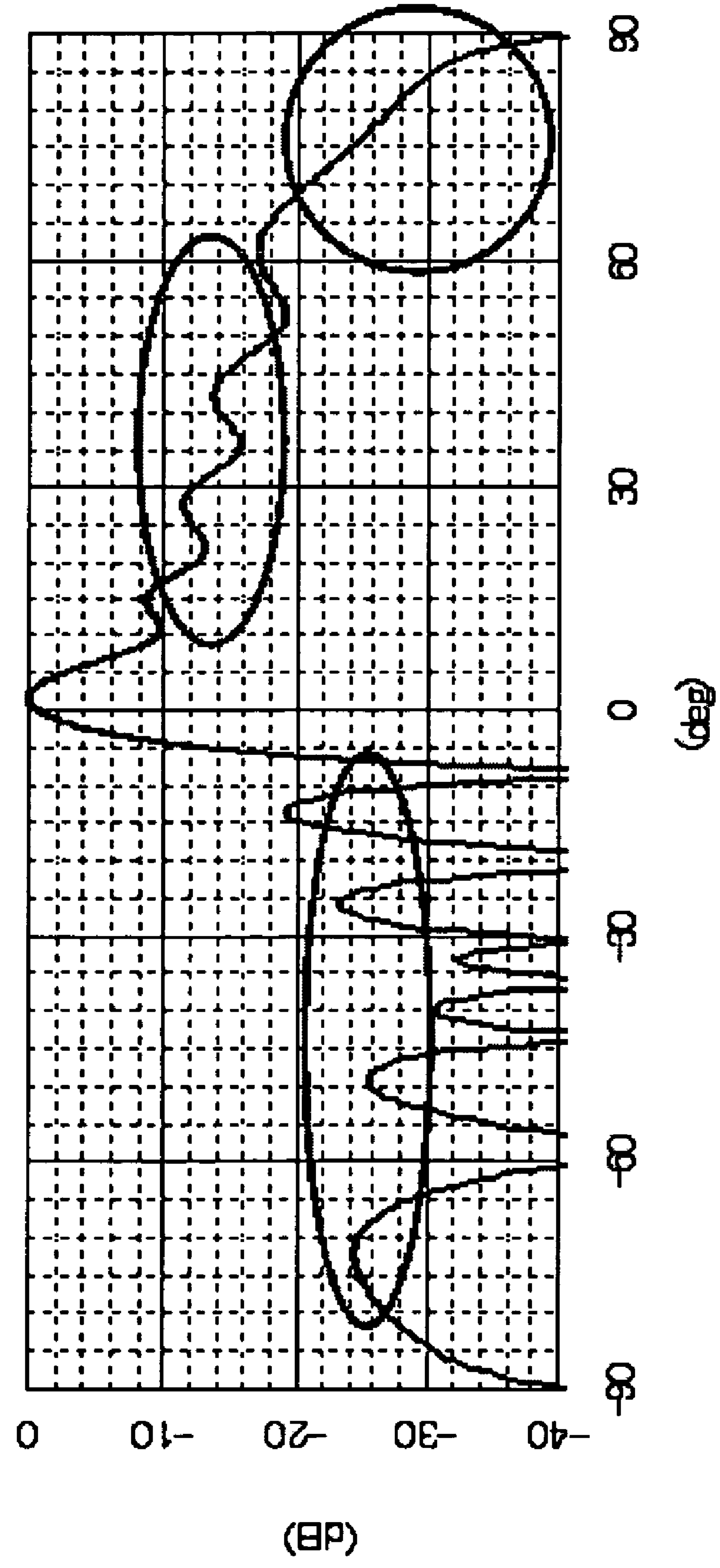
FIG. 12 is a diagram showing the vertical directivity characteristics of the wide-angle null-fill antenna when the phase of each antenna element in an antenna array added to the vicinity of the phase center is shifted by 0 degrees.
Figure 13:
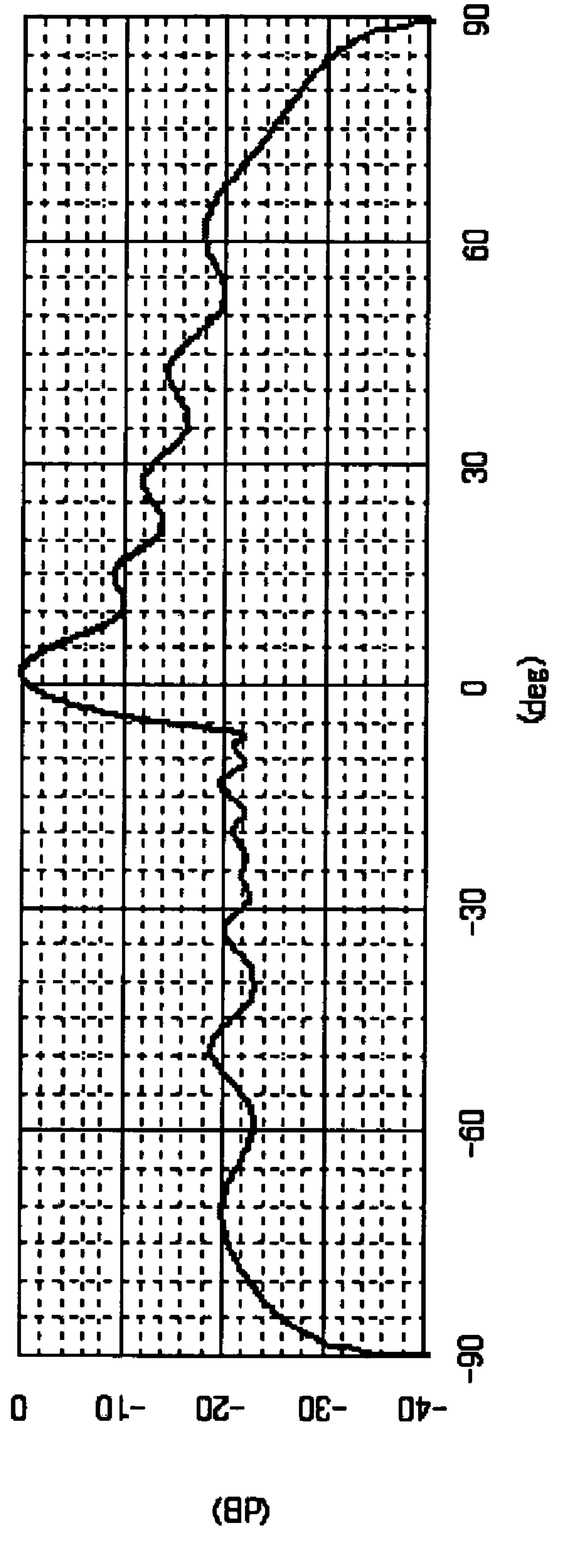
FIG. 13 is a diagram showing the vertical directivity characteristics of the wide-angle null-fill antenna when the phase of each antenna element in an antenna array added to the vicinity of the phase center is shifted by ±60 degrees.
Figure 14:
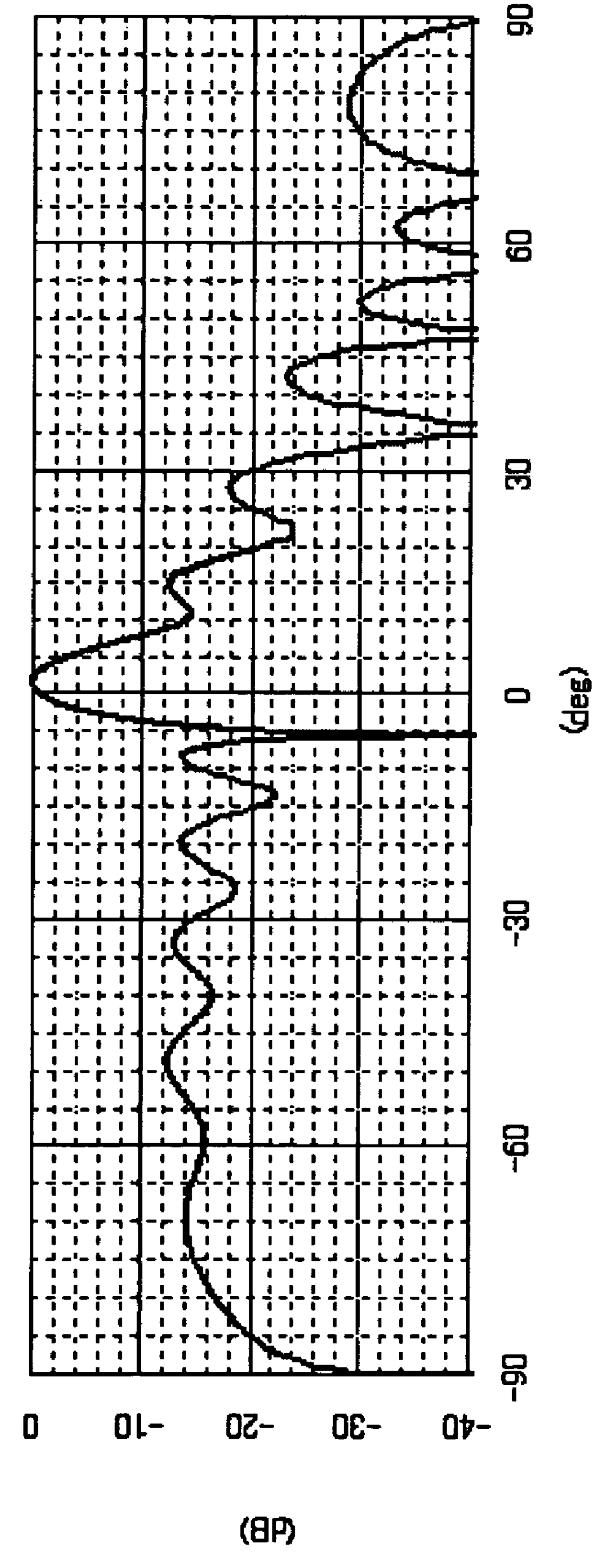
FIG. 14 is a diagram showing the vertical directivity characteristics of the wide-angle null-fill antenna when the phase of each antenna element in an antenna array added to the vicinity of the phase center is reversed.
Figure 15:
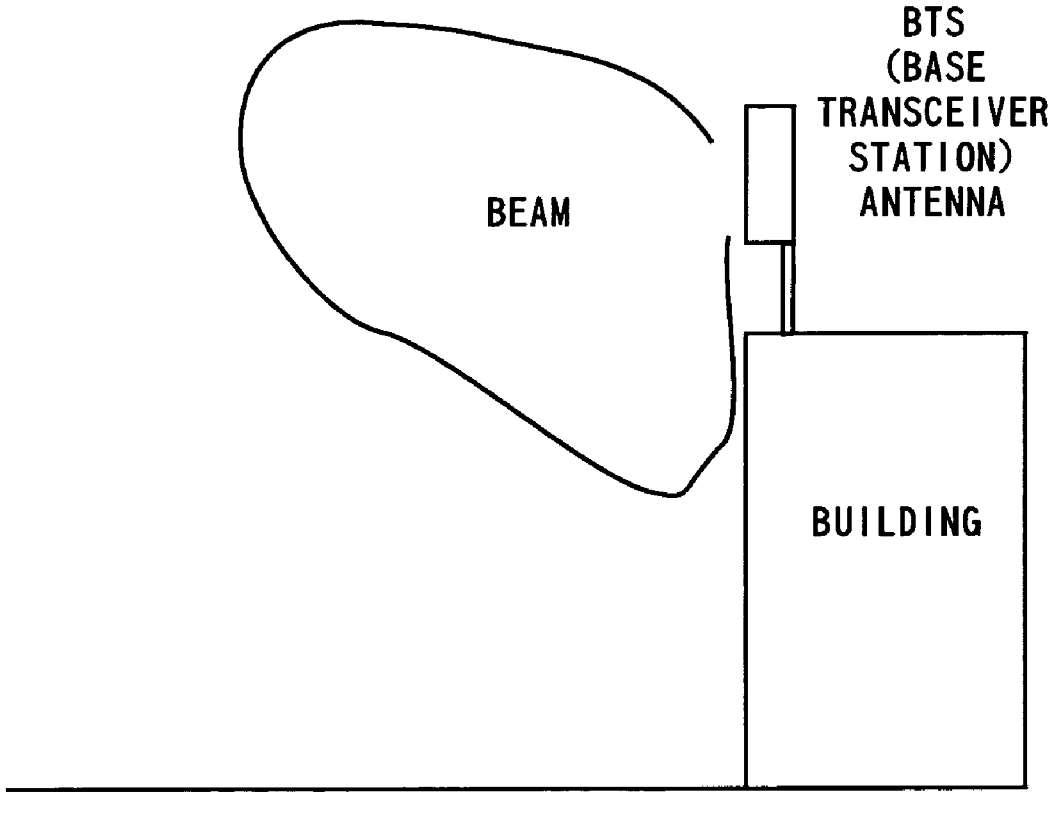
FIG. 15 is a diagram showing the insensitive area of a base station of the present invention.

The effect of the phase variation will be described by referring to FIGS. 12 to 14. FIGS. 12 to 14 are diagrams showing the directivity characteristics of the wide-angle null-fill antenna when the phase of the antenna array 5 is shifted by 0 degrees (i.e., without a shift), when it is shifted by ±60 degrees, and when it is shifted by 180 degrees (i.e., phase-reversed), respectively. When the phase is not shifted, electromagnetic waves radiated in the elevation angle direction are weakened, while those radiated in the depression angle direction are reinforced. In the case where the phase of the antenna array 5 is shifted by ±60 degrees, although not as significant as in the case of no phase shift, electromagnetic waves radiated in the elevation angle direction are weakened, while those radiated in the depression angle direction are reinforced. Besides, if the phase of the antenna array 5 is reversed, similar effects are not shown. Incidentally, in FIGS. 12 to 14, the directivity characteristics are shown on the assumption of a sector of 60 degrees and no array factor within the range.

As just described, even though the phase of electromagnetic waves radiated from the antenna array 5 is not completely the same as in the case where an antenna element is added to the phase center, it is possible to sufficiently achieve the effects of weakening electromagnetic waves radiated in the elevation angle direction as well as reinforcing electromagnetic waves radiated in the depression angle direction. In practical use, if the phase is shifted to the extent of approximately ±60 degrees, the aforementioned effects can be sufficiently achieved.

In this example, the antenna array 5 has no directivity in the vertical plane or the direction of arrangement of the antenna elements 2 and 3. However, the antenna array 5 may have vertical directivity. When the radiation characteristics of the antenna array 5 include directivity in the depression angle direction, the electric field strength can be further improved in the area directly below the antenna (in the vicinity of a depression angle of 90 degrees).

As is described above, according to the first embodiment of the present invention, the wide-angle null-fill antenna is capable of enhancing the input electric field in the area around the antenna where the depression angle is large. Therefore, when the wide-angle null-fill antenna is used as a base station or BTS (Base Transceiver Station) antenna, there is formed no insensitive area around the foot of the antenna.

Besides, the antenna array 5 increases the electric field at substantially the same level with respect to all directions. Thereby, the ripple can be minimized.

Further, the phase of sidelobes emitted in the zenith direction is opposite to that of electromagnetic waves radiated in the depression angle direction. Consequently, the antenna array 5 can reduce the sidelobes in the zenith direction, and a strong beam is not to be emitted in an undesired direction.

In the first embodiment, as shown in FIG. 7, the antenna array 5 includes four antenna elements, which are regularly spaced with the phase center therebetween. However, the number of antenna elements is given only as an example, and the antenna array 5 may include two or six elements. That is, the antenna array may be composed of 2n (n: an arbitrary positive integer) antenna elements. Additionally, while the antenna elements 2 and 3 are arranged in a linear array, they may be arranged in a plurality of arrays, e.g., three arrays, to form a matrix, with the antenna array 5 at the phase center.

Figure 16:
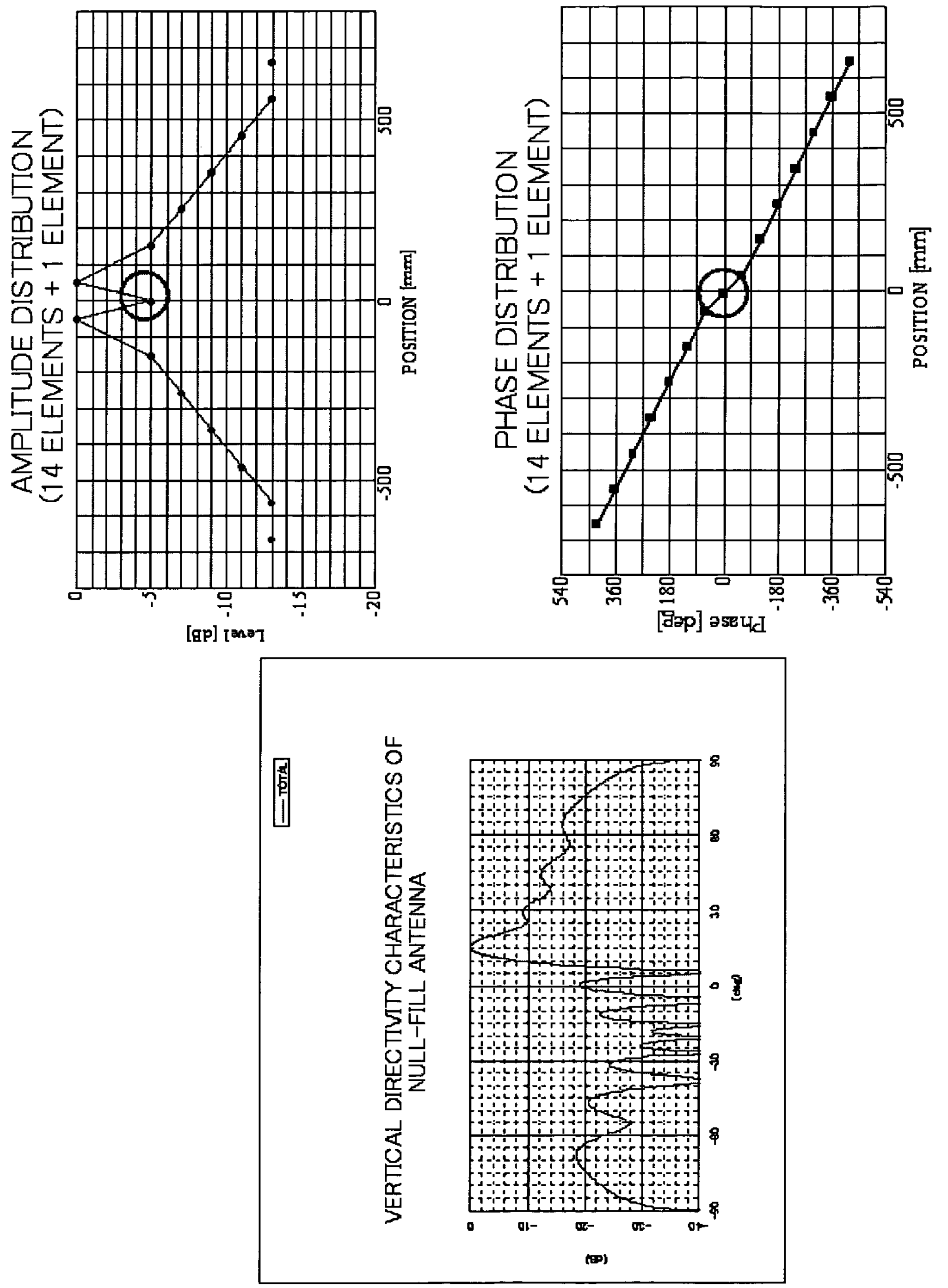
FIG. 16 is a diagram showing the amplitude distribution, phase distribution and vertical directivity characteristics of an antenna element when the antenna is set in a tilted position.

Further, in the above description, the horizontal radiation directivity is almost 0 degrees. However, the maximum radiation direction may be tilted in the vertical plane with the same advantages. The maximum radiation direction can be tilted by providing tilt to only the excitation phase characteristics without changing the excitation amplitude characteristics. In the wide-angle null-fill antenna of this embodiment, if the antenna elements 2 are advanced more in phase as the distance from the phase center increases, while the antenna elements 3 are delayed more in phase as the distance from the phase center increases, the maximum radiation direction can be tilted at a depression angle. FIG. 16 is a diagram showing the amplitude distribution, phase distribution and vertical directivity characteristics of the wide-angle null-fill antenna tilted at a depression angle. The vertical directivity characteristics indicate that the beam peak is at a depression angle of 15 degrees. In this manner, when a beam is tilted downward, interference (overreach) to adjacent cells can be reduced. Thus, the wide-angle null-fill antenna can be effectively used as a BTS antenna when small cells are desired.

Second Embodiment

Figure 17:
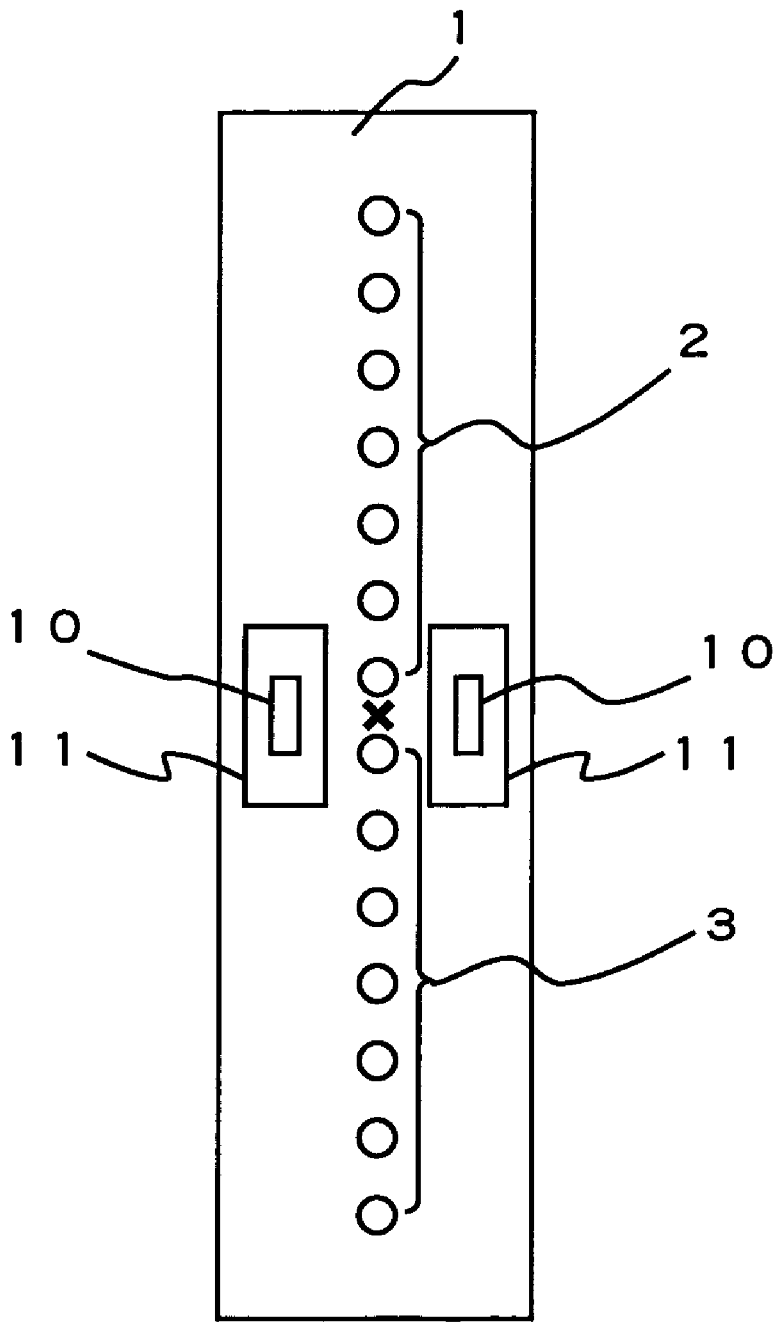
FIG. 17 is a diagram showing the construction of a wide-angle null-fill antenna according to the second embodiment of the present invention.

FIG. 17 is a diagram showing the construction of a wide-angle null-fill antenna according to the second embodiment of the present invention. As can be seen in FIG. 17, the wide-angle null-fill antenna of this embodiment is basically similar in construction and general arrangement to that of the first embodiment. The wide-angle null-fill antenna comprises a substrate 1 and a total of 14 patch antenna elements 2 and 3. On the substrate 1, the patch antenna elements 2 and 3 are arranged vertically to form a linear first antenna array. In FIG. 17, a crisscross (✖) mark indicates the phase center of the first antenna array. The wide-angle null-fill antenna further comprises two dipole antennas 10 as a second antenna array with the phase center of the first antenna array between them. That is, the phase centers of the first and second arrays are located at the same position. The dipoles are oriented parallel to the first antenna array.

Figure 18:
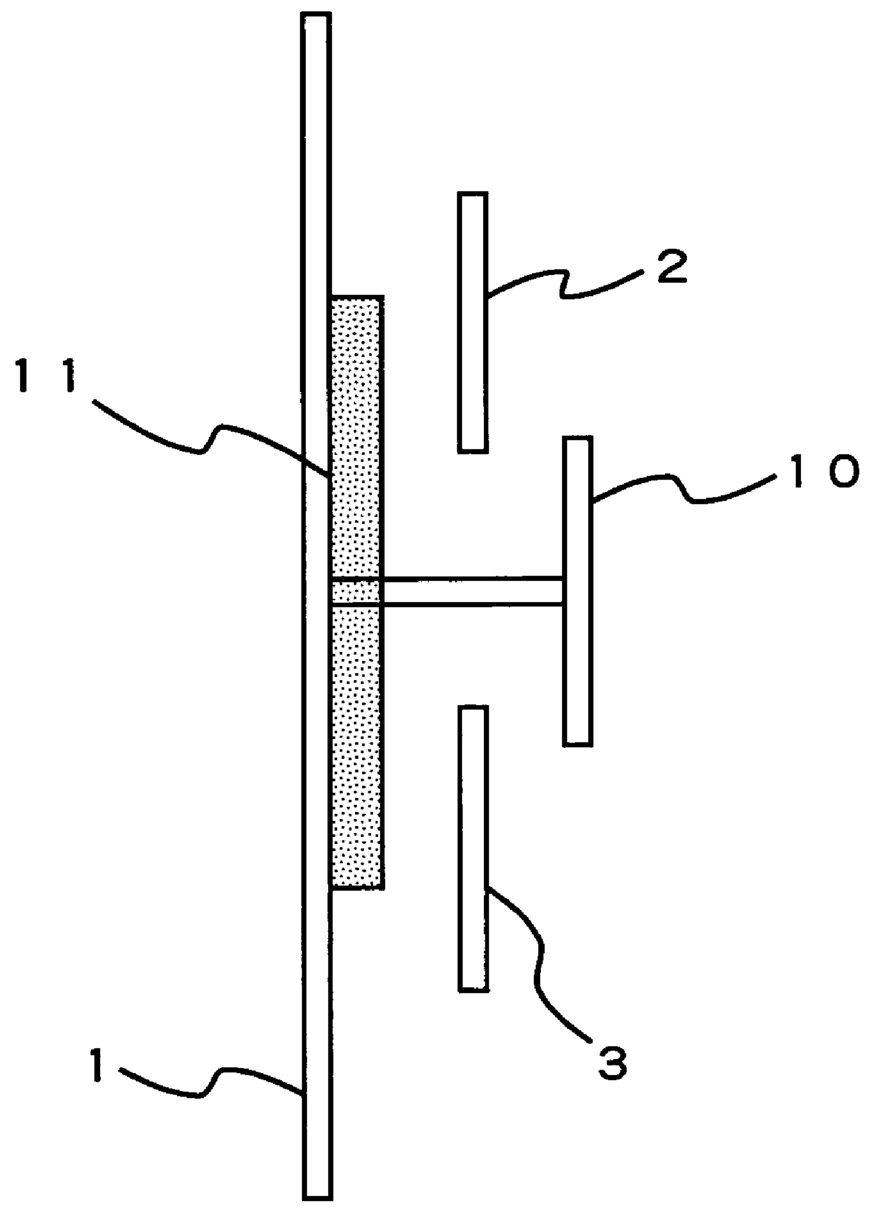
FIG. 18 is a diagram showing the side view of the vicinity of the phase center of the wide-angle null-fill antenna depicted in FIG. 17.

FIG. 18 is a diagram showing the enlarged side view of the vicinity of the phase center of the wide-angle null-fill antenna. Although a single dipole antenna 10 is omnidirectional in the horizontal plane, a combination of the two in an array can narrow down the beamwidth in the horizontal plane. In addition, since a dipole antenna has weak directivity and is susceptible to the effect of a reflector plate, each of the dipole antennas 10 is provided with an electromagnetic wave absorber 11 to reduce the frequency characteristics of the beamwidth in the horizontal plane. As can be seen in FIGS. 17 and 18, the electromagnetic wave absorbers 11 are set around the two dipole antennas 10, respectively, with the supporting portion of the antenna as the center.

According to the second embodiment, the electromagnetic wave absorber 11 is arranged so as to surround the supporting portion of the dipole antenna 10 and extend to two patch antenna elements adjacent to the antenna 10. In other words, the electromagnetic wave absorber 11 is set to surround the center antenna element, and also extended in the horizontal direction (the direction of arrangement of the patch antenna elements 2 and 3 forming the first antenna array). With this construction, it is possible to reduce the frequency characteristics of the beamwidth in the horizontal plane as well as to increase the electric field level on the ground in the vertical plane.

Figure 19:
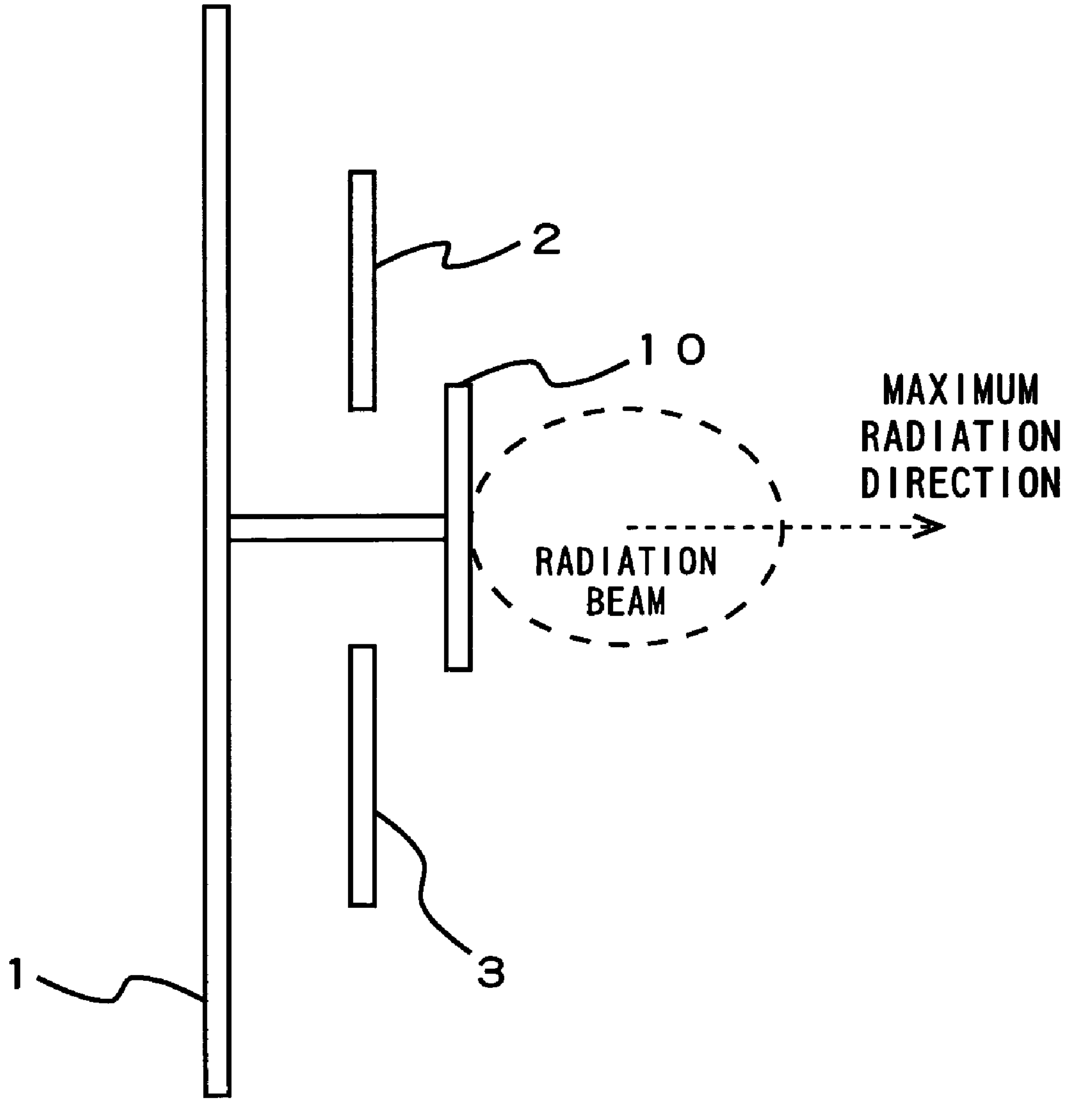
FIG. 19 is a diagram showing the maximum radiation direction of electromagnetic waves when a dipole antenna is set so that the dipoles are vertically oriented.
Figure 20:
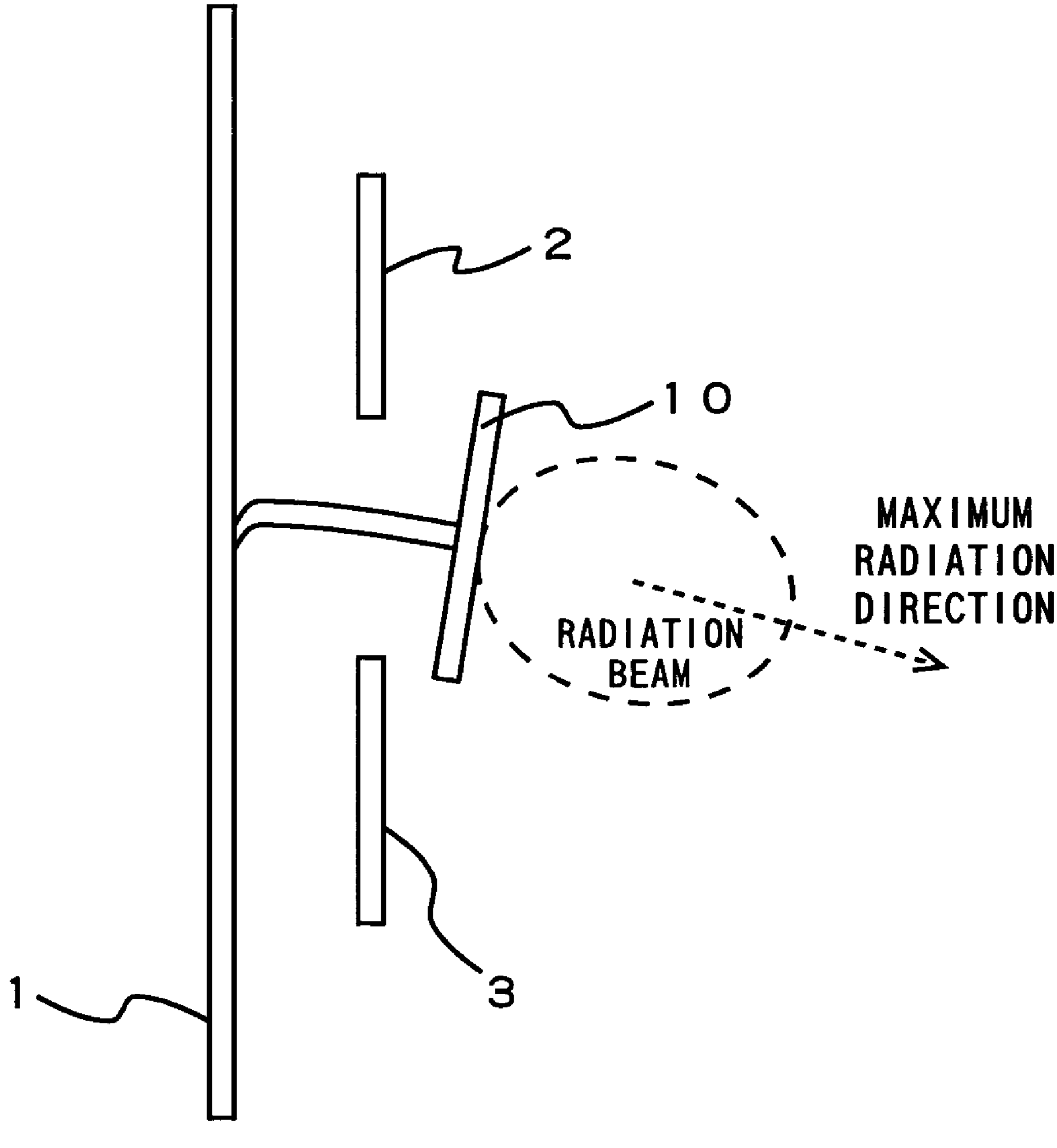
FIG. 20 is a diagram showing the maximum radiation direction of electromagnetic waves when a dipole antenna is set so that the dipoles are oriented at a depression angle with respect to the vertical direction.

FIG. 19 is a diagram showing the maximum radiation direction of electromagnetic waves when the dipole antenna 10 is vertically oriented. FIG. 20 is a diagram showing the maximum radiation direction of electromagnetic waves when the dipole antenna 10 is oriented at a depression angle with respect to the vertical direction. In FIG. 20, the dotted line indicates the radiation characteristics of the wide-angle null-fill antenna. As shown in FIG. 19, the vertical orientation of the dipole antenna 10 results in the horizontal maximum radiation direction. On the other hand, as shown in FIG. 20, the dipole antenna 10 oriented at an angle (depression angle) with respect to the vertical direction causes the maximum radiation direction to be downward with respect to the horizontal direction. When the dipole antenna 10 is oriented downwardly, the radiation level to which the center antenna element contributes increases in the wide-depression angle direction. As a result, the wide-angle null-fill antenna hardly forms a null at the foot of the antenna.

Third Embodiment

Figure 21:
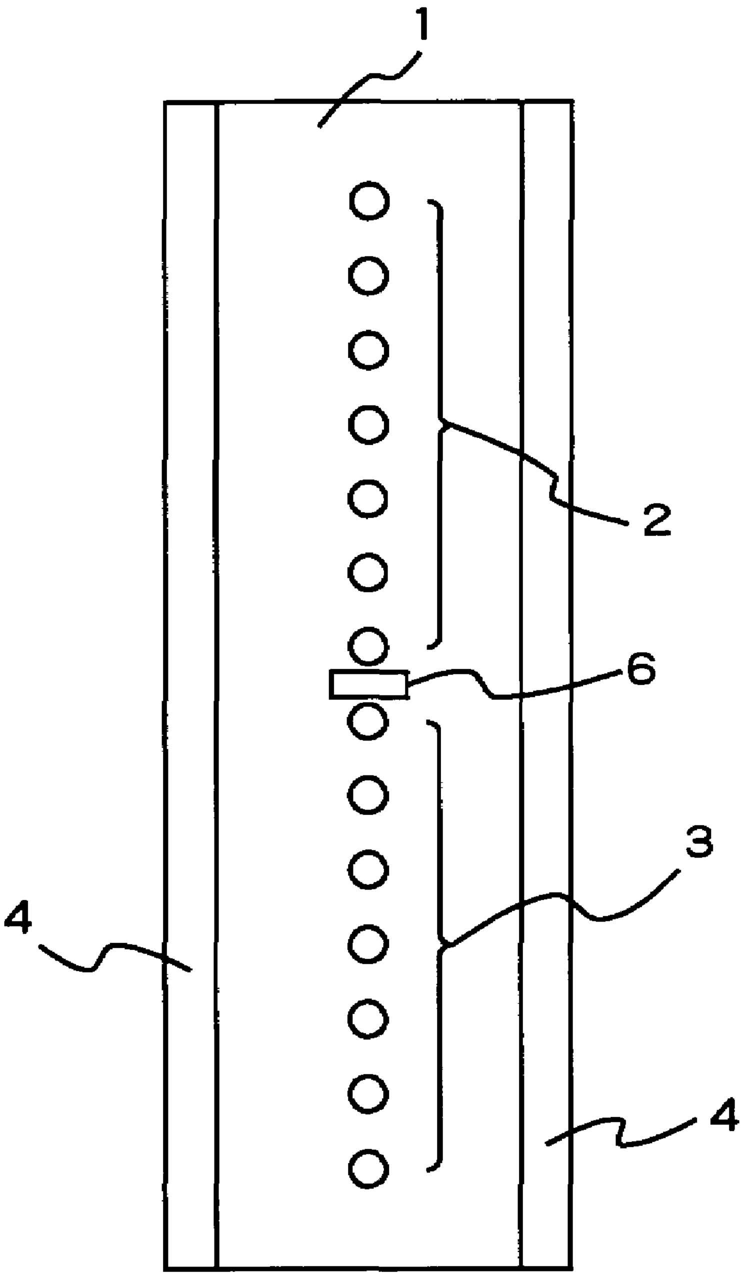
FIG. 21 is a diagram showing the construction of a wide-angle null-fill antenna according to the third embodiment of the present invention.

FIG. 21 is a diagram showing the construction of a wide-angle null-fill antenna according to the third embodiment of the present invention. Referring to FIG. 21, the wide-angle null-fill antenna comprises a substrate 1 and antenna elements 2 and 3 arrayed at regular intervals on the surface of the substrate 1 as in the first embodiment. The antenna elements 2 are arranged with an equal spacing of 0.7 wavelength from a position 0.35 wavelength apart from the phase center in the zenith direction. On the other hand, the antenna elements 3 are arranged with an equal spacing of 0.7 wavelength from a position 0.35 wavelength apart from the phase center in the nadir direction. The substrate 1 is provided with flares 4 on both sides thereof in the longitudinal direction. Incidentally, all the antenna elements 2 and 3 have the same characteristics.

The wide-angle null-fill antenna further comprises a slot antenna 6 extending horizontally at the phase center on the substrate 1. The slot antenna 6 has radiation characteristics equivalent to those of the antenna elements 2 and 3.

Figure 22:
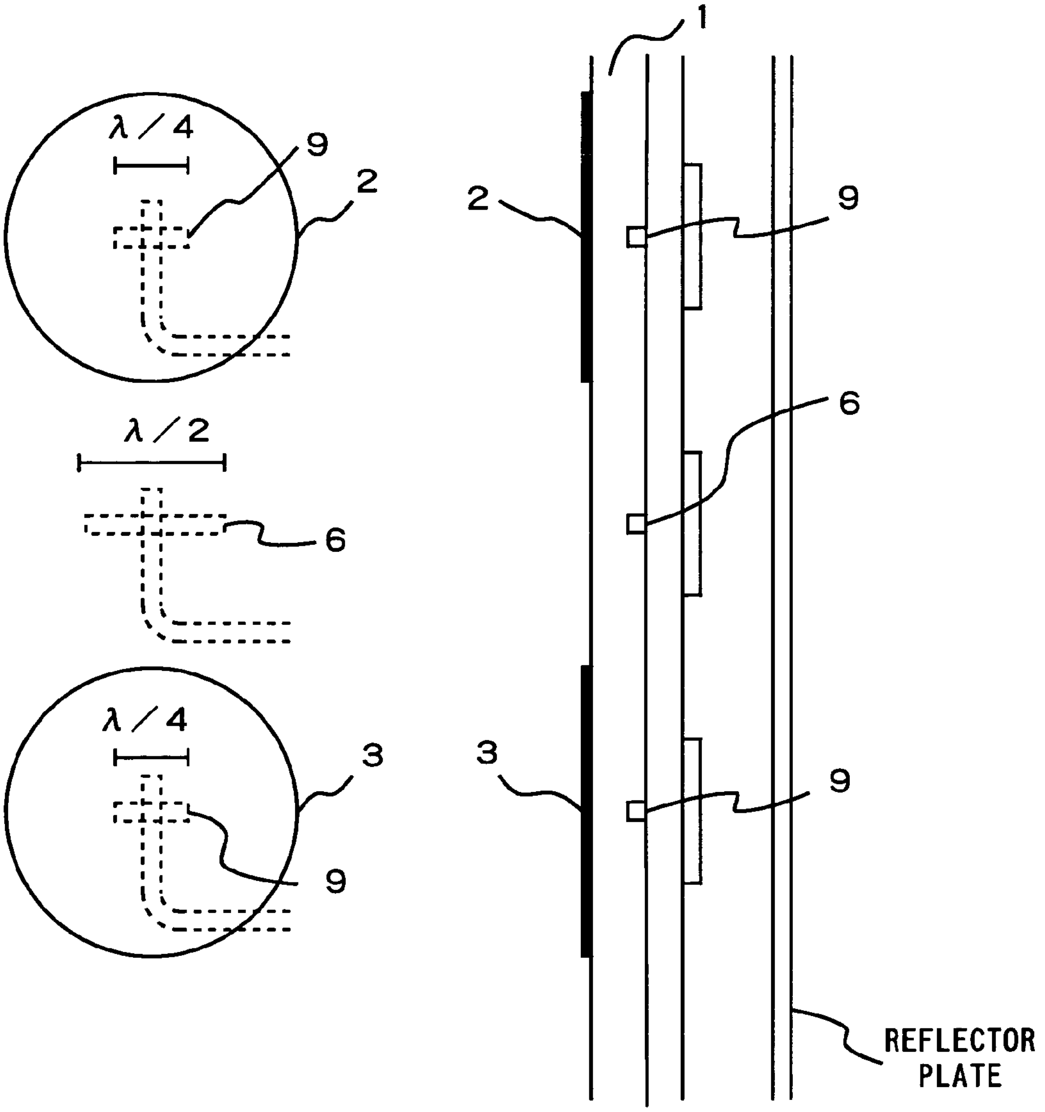
FIG. 22 is a diagram showing the internal construction of the substrate of the wide-angle null-fill antenna depicted in FIG. 21.

FIG. 22 is a diagram showing the cross-sectional view of the substrate 1 of the wide-angle null-fill antenna of this embodiment. As can be seen in FIG. 22, each of the antenna elements 2 and 3 is electromagnetically coupled with a driving slot 9 formed inside the substrate 1, and excited by the slot 9. Each of the driving slots 9 has a length of quarter-wavelength: λ/4 (λ: the wavelength of electromagnetic waves radiated therefrom).

Besides, the slot antenna 6, which is placed inside the substrate 1 at the position of the phase center, has a length of half-wavelength λ/2 (λ: the wavelength of electromagnetic waves radiated therefrom). Since the substrate 1 is made of dielectric material, the slot antenna 6 can function as an antenna without physically forming slots or apertures.

As is described above, according to the third embodiment of the present invention, if only a slot having a length different from that of the driving slots 9 is added to the phase center when the slots 9 are formed inside the substrate 1 to excite the antenna elements 2 and 3, the slot can function as the slot antenna 6. Consequently, the wide-angle null-fill antenna can be manufactured easily.

If the slot antenna 6 has the same amplitude characteristics as those of the other antenna elements (antenna elements 2 and 3), it is obvious that the wide-angle null-fill antenna of this embodiment can achieve the same effect as with that of the first embodiment. Therefore, the same description will not be repeated.

Figure 23:
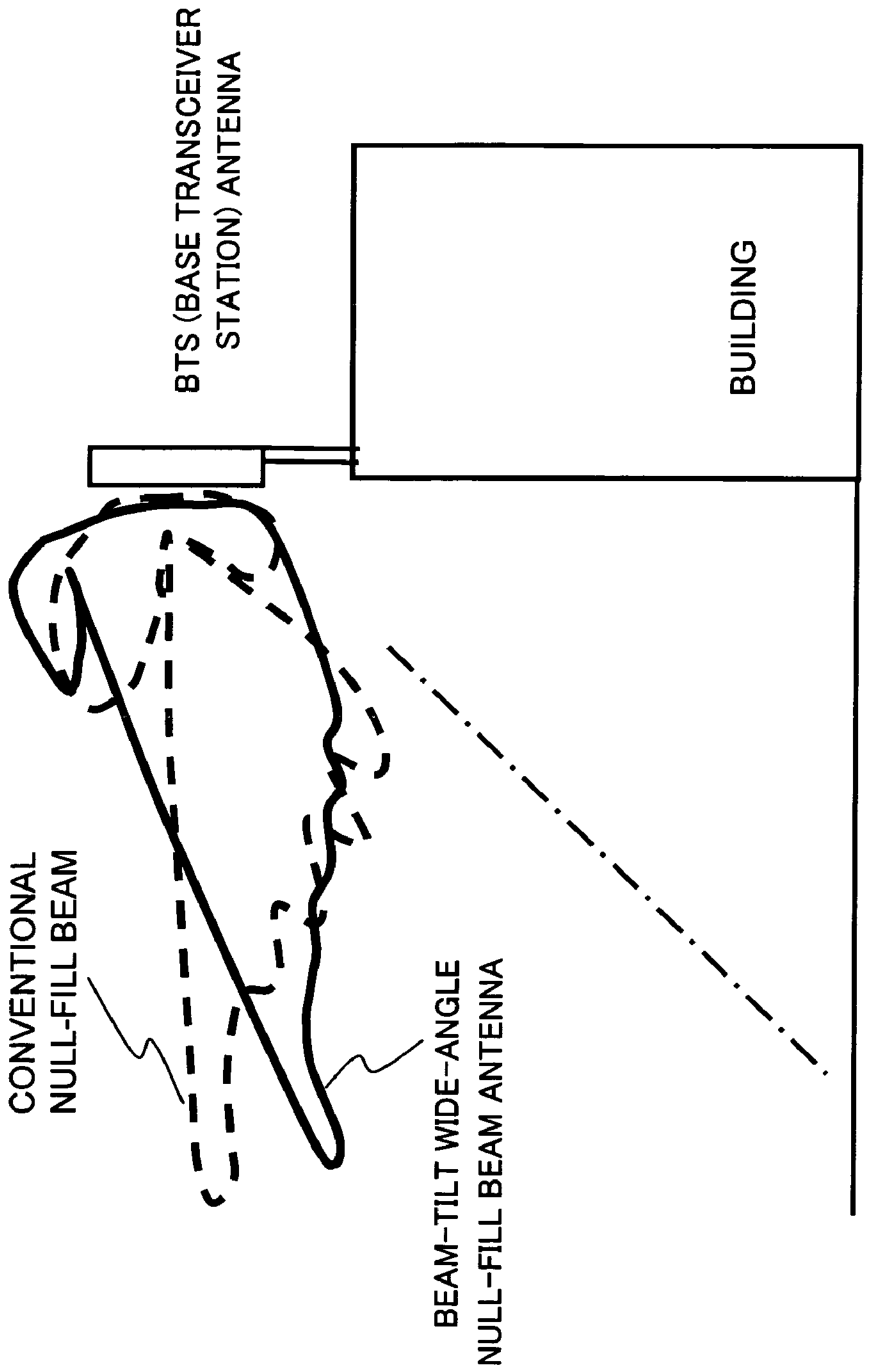
FIG. 23 is a diagram showing a base station provided with the wide-angle null-fill antenna depicted in FIG. 21 whose maximum radiation direction is tilted at a descending vertical angle.

FIG. 23 is a diagram showing a base station provided with the wide-angle null-fill antenna depicted in FIG. 21 whose maximum radiation direction is tilted downward (in a depression angle direction) in the vertical plane. In FIG. 23, the wide-angle null-fill antenna is set at the top of a building as a BTS antenna.

In FIG. 23, the dotted line indicates the radiation pattern of the wide-angle null-fill antenna. The beam peak indicated by the dotted line is substantially horizontal. On the other hand, the beam peak indicated by the solid line is oriented in a downward direction. In this manner, when a beam is tilted downward, interference (overreach) to adjacent areas can be reduced. Thus, the wide-angle null-fill antenna can be effectively used as a BTS antenna when small cells are desired.

Figure 24:
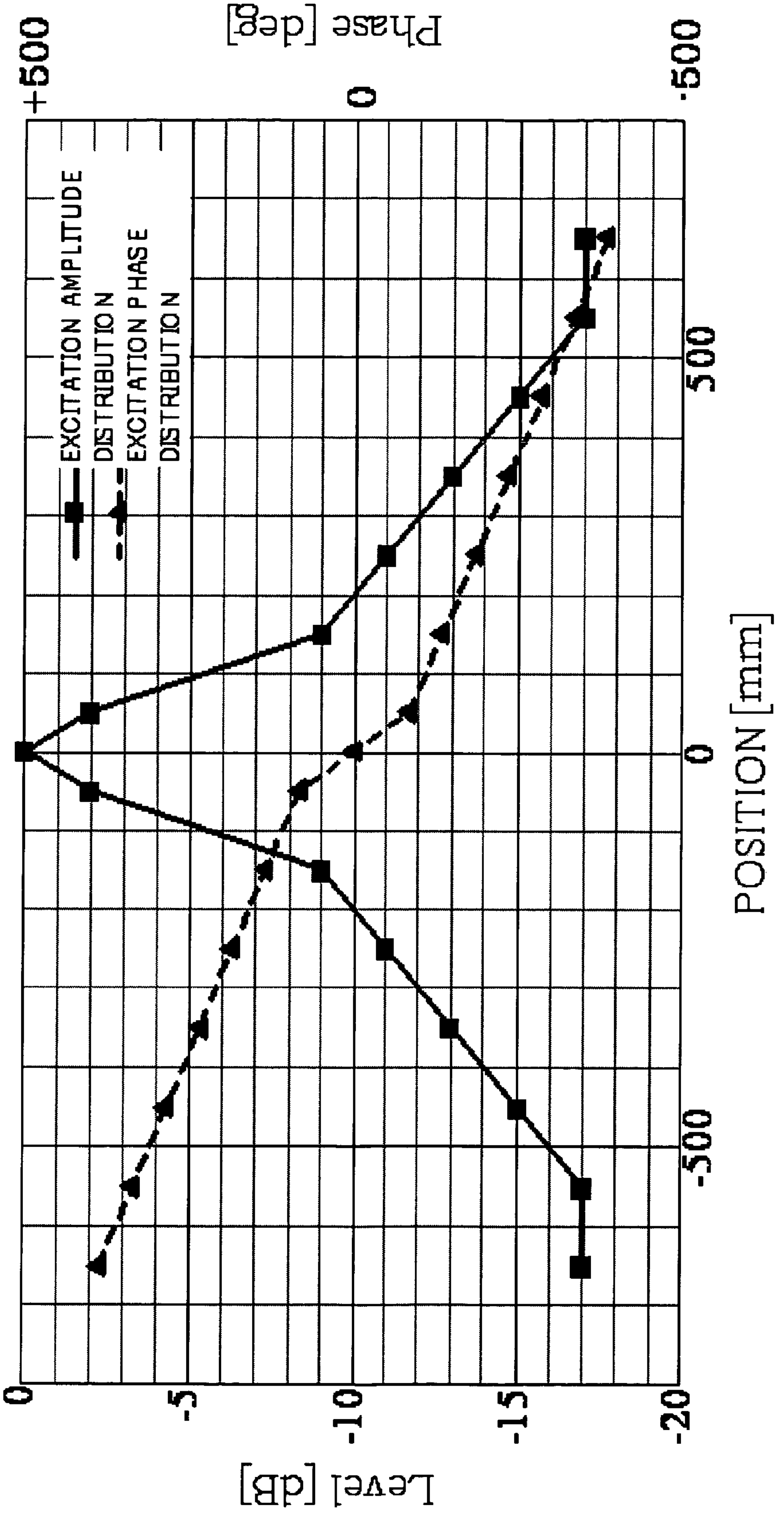
FIG. 24 is a diagram showing the excitation amplitude and excitation phase distributions of the wide-angle null-fill antenna depicted in FIG. 21 whose maximum radiation direction is tilted downward.

FIG. 24 is a diagram showing the excitation phase and excitation amplitude distributions in the wide-angle null-fill antenna whose maximum radiation direction is tilted downward. In FIG. 24, the solid line indicates the amplitude distribution, while the dotted line indicates the phase distribution. The amplitude distribution has bilateral symmetry with respect to the origin (phase center). The phase distribution has point symmetry with respect to the origin. More specifically, the antenna elements 2, which are arranged from the phase center in the zenith direction, are advanced more in phase as the distance from the phase center increases. On the other hand, the antenna elements 3, which are arranged from the phase center in the nadir direction, are delayed more in phase as the distance from the phase center increases. The excitation amplitude of an antenna element added to the phase center is set to a value about 2 dB higher than that of adjacent elements. This 2 dB difference is within the range of values regarded as substantially the same.

Figure 25:
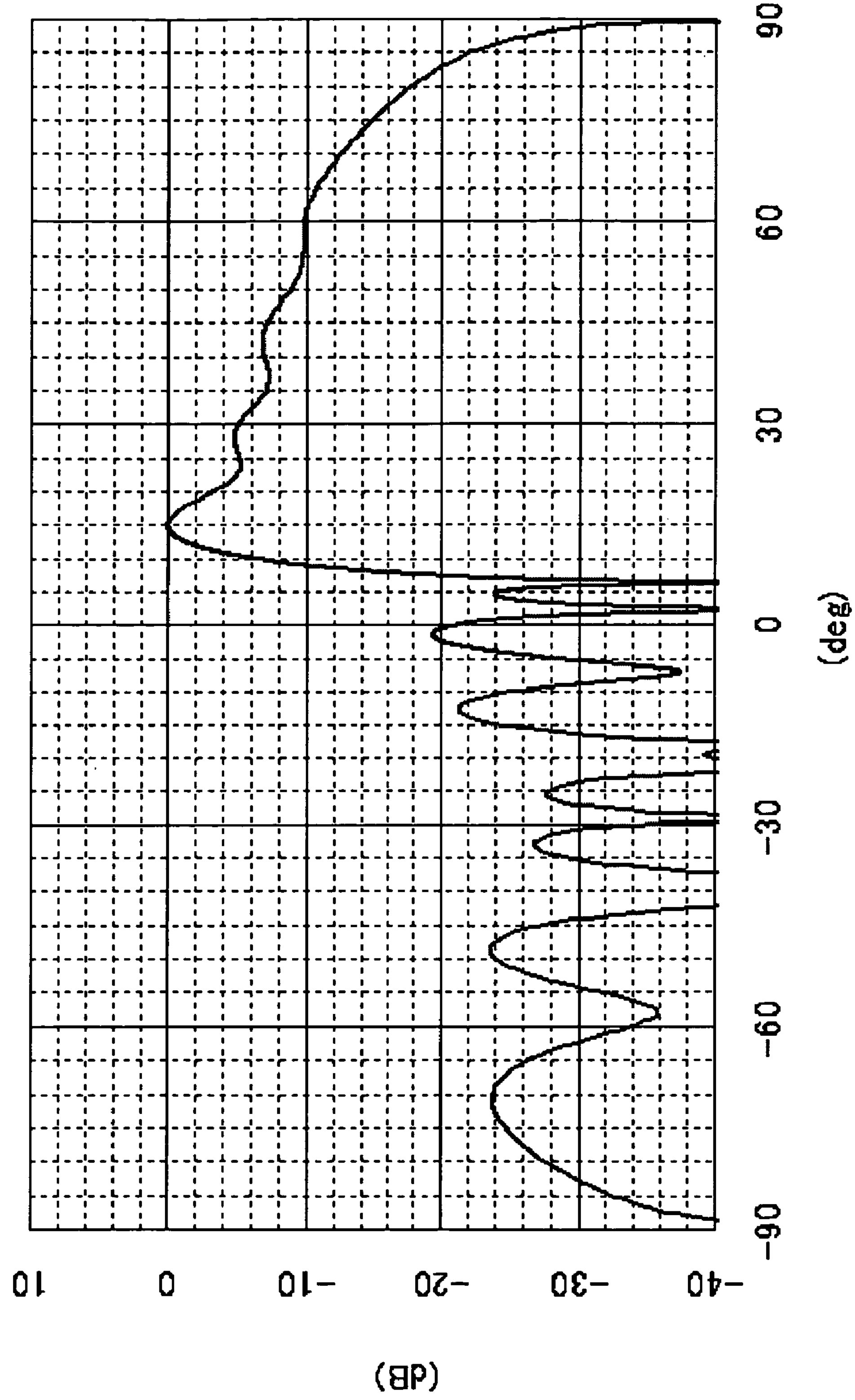
FIG. 25 is a diagram showing the radiation pattern of the wide-angle null-fill antenna depicted in FIG. 21 whose maximum radiation direction is tilted downward.

FIG. 25 is a diagram showing the radiation pattern of the wide-angle null-fill antenna obtained from the excitation amplitude distribution shown in FIG. 24. As can be seen in FIG. 25, the beam peak direction is at a depression angle of 15 degrees, and the sidelobe level is reduced on the minus angle or elevation angle side. As just described, in this embodiment, the excitation amplitude of an antenna element added to the phase center is set to be about 2 dB higher than that of adjacent elements. Thereby, the radiation level is improved in the depression angle direction as compared to the characteristics of the wide-angle null-fill antenna of the first embodiment shown in FIG. 16.

Fourth Embodiment

Figure 26:
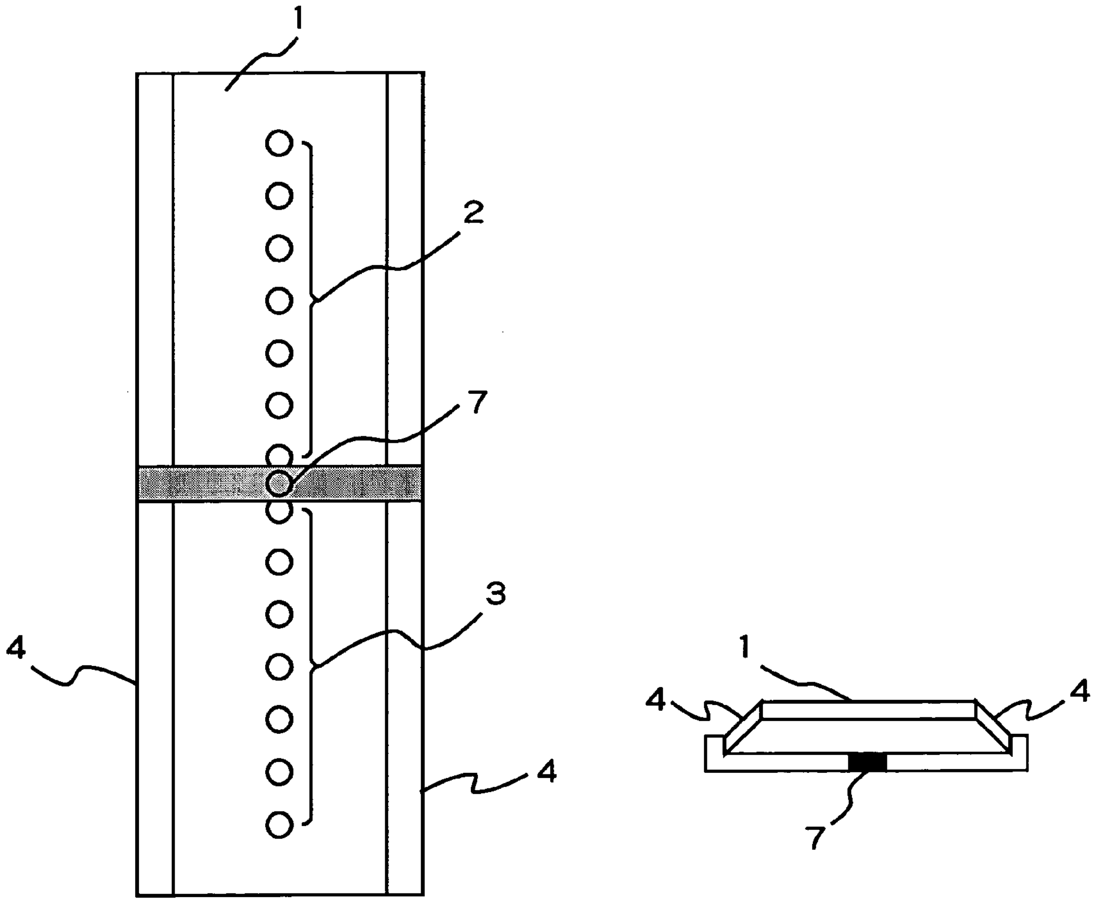
FIG. 26 is a diagram showing the construction of a wide-angle null-fill antenna according to the fourth embodiment of the present invention.

FIG. 26 is a diagram showing the construction of a wide-angle null-fill antenna according to the fourth embodiment of the present invention. Referring to FIG. 26, the wide-angle null-fill antenna comprises a substrate 1 and antenna elements 2 and 3 arrayed at regular intervals on the surface of the substrate 1 as in the first embodiment. The antenna elements 2 are arranged with an equal spacing of 0.7 wavelength from a position 0.35 wavelength apart from the phase center in the zenith direction. On the other hand, the antenna elements 3 are arranged with an equal spacing of 0.7 wavelength from a position 0.35 wavelength apart from the phase center in the nadir direction. The substrate 1 is provided with flares 4 on both sides thereof in the longitudinal direction. Incidentally, all the antenna elements 2 and 3 have the same characteristics.

The wide-angle null-fill antenna further comprises a parasitic element 7 in the vicinity of the phase center on the substrate 1. The parasitic element 7 is spaced about 1 wavelength apart from the phase center in the vertical direction relative to the substrate 1. The parasitic element 7 has substantially the same characteristics as those of the antenna elements 2 and 3. The parasitic element 7 is excited by the antenna elements 2 or 3. Since the parasitic element 7 is not grounded, it has wide-angle radiation characteristics as compared to the antenna elements 2 and 3. As is described previously for the first embodiment, the phase of electromagnetic waves radiated from the parasitic element 7 is allowed to shift to the extent of approximately ±60 degrees. Although the amount of phase shift varies according to change in the distance between the phase center and the parasitic element 7, such variation is of no particular concern if the phase shift is within the allowable range (±60 degrees).

Incidentally, in this example, the parasitic element 7 has substantially the same characteristics as those of the antenna elements 2 and 3. However, the parasitic element 7 may be a strip metal being not grounded, the longitudinal sides of which are parallel to the direction of polarized waves. Or, the parasitic element 7 may be a circular metal which is not grounded.

If the parasitic element 7 has the same amplitude characteristics as those of the other antenna elements (antenna elements 2 and 3), it is obvious that the wide-angle null-fill antenna of this embodiment can achieve the same effect as with that of the first embodiment. Therefore, the same description will not be repeated.

In the wide-angle null-fill antenna of this embodiment, the antenna elements 2 and 3 are similar to conventional cosecant squared beam antennas. The parasitic element 7 can be easily added to an existing antenna afterwards. For example, by placing the parasitic element 7 inside a radome (antenna cover), the element 7 can be easily added to an existing antenna.

Figure 27:
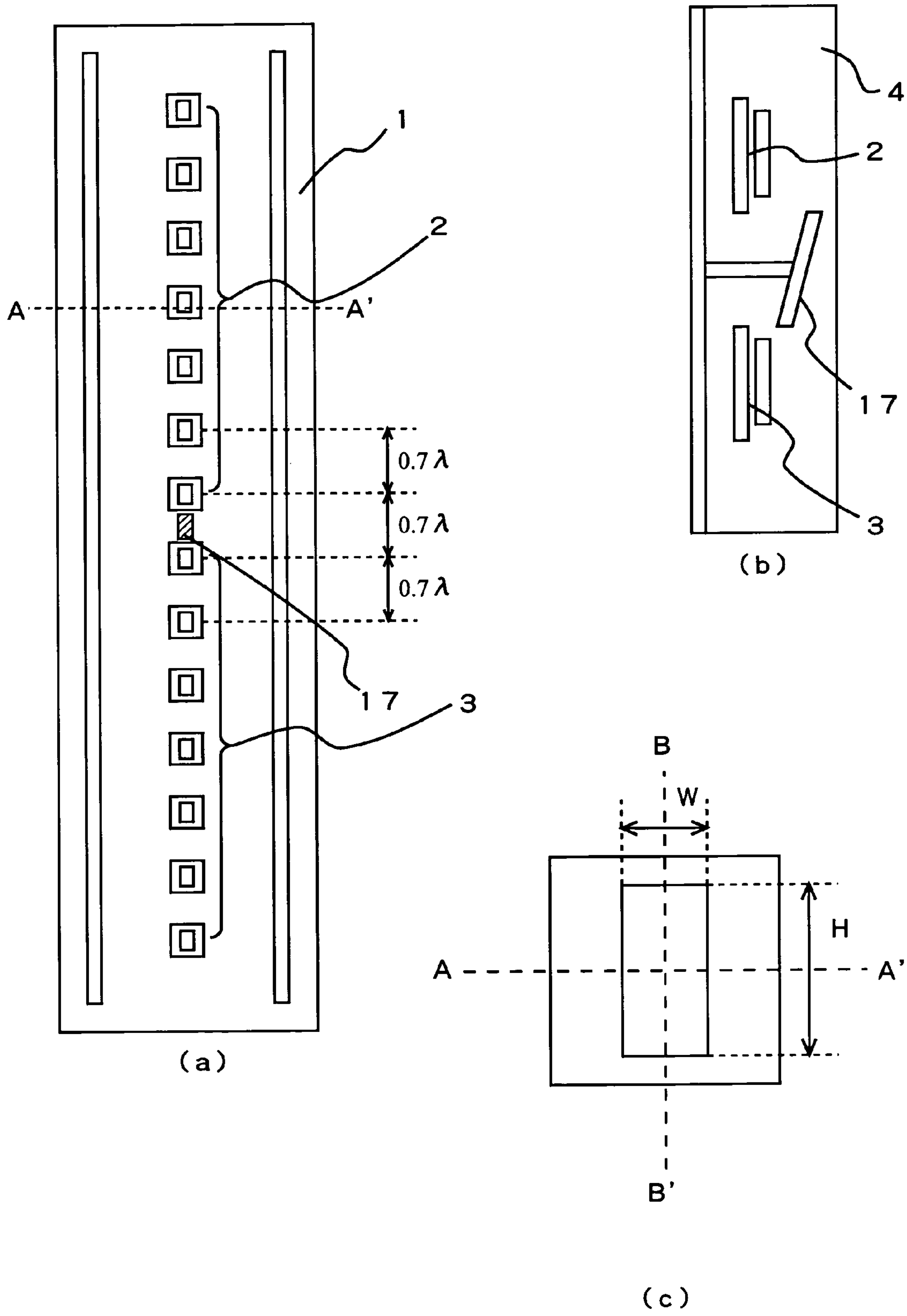
FIG. 27 is a diagram showing the construction of a wide-angle null-fill antenna in which each of rectangular patch antenna elements in an array is provided with a rectangular parasitic element.

FIG. 27 is a diagram showing the construction of a wide-angle null-fill antenna in which each of rectangular patch antenna elements in an array is provided with a rectangular parasitic element. The size (W and H) of the parasitic element 17 is smaller than that of the patch antenna element. In this embodiment, main parameters for forming a horizontal beam represent the size (W and H) of the parasitic element 17. Consequently, beamforming in the horizontal plane can be performed independently of beamforming for null fill in the vertical plane. With respect to the size (W and H) of the parasitic element 17, the relation between W and H is defined as H>W as shown in FIG. 27 in the case of vertically polarized wave, while W and H is defined as H<W in the case of horizontally polarized wave.

Fifth Embodiment

Figure 28:
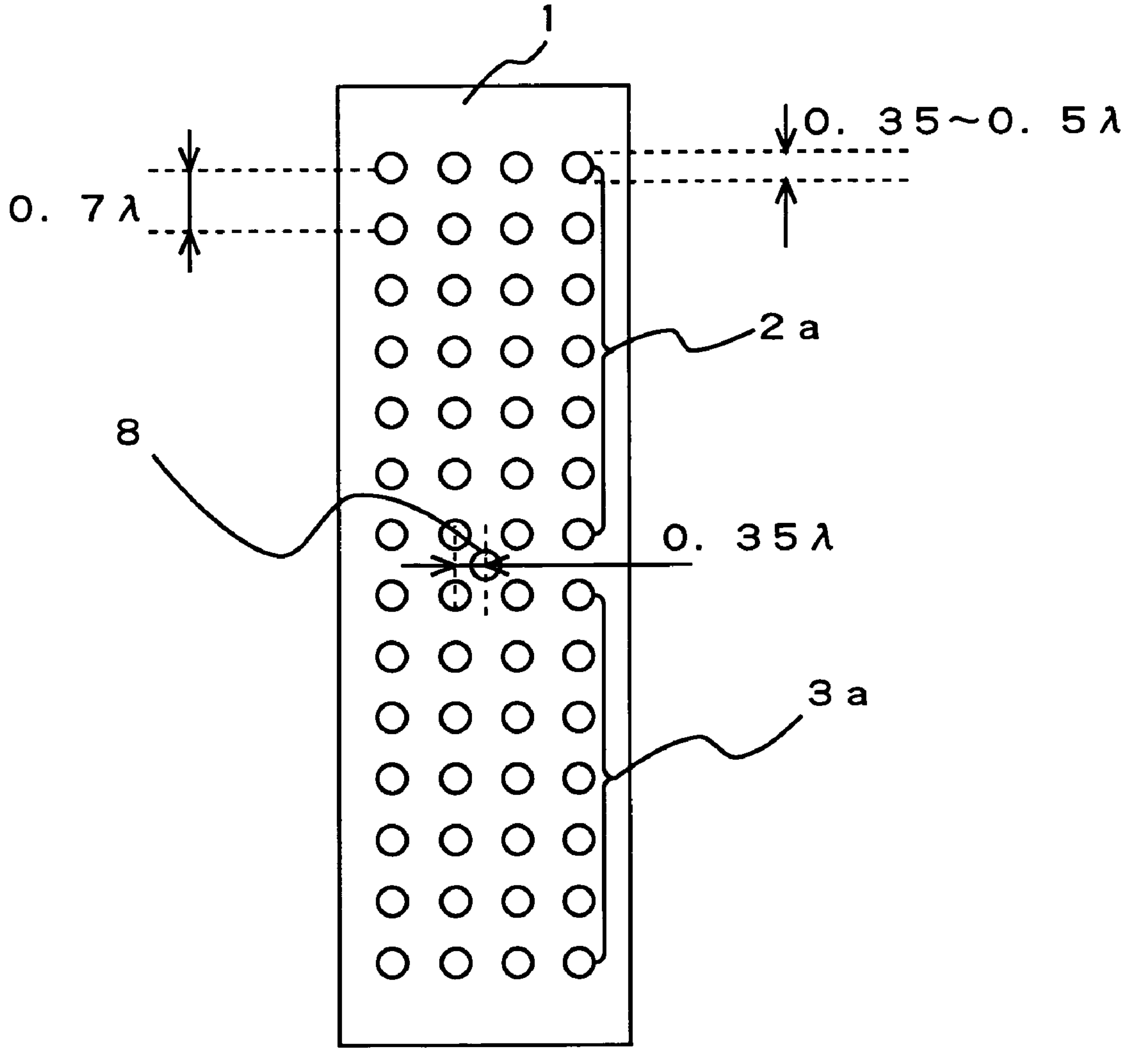
FIG. 28 is a diagram showing an example of the construction of a wide-angle null-fill antenna according to the fifth embodiment of the present invention.

FIG. 28 is a diagram showing an example of the construction of a wide-angle null-fill antenna according to the fifth embodiment of the present invention. As can be seen in FIG. 28, the wide-angle null-fill antenna comprises a substrate 1 and antenna arrays 2*a* and 3*a* including antenna elements arranged at regular intervals on the surface of the substrate 1. The antenna elements included in the antenna array 2*a* are arranged in a matrix with an equal spacing of 0.7λ (λ: the wavelength of electromagnetic waves radiated therefrom) from positions 0.35λ apart from the phase center in the zenith direction. On the other hand, the antenna elements included in the antenna array 3*a* are arranged in a matrix with an equal spacing of 0.7λ from positions 0.35λ apart from the phase center in the nadir direction. The antenna, elements are laterally spaced 0.35λ or 1.05λ apart from the phase center. Incidentally, all the antenna elements of the antenna arrays 2*a* and 3*a* have the same characteristics.

The wide-angle null-fill antenna further comprises an antenna element 8 at the phase center on the substrate 1. The antenna element 8 has radiation characteristics equivalent to those of the antenna elements included in the antenna arrays 2*a* and 3*a*.

As is described previously for the first embodiment, an antenna array consisting of antenna elements arranged in the horizontal plane has radiation characteristics equivalent to those of an antenna element placed in the center of the array. That is, the wide-angle null-fill antenna of FIG. 28 has radiation characteristics equivalent to those of the wide-angle null-fill antenna of FIG. 7. Thus, the wide-angle null-fill antenna of this embodiment can achieve the same effect as with the wide-angle null-fill antenna of the first embodiment.

Figure 29:
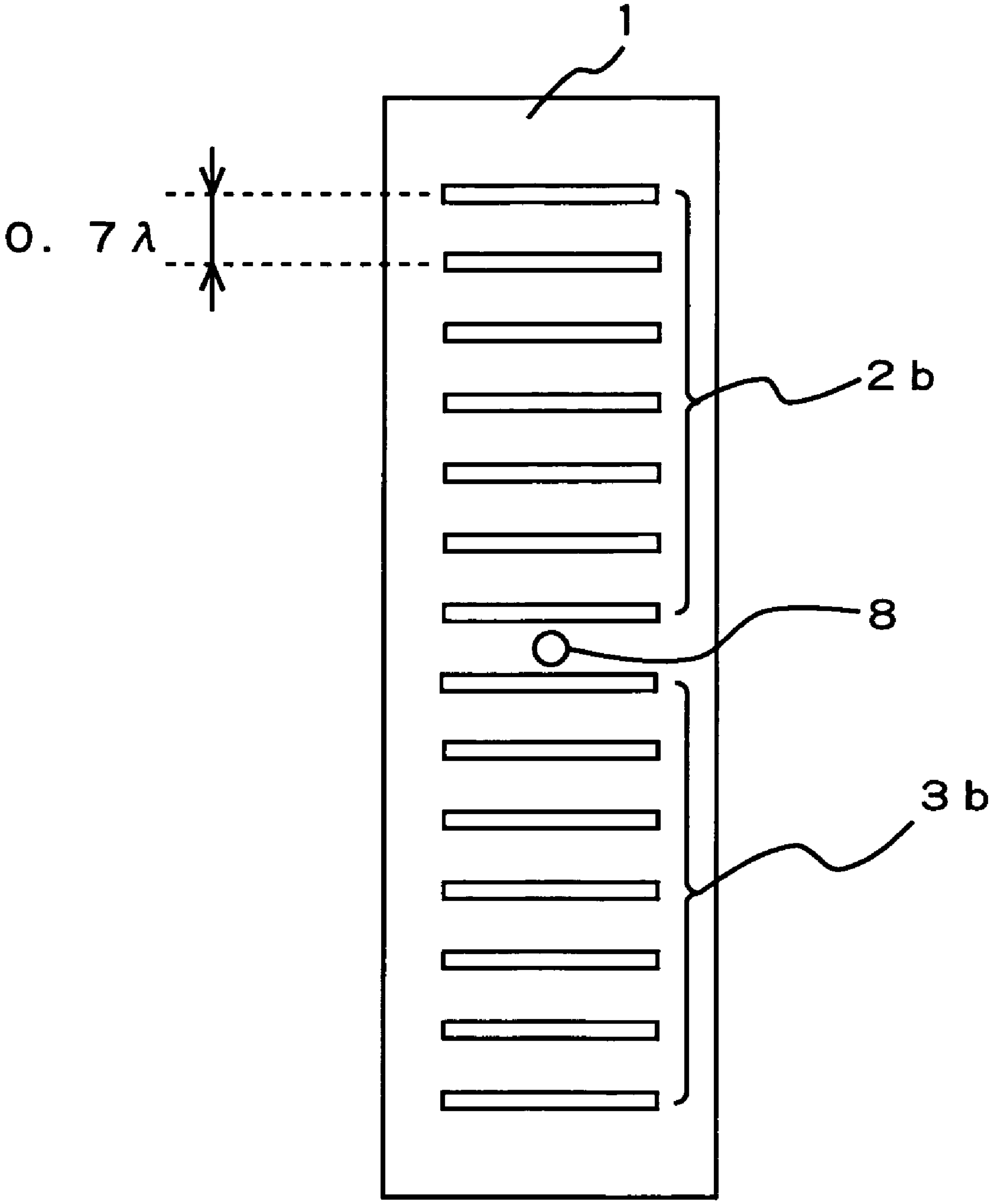
FIG. 29 is a diagram showing another example of the construction of a wide-angle null-fill antenna according to the fifth embodiment of the present invention.

FIG. 29 is a diagram showing another example of the construction of a wide-angle null-fill antenna according to the fifth embodiment of the present invention. In FIG. 28, the antenna arrays 2*a* and 3*a* are disposed on the substrate 1 and the antenna element 8 is placed at the phase center. Besides, as can be seen in FIG. 29, the wide-angle null-fill antenna may comprise, with the same advantages, a substrate 1, slot antennas 2*b* and 3*b* arrayed on the substrate 1, and an antenna element 8 at the phase center. Additionally, in FIG. 28, while the antenna arrays 2*a* and 3*a* are arranged in a matrix, they may be arranged in other forms such as a honeycomb.

Sixth Embodiment

Figure 30:
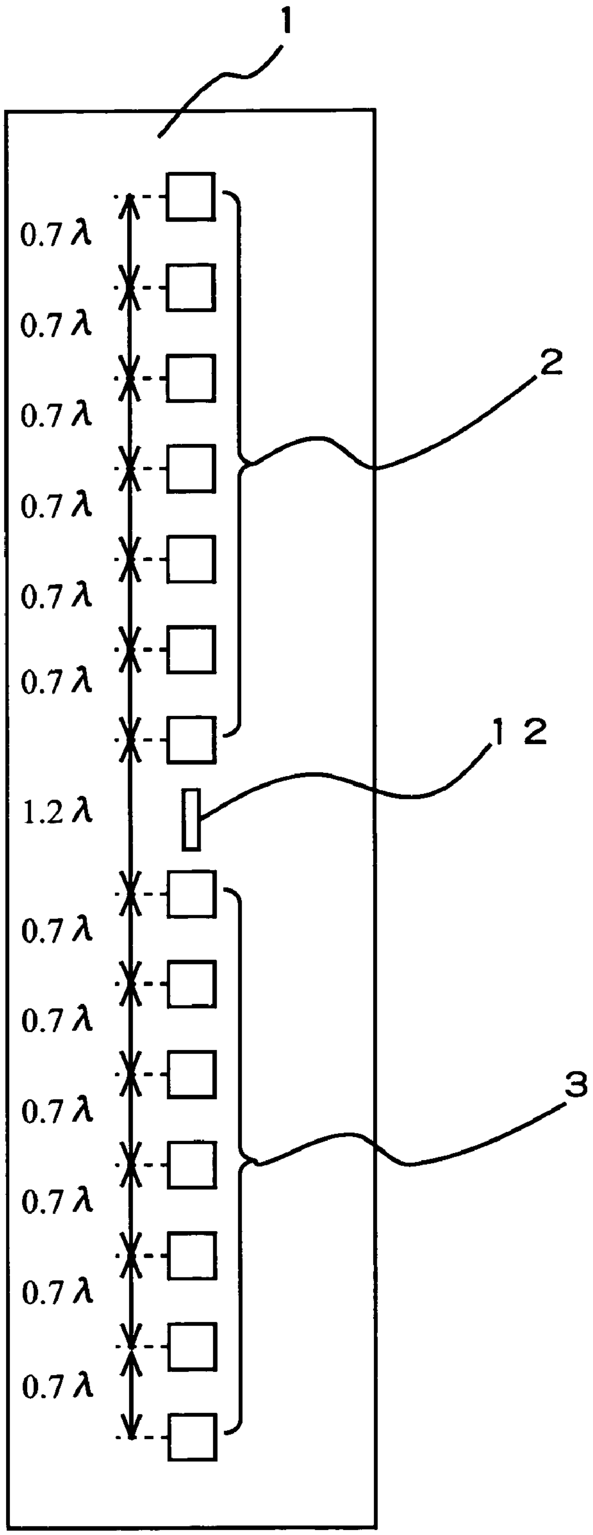
FIG. 30 is a diagram showing the construction of a wide-angle null-fill antenna according to the sixth embodiment of the present invention.
Figure 31:
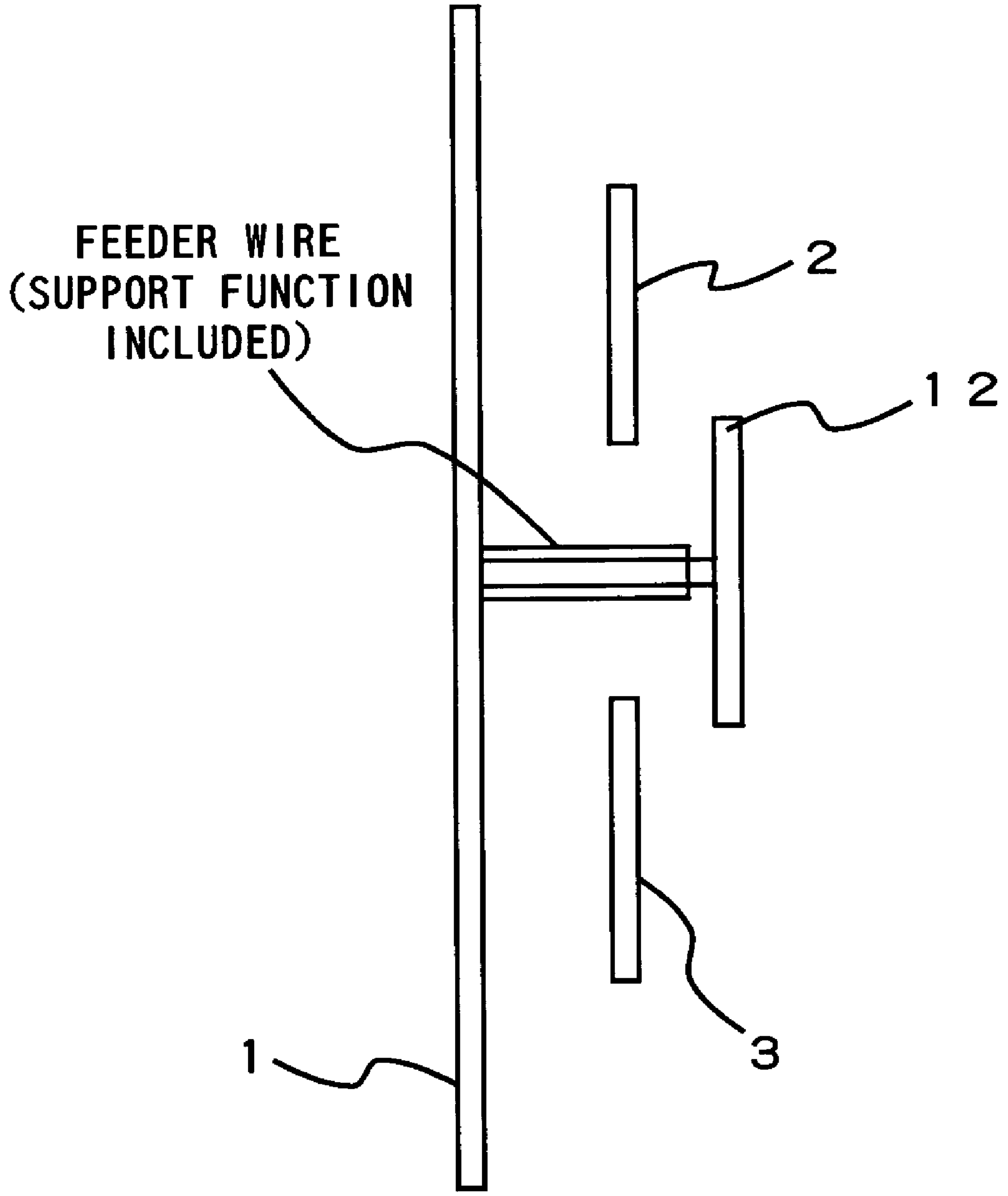
FIG. 31 is a diagram showing the side view of the vicinity of the phase center of the wide-angle null-fill antenna depicted in FIG. 30.

FIG. 30 is a diagram showing the construction of a wide-angle null-fill antenna according to the sixth embodiment of the present invention. FIG. 31 is a diagram showing the enlarged side view of the vicinity of the phase center of the wide-angle null-fill antenna. In FIGS. 21, 28 and 29, a slot antenna or a patch antenna is employed as a center antenna element, a dipole antenna may be used as a center antenna element. Referring to FIG. 30, the wide-angle null-fill antenna comprises a substrate 1 and antenna elements 2 and 3 vertically arrayed at regular intervals on the surface of the substrate 1 as in FIG. 21. The wide-angle null-fill antenna further comprises a dipole antenna 12 at the phase center on the substrate 1. Among the antenna elements 2 and 3, two elements at the center are spaced apart by a distance more than the spacing between other elements to avoid physical interference with the dipole antenna 12. The spacing between the two center antenna elements is 1.2λ (λ: the wavelength of electromagnetic waves radiated therefrom). The other antenna elements are arranged with an equal spacing of 0.7λ as in the first embodiment. The dipole antenna 12 is placed at the center of the 1.2λ spacing: at a position 0.6λ apart from each of the adjacent antenna elements, so that it coincides with the phase center of the antenna elements 2 and 3. Although the spacing between the two center antenna elements may be 1.4λ, a spacing of 1.2λ provides better characteristics.

The dipole antenna 12 is placed on a coaxial feeder wire with support function on the substrate 1.

In this embodiment, the amplitude characteristics differ not more than 3 dB between the antenna elements 2 and 3 and the dipole antenna 12.

Seventh Embodiment

Figure 32:
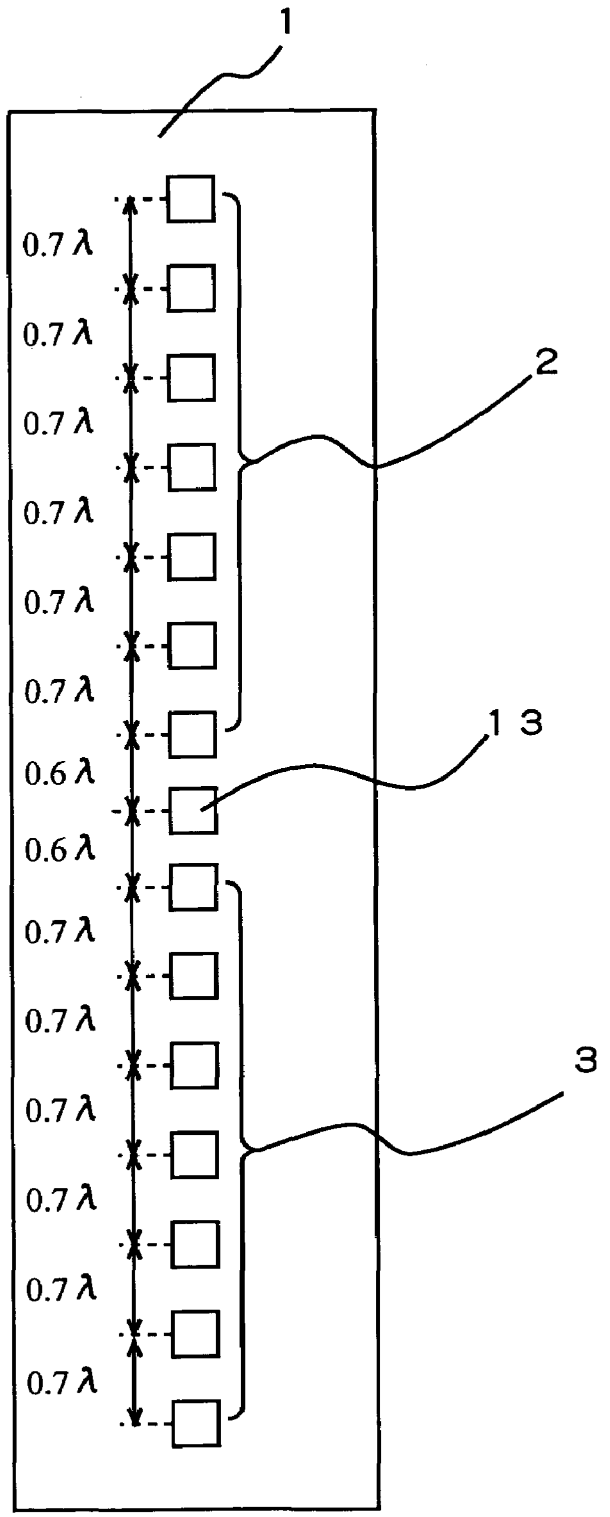
FIG. 32 is a diagram showing the construction of a wide-angle null-fill antenna according to the seventh embodiment of the present invention.
Figure 33:
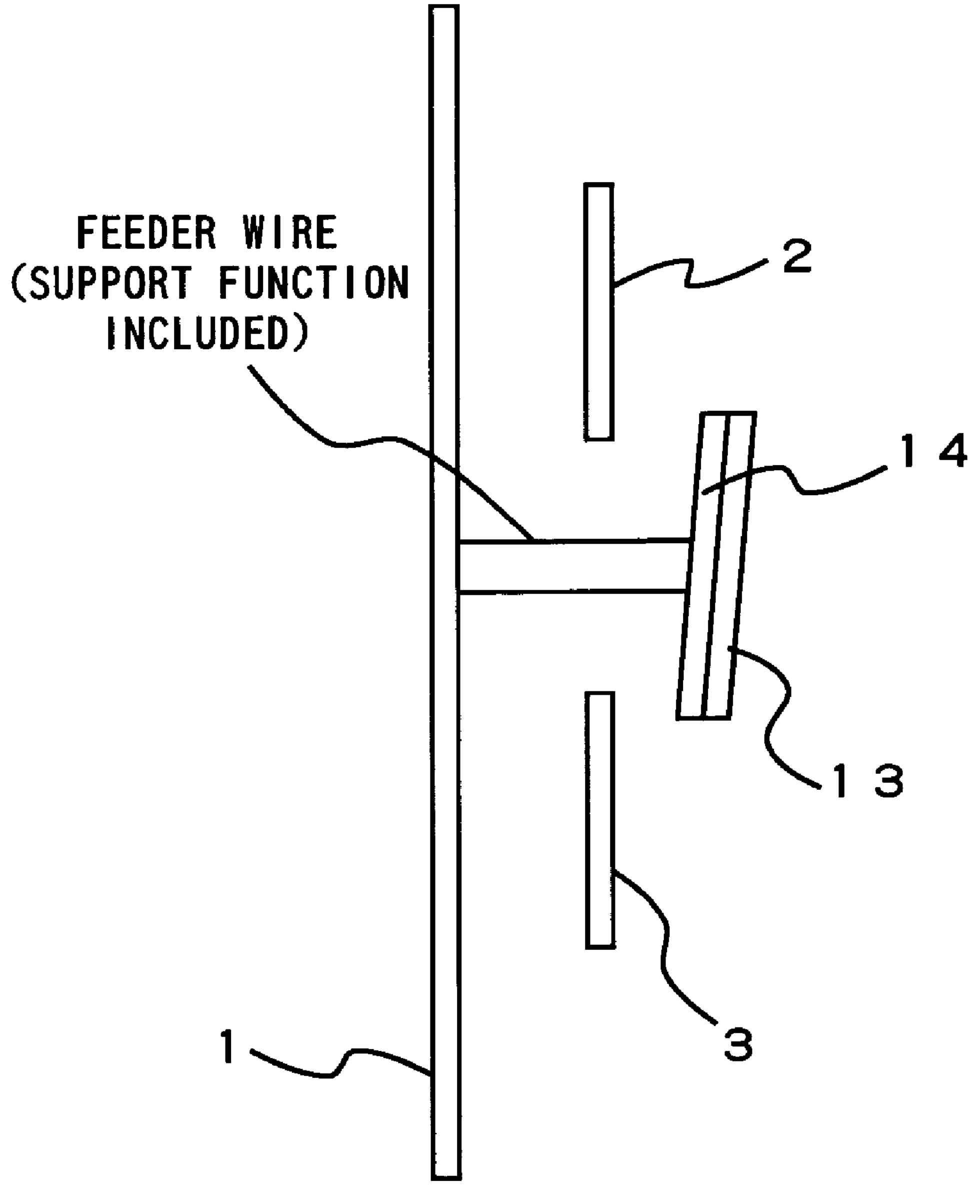
FIG. 33 is a diagram showing the side view of the vicinity of the phase center of the wide-angle null-fill antenna depicted in FIG. 32.

FIG. 32 is a diagram showing the construction of a wide-angle null-fill antenna according to the seventh embodiment of the present invention. FIG. 33 is a diagram showing the enlarged side view of the vicinity of the phase center of the wide-angle null-fill antenna. As can be seen in FIG. 32, the wide-angle null-fill antenna of this embodiment is basically similar in construction and general arrangement to that of the sixth embodiment except with a patch antenna element 13 in place of the dipole antenna 12 at the center.

As in the sixth embodiment described in connection with FIG. 30, among the antenna elements 2 and 3, two elements at the center are spaced apart by a distance more than the spacing between other elements. The spacing between the two center antenna elements is 1.2λ. The other antenna elements are arranged with an equal spacing of 0.7λ.

A coaxial feeder wire with support function is placed on the substrate 1 with a patch panel 14 thereon, and the patch antenna 13 is formed on the patch panel 14.

As shown in FIG. 33, the patch antenna 13 is oriented at an angle (depression angle) with respect to the vertical direction so that the maximum radiation direction of the antenna 13 is directed downward with respect to the horizontal direction.

Figure 34:
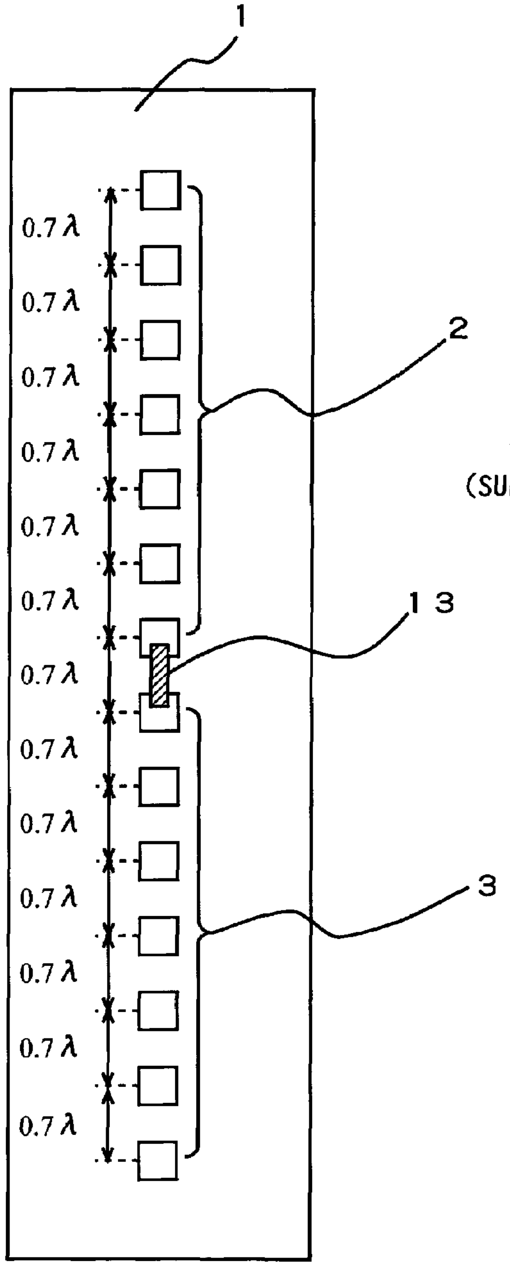
FIG. 34 is a diagram showing the construction of a wide-angle null-fill antenna in which a patch antenna element added to the phase center is tilted at an depression angle, and also, among patch antenna elements in an antenna array, those on both sides of the antenna element added to the phase center are tilted at an depression angle.
Figure 34:
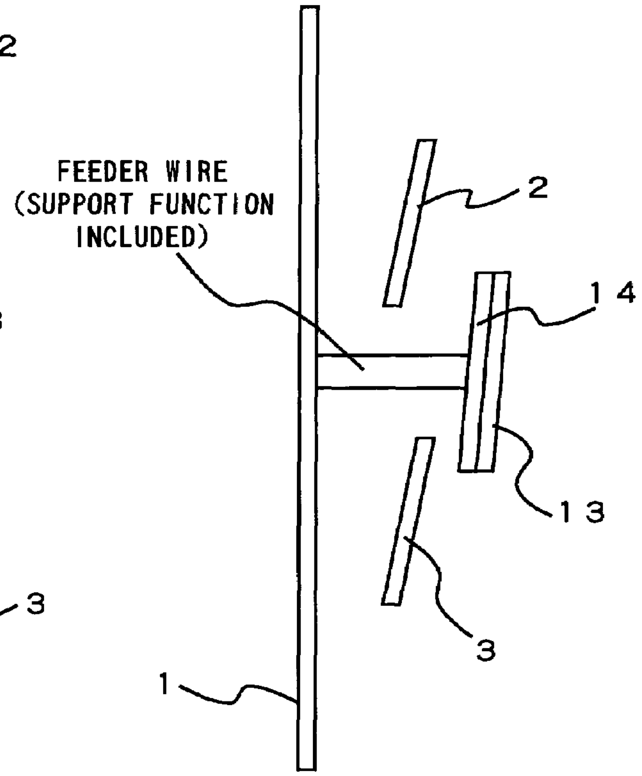

FIG. 34 is a diagram showing the construction of the wide-angle null-fill antenna in which the patch antenna element 13 added to the phase center is tilted at an depression angle, and also, among patch antenna elements 2 and 3, those on both sides of the element 13 are tilted at an depression angle. With this construction, the radiation level is further improved in a depression angle range. The antenna elements 2 and 3 are arranged with an equal spacing of 0.7λ as in the first embodiment. While, in FIG. 34, the patch antenna 13 and the antenna elements adjacent thereto are tilted at the same angle, the tilt angle may be determined according to the required radiation level.

In this embodiment, all the antenna elements 2 and 3 may be tilted at an depression angle. Besides, an antenna array as shown in FIG. 7 may be added to the phase center instead of the patch antenna.

Eighth Embodiment

Figure 35:
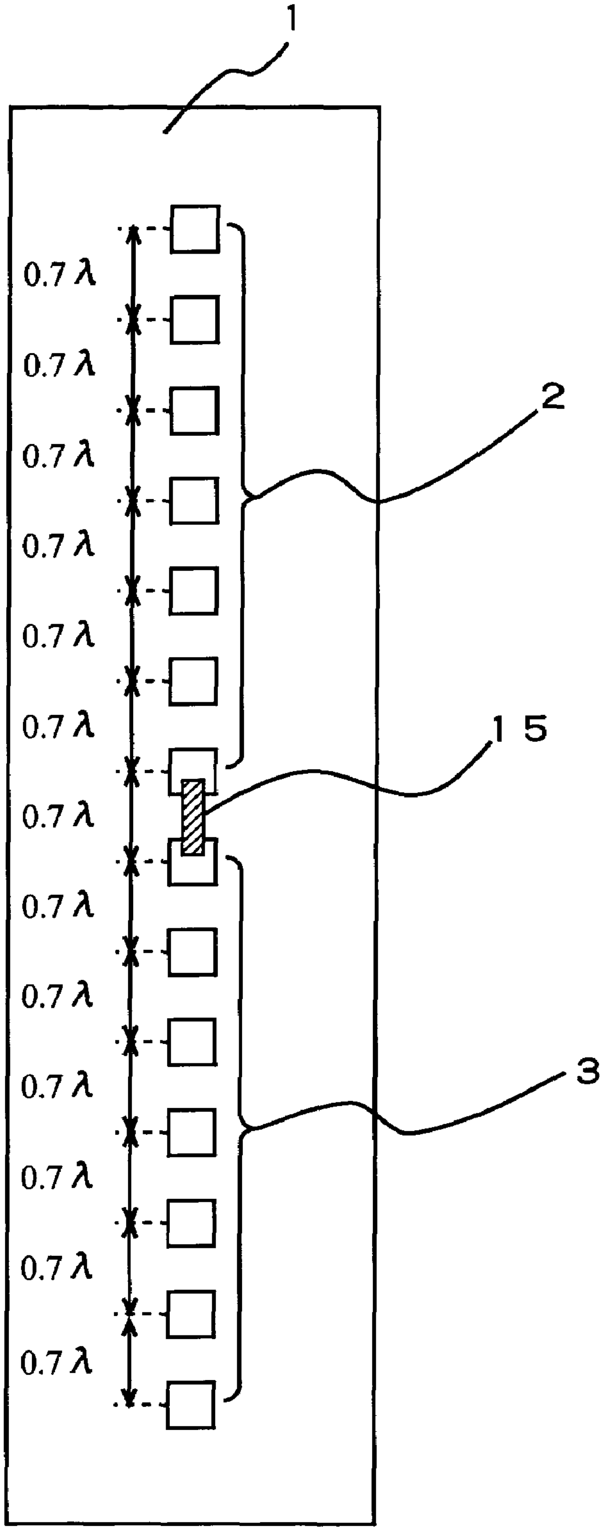
FIG. 35 is a diagram showing the construction of a wide-angle null-fill antenna according to the eighth embodiment of the present invention.
Figure 36:
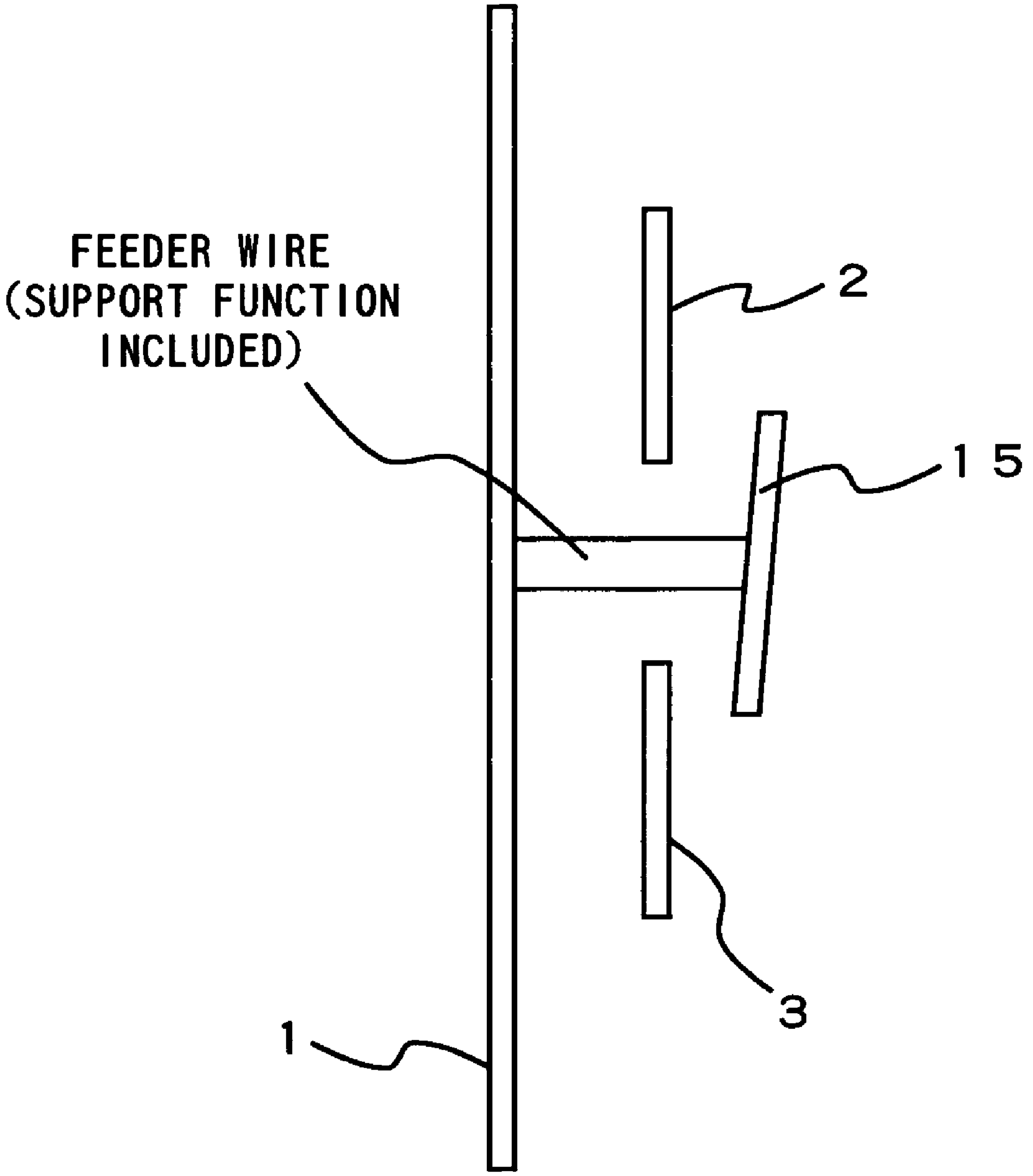
FIG. 36 is a diagram showing the side view of the vicinity of the phase center of the wide-angle null-fill antenna depicted in FIG. 35.

FIG. 35 is a diagram showing the construction of a wide-angle null-fill antenna according to the eighth embodiment of the present invention. FIG. 36 is a diagram showing the enlarged side view of the vicinity of the phase center of the wide-angle null-fill antenna. Referring to FIG. 35, the wide-angle null-fill antenna comprises a substrate 1 and antenna elements 2 and 3 arrayed at regular intervals on the surface of the substrate 1. The wide-angle null-fill antenna further comprises a center antenna element (dipole antenna 15) added to the phase center of the antenna elements 2 and 3. The antenna elements 2 and 3 are arranged with an equal spacing of 0.7λ as in the first embodiment. The center antenna element is extended forward (in the direction in which electromagnetic waves are radiated) to avoid overlap or physical interference with adjacent antenna elements.

With this construction, the antenna elements 2 and 3 can be equally spaced.

Also in this embodiment, as shown in FIG. 36, the center antenna element (dipole antenna 15) is oriented at an angle (depression angle) with respect to the vertical direction so that the maximum radiation direction of the antenna is directed downward with respect to the horizontal direction.

Ninth Embodiment

Figure 37:
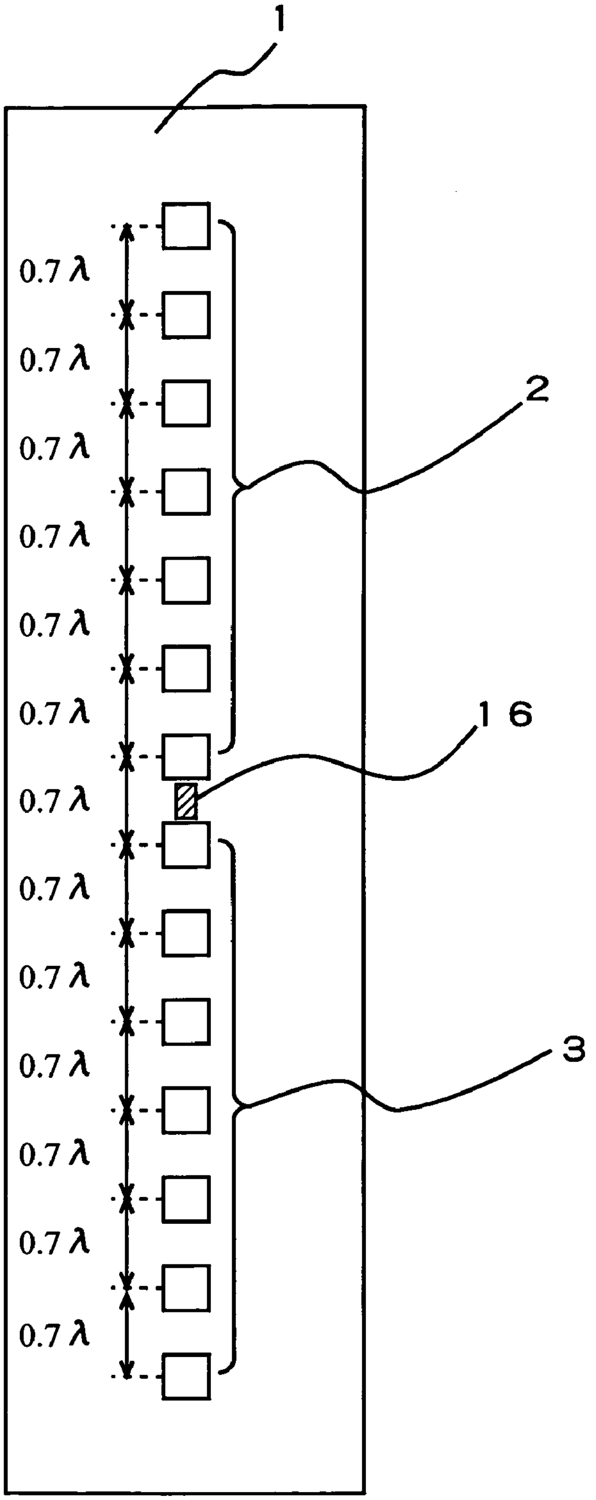
FIG. 37 is a diagram showing the construction of a wide-angle null-fill antenna according to the ninth embodiment of the present invention.
Figure 38:
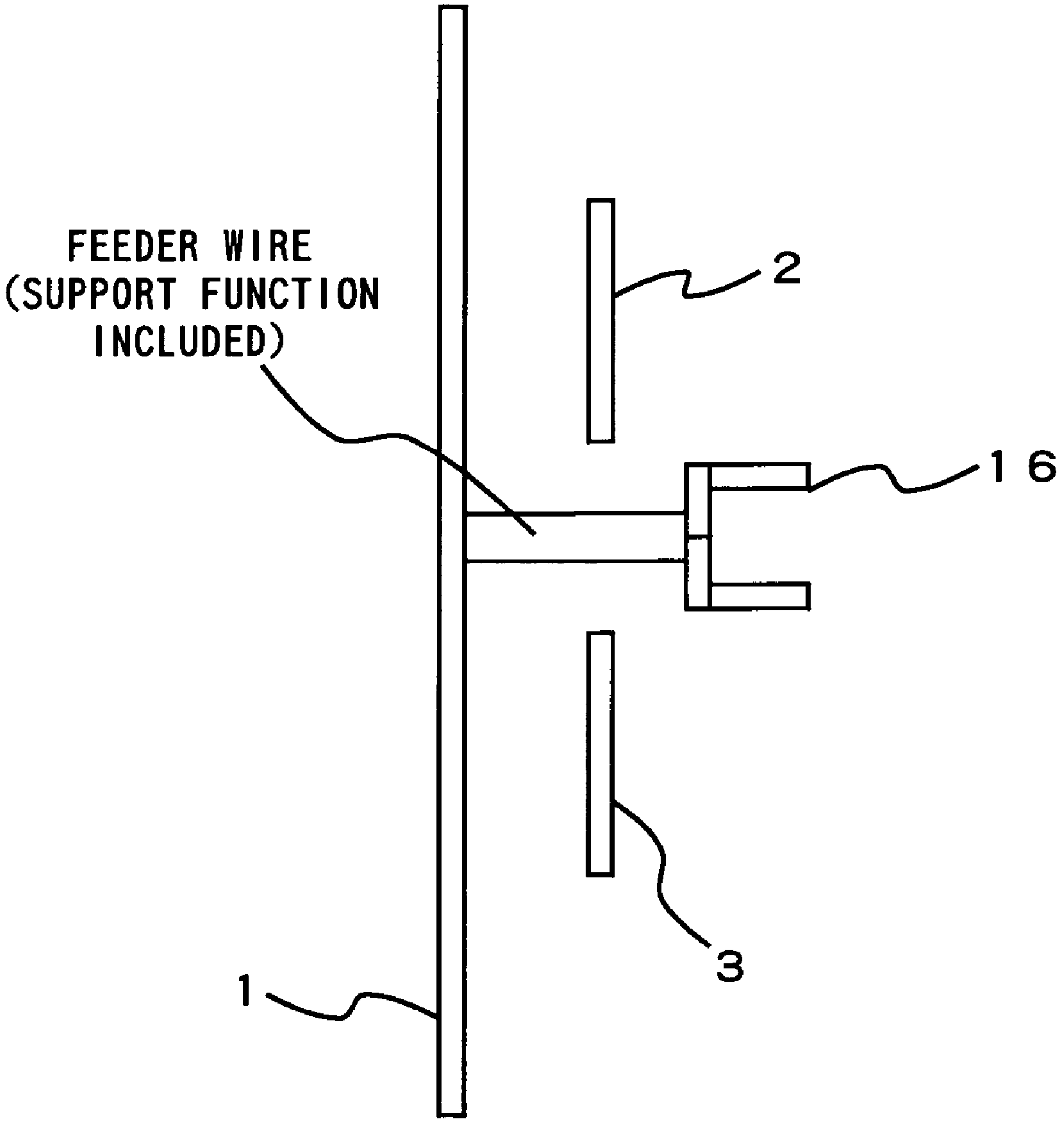
FIG. 38 is a diagram showing the side view of the vicinity of the phase center of the wide-angle null-fill antenna depicted in FIG. 37.

FIG. 37 is a diagram showing the construction of a wide-angle null-fill antenna according to the ninth embodiment of the present invention. FIG. 38 is a diagram showing the enlarged side view of the vicinity of the phase center of the wide-angle null-fill antenna. As can be seen in FIG. 37, the wide-angle null-fill antenna of this embodiment is basically similar in construction and general arrangement to that of the eighth embodiment except that a U-shaped dipole antenna 16 is employed as a center antenna element. The U-shaped dipole antenna 16 has a length of half-wavelength: λ/2. The U-shaped dipole antenna 16 is vertically shorter than I-shaped dipole antenna, thus avoiding physical interference with adjacent antenna elements.

The U-shaped part (head) of an antenna in practical use is obtained, for example, by winding a wire around a ceramic cylinder to form a spiral coil and putting a plastic cover thereon. Such an antenna is applicable to the wide-angle null-fill antenna of this embodiment.

In addition to the U-shaped dipole antenna, examples of the center antenna element include a V-shaped dipole antenna, an infinitesimal dipole element with a length of not more than quarter-wavelength (λ/4), and a current element.

In this embodiment, a beam is tilted downward, and also the excitation amplitude of the center antenna element is set higher than that of adjacent elements. Thus, the wide-angle null-fill antenna can effectively radiate or focus a beam to a spot at the foot of the antenna when set on the top of a high-rise building in an urban area.

Figure 39:
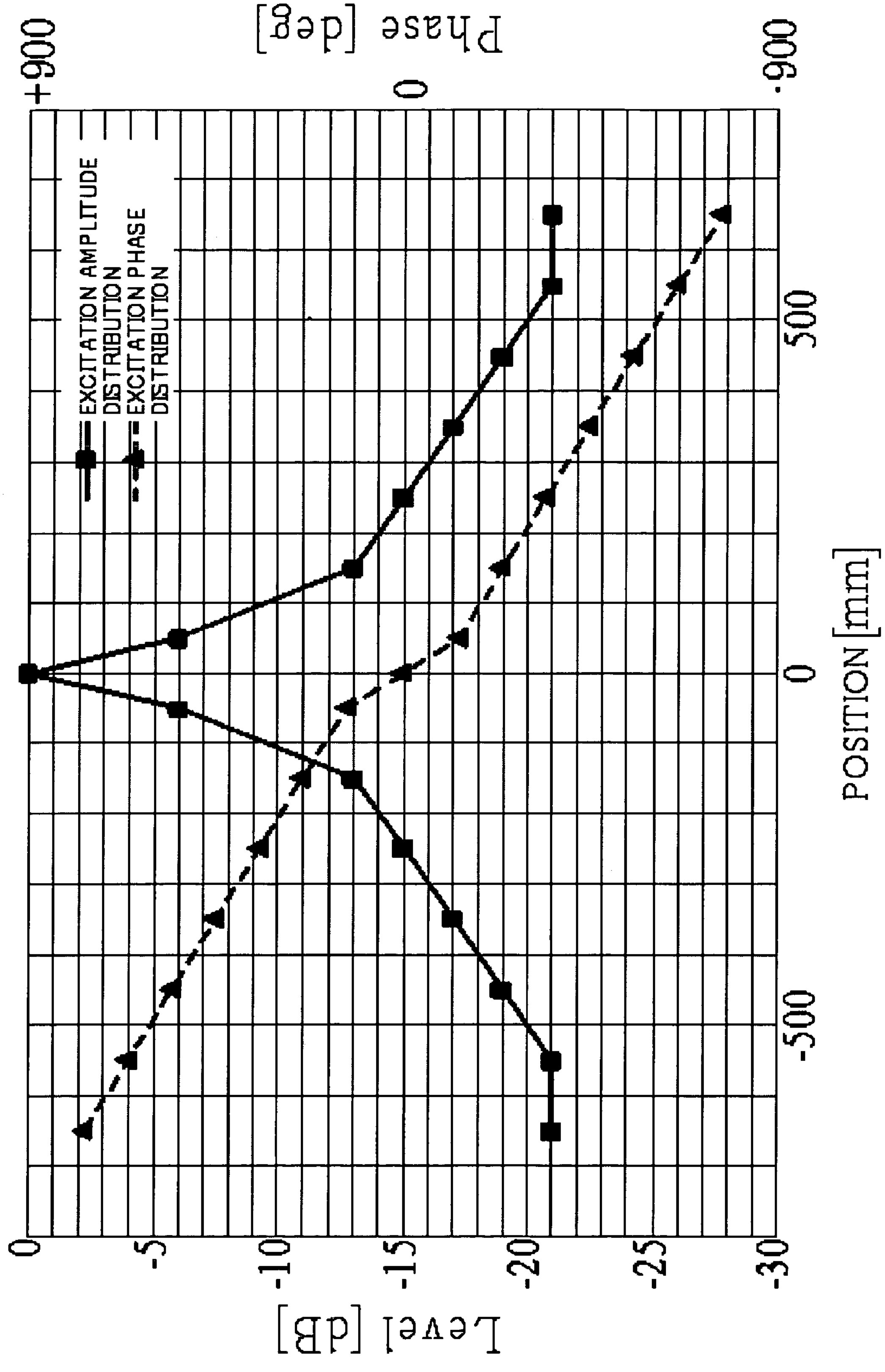
FIG. 39 is a diagram showing excitation amplitude and excitation phase distributions when the beam peak is set at a depression angle of 30 degrees.

It will be assumed that the beam peak is set at a depression angle of 30 degrees. FIG. 39 is a diagram showing excitation amplitude and excitation phase distributions when the beam peak is set at a depression angle of 30 degrees. In FIG. 39, the horizontal axis indicates positions, plus values for the nadir direction and minus values for the zenith direction with the phase center of the antenna elements 2 and 3 as the origin. The solid line indicates the excitation amplitude distribution, while the dotted line indicates the excitation phase distribution. The excitation amplitude distribution has bilateral symmetry with respect to the origin (i.e., the excitation amplitude distribution is symmetrical above and below the antenna). The excitation phase distribution has point symmetry with respect to the origin.

In the antenna elements 2 and 3, an element more distant from the phase center is provided with the larger phase advance or phase delay value to incline the phase distribution curve.

In this embodiment, the incline of the phase distribution curve is set steeper as compared to the case of the first embodiment (FIG. 16) or the third embodiment (FIG. 24) to increase the beam tilt angle to 30 degrees. The excitation amplitude of an antenna element added to the phase center is set to be about 6 dB higher than that of adjacent elements.

Figure 40:
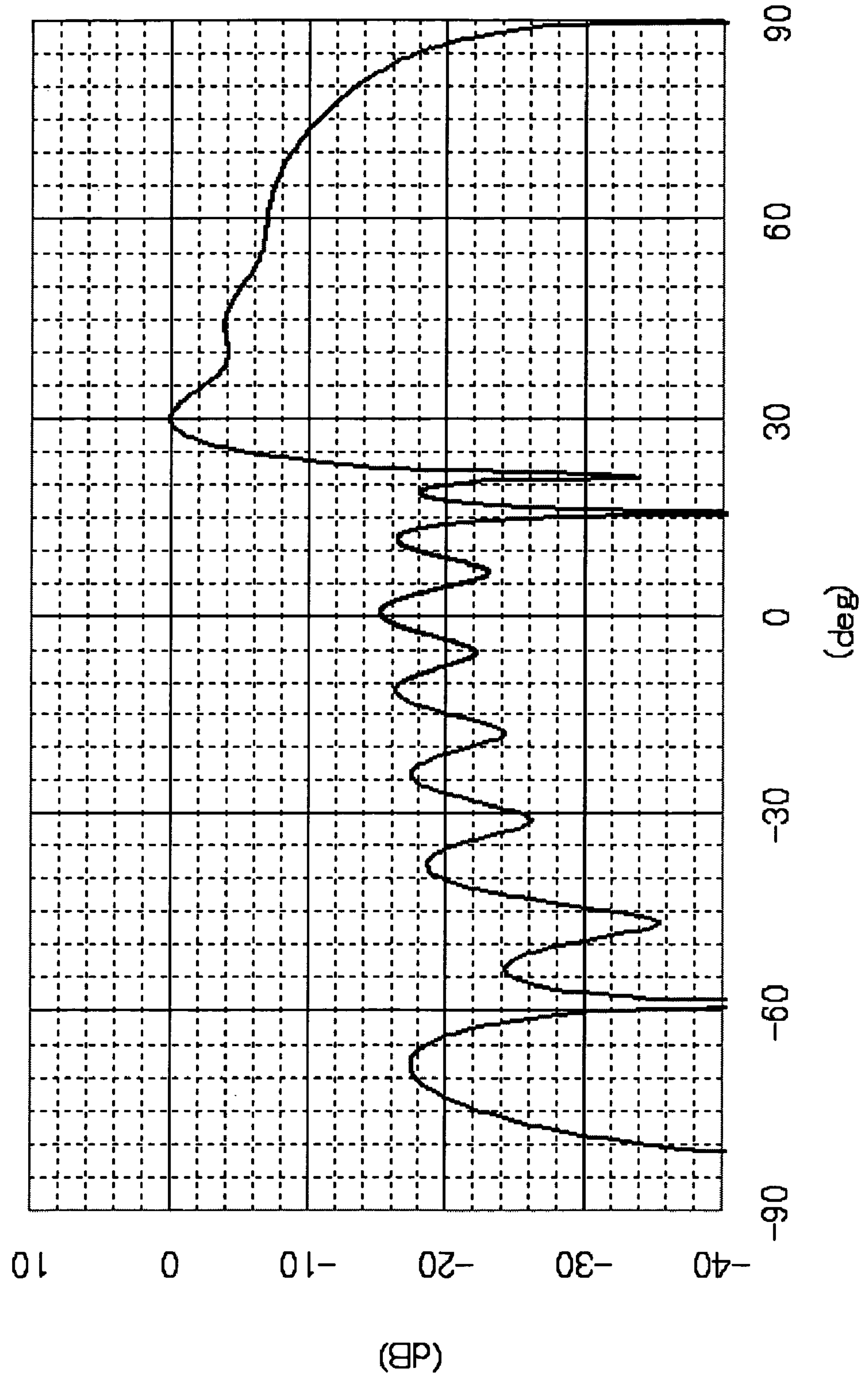
FIG. 40 is a diagram showing the radiation pattern when the beam peak is at a depression angle of 30 degrees.

FIG. 40 is a diagram showing the radiation pattern obtained from the excitation amplitude distribution shown in FIG. 39. The beam peak is at a depression angle of 30 degrees, and the sidelobe level is suppressed in a range (a depression angle range of 0 to 30 degrees) where there is a problem of overreach to adjacent areas.

Figure 41:
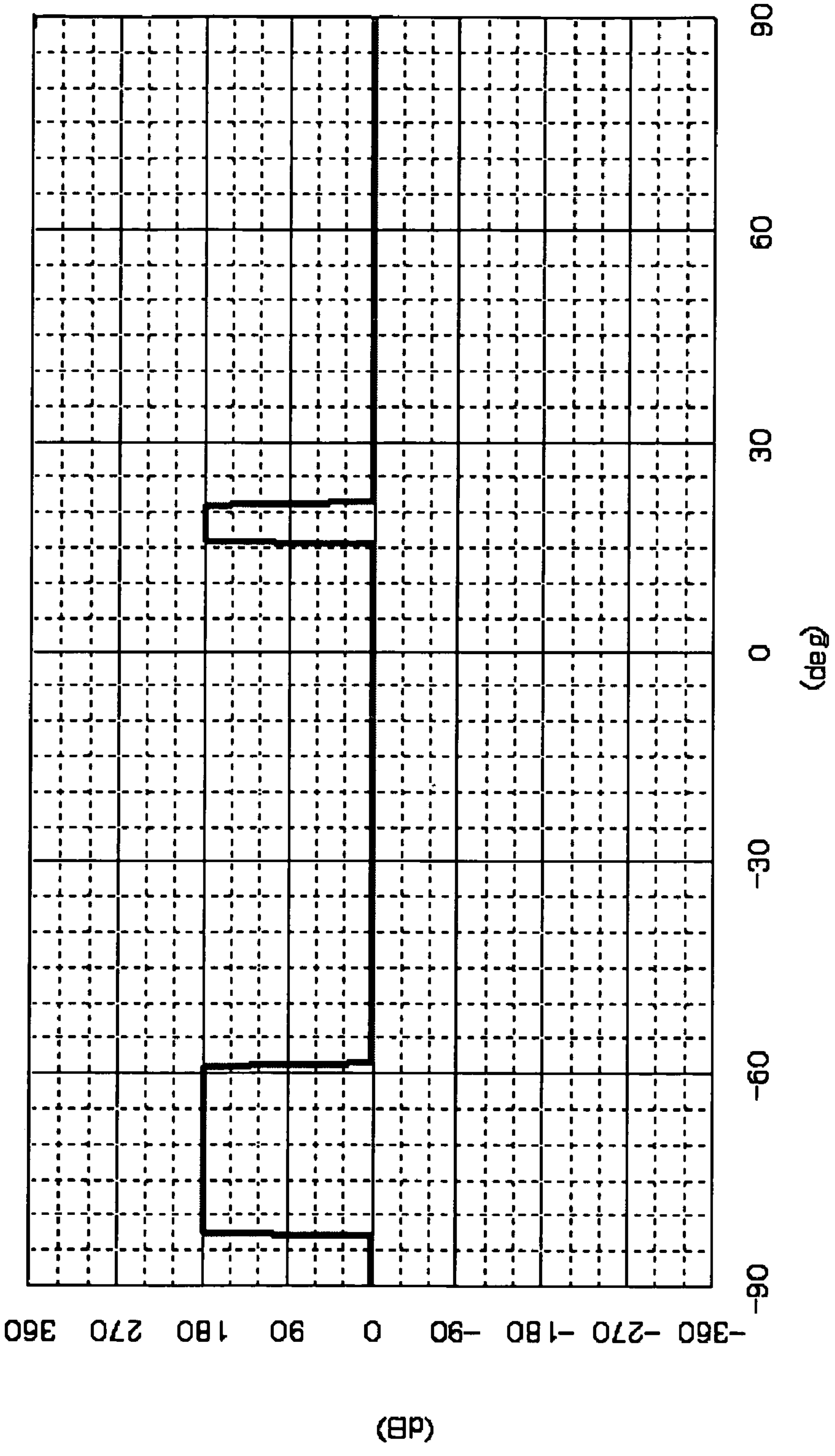
FIG. 41 is a diagram showing radiation characteristics in a remote area.

FIG. 41 is a diagram showing radiation characteristics in a remote area. As shown in FIG. 37, the phase in a depression angle range of 15 to 20 degrees is opposite to that in the desired radiation area (a depression angle range of 30 to 90 degrees).

In order to reduce overreach to adjacent areas, it is necessary to suppress the sidelobe in a depression angle range of 15 to 20 degrees. The sidelobe can be reduced by adjusting the amplitude of the center antenna element, the phase of which is the same as that in the desired radiation area.

The phase of the center antenna element is uniform in the entire desired radiation area. Consequently, a change in the level of the center antenna element has little effect on the radiation pattern in the radiation area, and consideration is required only for the sidelobe in a depression angle range of 15 to 20 degrees. It is optimal that the center antenna element is provided with an amplitude of about +6 dB with respect to adjacent elements.

Figure 42:
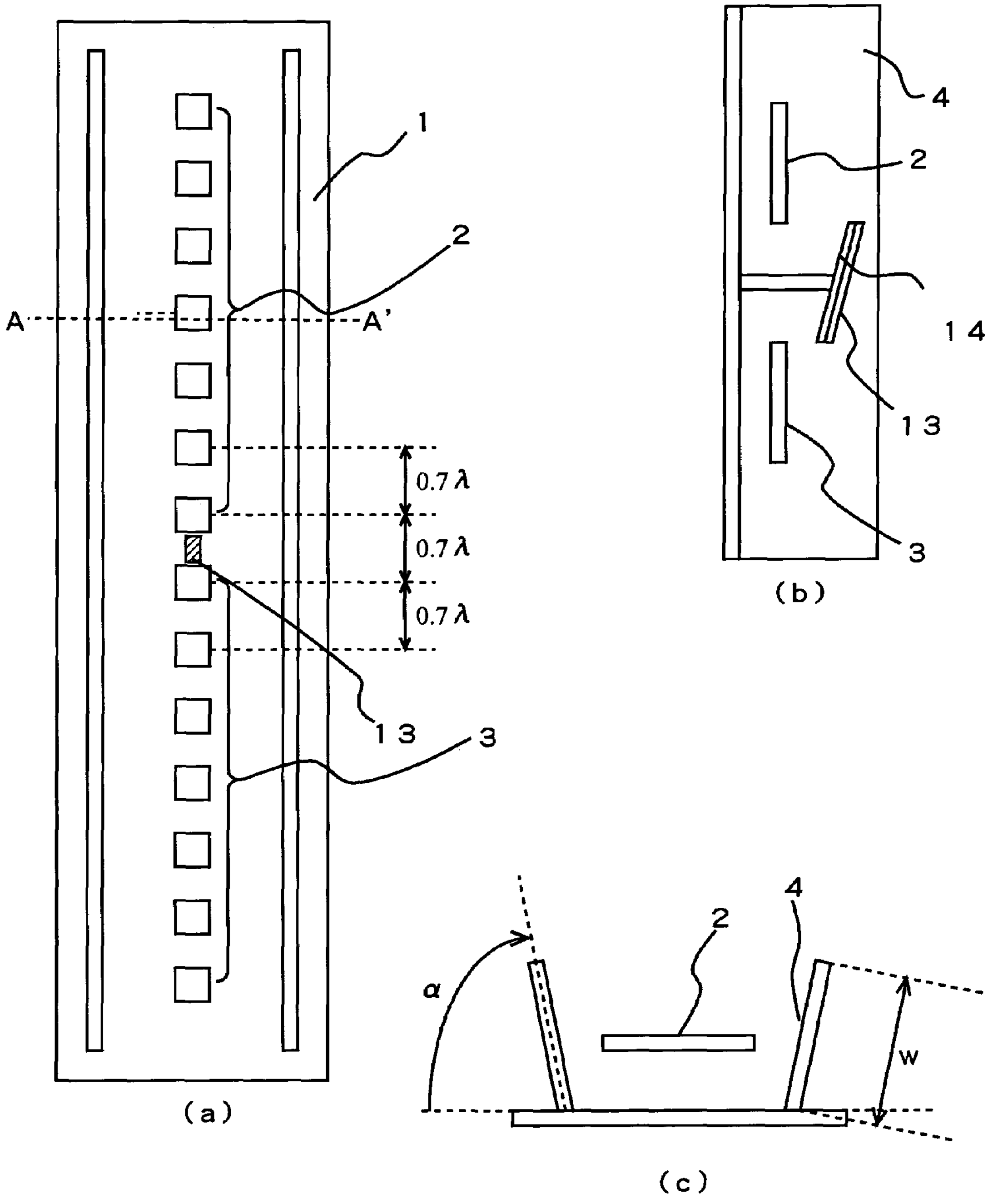
FIG. 42 is a diagram showing the construction of a wide-angle null-fill antenna which is provided with metal flare plates on both sides of antenna elements to form a beam in the horizontal plane.

FIG. 42 is a diagram showing the construction of a wide-angle null-fill antenna which is provided with metal flare plates on both sides of antenna elements to form a beam in the horizontal plane (i.e. to narrow down the beamwidth in a sector form). In this construction, main parameters for forming a horizontal beam represent the angle α at which metal flares 4 are arranged and the width W of the flares 4. Consequently, beamforming in the horizontal plane can be performed independently of beamforming for null-fill in the vertical plane.

Figure 43:
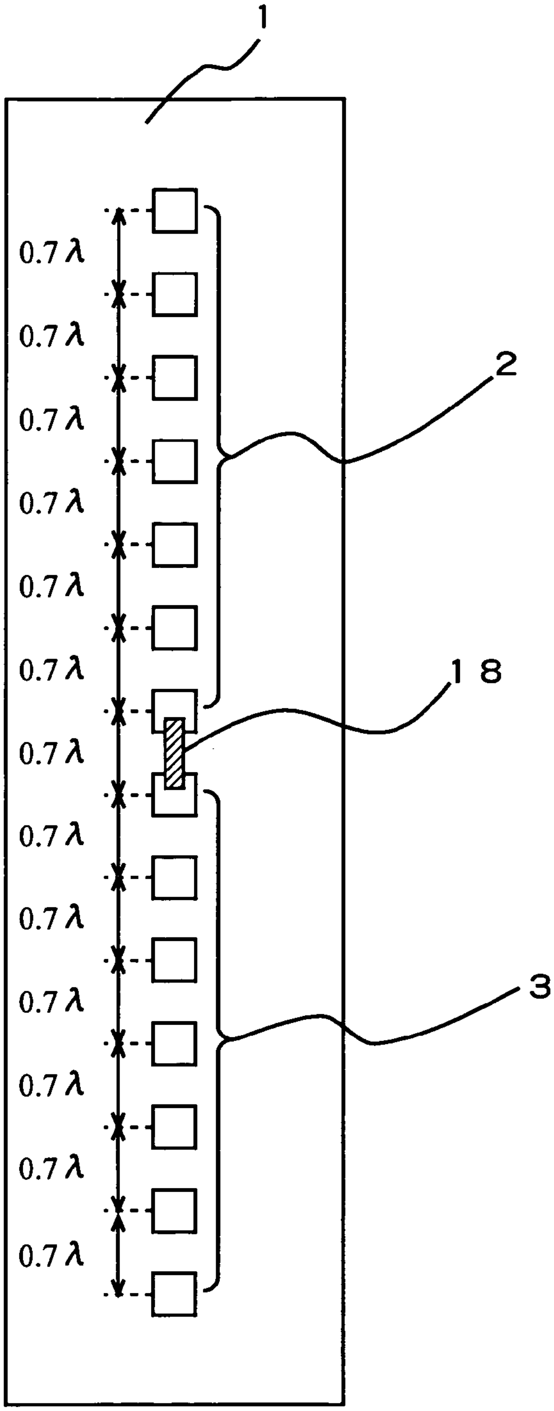
FIG. 43 is a diagram showing the construction of a wide-angle null-fill antenna in which a parasitic V-shaped dipole element is used as an antenna element added to the phase center and excited not directly but indirectly via air by radiation waves from an antenna array.
Figure 43:
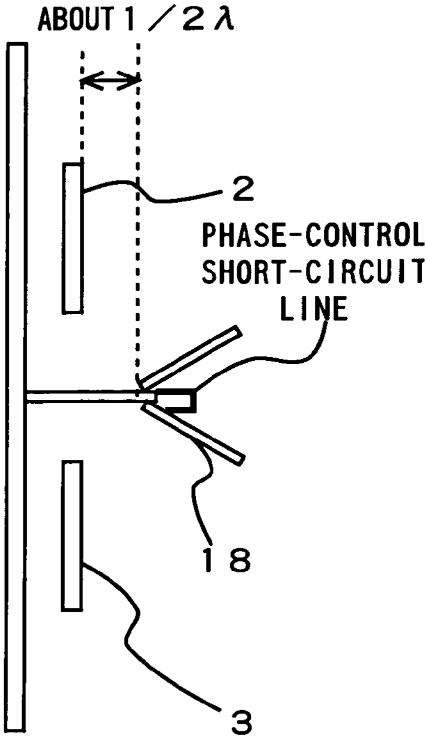

FIG. 43 is a diagram showing the construction of a wide-angle null-fill antenna in which a parasitic V-shaped dipole element is used as an antenna element added to the phase center and excited not directly but indirectly via air by radiation waves from an antenna array. As can be seen in FIG. 43, a parasitic V-shaped dipole element 18 is placed about half-wavelength forwardly of the antenna elements 2 and 3 so that the phase of radiation waves indirectly excited is to be substantially coincident with that of the phase center of the elements 2 and 3. The parasitic V-shaped dipole element 18 is provided with a phase-control short-circuit line for fine control. With this construction, the divider/combiner circuit can be simplified, which reduces the losses.

Tenth Embodiment

Figure 44:
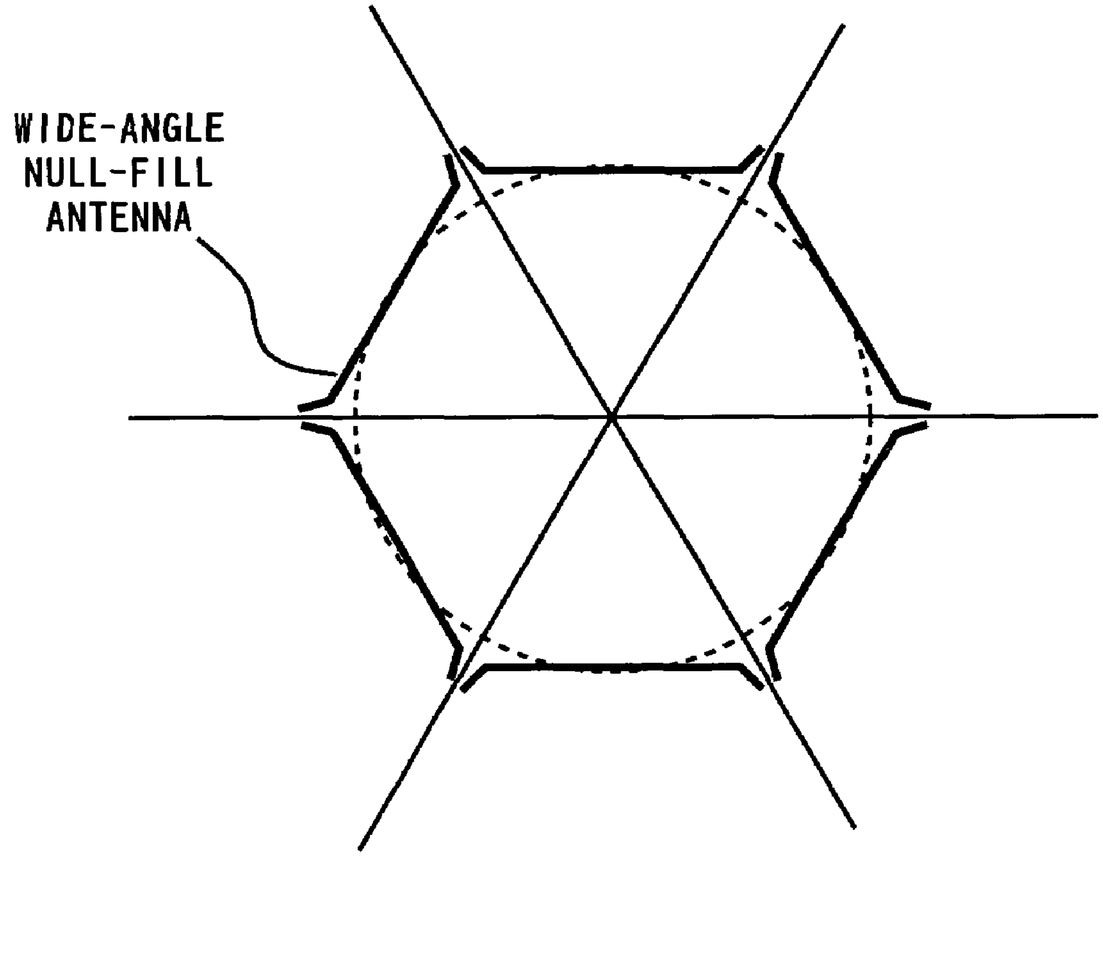
FIG. 44 is a diagram showing the construction of an omni antenna according to the tenth embodiment of the present invention.

FIG. 44 is a diagram showing the construction of an omni antenna according to the tenth embodiment of the present invention. Referring to FIG. 44, the omni antenna comprises the six wide-angle null-fill antennas of the first embodiment arranged in a concentric circle.

As shown in FIG. 8, the antenna array 5 of the wide-angle null-fill antenna of the first embodiment has the phase characteristics showing bilateral symmetry in the horizontal plane (e.g., at angles of both plus and minus 30 degrees, the phase of the radiation pattern is at −24 degrees). Therefore, if the wide-angle null-fill antennas are arranged in a concentric circle, a beam from one antenna does not interfere with beams from adjacent antennas.

Incidentally, in the tenth embodiment, while the omni antenna comprises the wide-angle null-fill antennas of the first embodiment arranged in a concentric circle, the wide-angle null-fill antennas of the second to ninth embodiments may be used in the same manner.

Eleventh Embodiment

Figure 45:
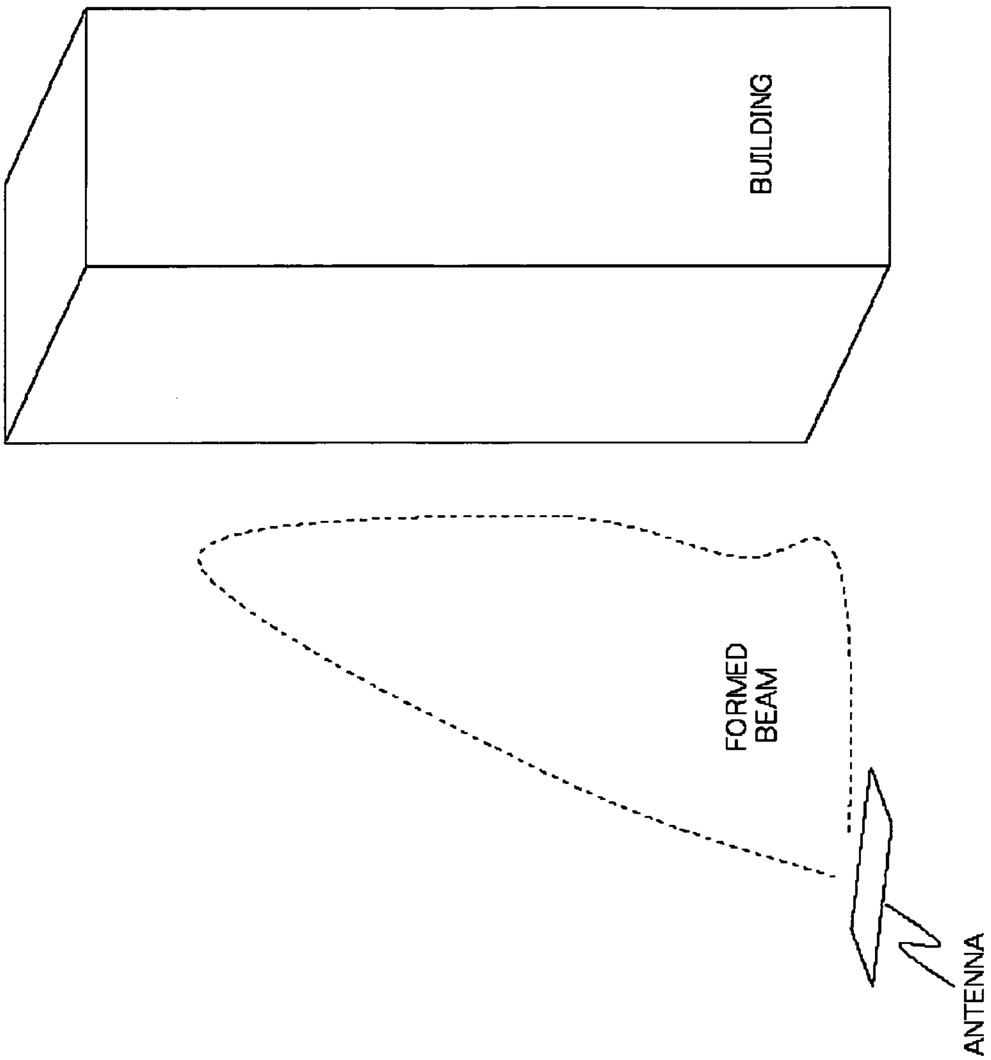
FIG. 45 is a diagram showing the construction of base station equipment according to the eleventh embodiment of the present invention.

FIG. 45 is a diagram showing the construction of base station equipment according to the eleventh embodiment of the present invention. In the base station equipment, an antenna is placed on the ground. The antenna has the same construction as that of the wide-angle null-fill antenna of the first embodiment. The antenna is set in a tilted position at a prescribed angle with respect to the vertical direction so that the side which is oriented in the nadir direction in the first embodiment is set toward a building.

In recent years, there has been a problem that an insensitive area or a blind zone is formed in the upper stories of a high-rise building. The base station equipment of this embodiment radiates electromagnetic waves toward a building from the antenna placed on the ground. Thereby, the coverage area of the base station equipment includes the lower to upper floors of the building.

While, in the eleventh embodiment, the wide-angle null-fill antenna of the first embodiment is employed, the wide-angle null-fill antennas of the second to ninth embodiments may be used with the same advantages.

Twelfth Embodiment

Figure 46:
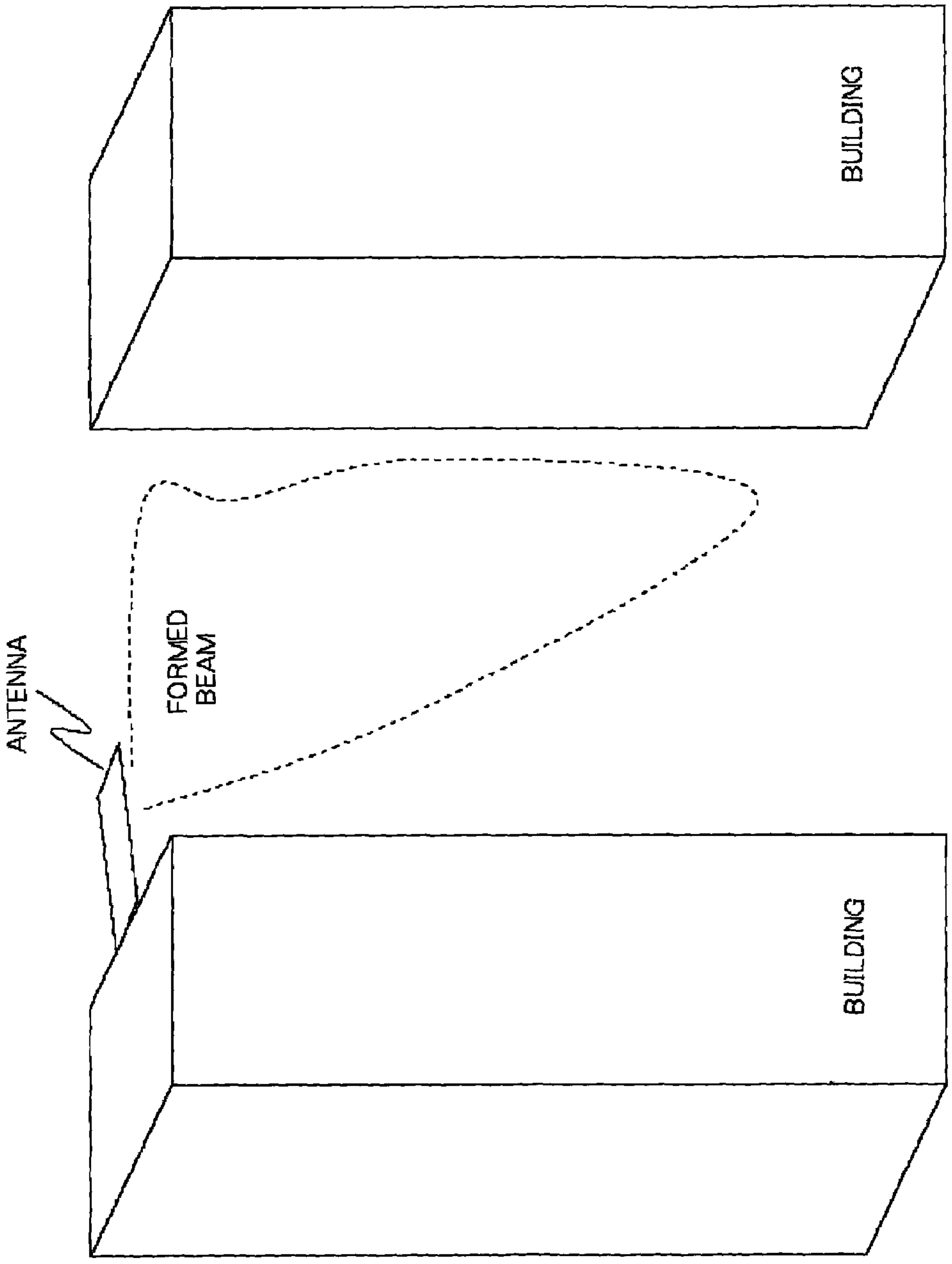
FIG. 46 is a diagram showing the construction of base station equipment according to the twelfth embodiment of the present invention.

FIG. 46 is a diagram showing the construction of base station equipment according to the twelfth embodiment of the present invention. The base station equipment of this embodiment is provided with the wide-angle null-fill antenna of the first embodiment. In the base station equipment, differently from in the conventional one, the wide-angle null-fill antenna is set with its surface in the vertical plane so that the side which is oriented in the nadir direction in the first embodiment is set toward a building.

The base station equipment of this embodiment radiates electromagnetic waves downwardly toward an adjacent building. Thereby, the coverage area of the base station equipment includes the lower to upper floors of the building.

While, in the twelfth embodiment, the wide-angle null-fill antenna of the first embodiment is employed, the wide-angle null-fill antennas of the second to ninth embodiments may be used with the same advantages.

Incidentally, the embodiments described above are susceptible to various modifications, changes and adaptations.

For example, in the sixth and seventh embodiments, among the antenna elements 2 and 3, only two elements at the center are spaced apart by a distance different than that between other elements. However, the other antenna elements are not necessarily spaced equally. In the sixth embodiment, for example, the dipole antenna 12 is spaced 0.6λ apart from each of the adjacent antenna elements. The spacing between two adjacent antenna elements may be gradually (e.g., by the same degree) increased towards the outside, as the distance from the phase center increases, so that the spacing between two adjacent elements most distant from the phase center is to be 0.7λ.

In the sixth and ninth embodiments, the construction of the wide-angle null-fill antenna, in which the center antenna element is oriented at an angle (depression angle) with respect to the vertical direction, is not shown in the drawings. However, if the center antenna element is oriented at an angle (depression angle) with respect to the vertical direction as in the seventh or eighth embodiment, the direction of the maximum radiation of electromagnetic waves can be directed downward with respect to the horizontal direction. The same is true in the case where the antenna elements are not equally spaced.

In the third to ninth embodiments, if the center antenna element is provided with an electromagnetic wave absorber around it with the supporting portion of the element as the center, it is possible to reduce the frequency characteristics of the beamwidth in the horizontal plane. Besides, if the electromagnetic wave absorber is extended to adjacent antenna elements (i.e., if the electromagnetic wave absorber is set around the center antenna element and also extended in the horizontal direction), it is possible to reduce the frequency characteristics of the beamwidth in the horizontal plane as well as to increase the electric field level on the ground.

In the above embodiments, a cosecant squared beam antenna includes an array of 14 antenna elements, and one or more antenna elements are added to the vicinity of the phase center of the antenna, which are equivalent to an antenna element added to the phase center. However, the number of antenna elements is cited merely by way of example and without limitation. The cosecant squared beam antenna may include more than or less than 14 antenna elements.

Further, in the tenth embodiment, the omni antenna includes six sector antennas with the same characteristics arranged in a concentric circle. However, the number of sector antennas is given only as an example and without limitation. The omni antenna may include more than or less than six sector antennas. For example, the omni antenna may comprise four wide-angle null-fill antennas each having an antenna array whose array factor is flat in a range of ±45 degrees. Or, the omni antenna may comprise eight wide-angle null-fill antennas each having an antenna array whose array factor is flat in a range of ±20 degrees.

Still further, the cosecant squared beam includes a modified cosecant squared beam. Besides, the present invention is applicable not only to base station equipment for mobile communication but also to other radio communication equipment.

Still further, in the above embodiments, the physical center of the antenna elements 2 and 3 is coincident with the phase center. However, in the example of FIG. 7, if an antenna element with a weak amplitude is added to the vicinity of the antenna elements 2, although the phase center hardly moves, the physical center is displaced, resulting in no coincidence between them. In such a case, an antenna array, a slot antenna, a dipole antenna, a U-shaped (V-shaped) dipole antenna, or the like may also be added to the phase center. When a parasitic element is employed, the element may be spaced a prescribed distance apart from the phase center.

As set forth hereinabove, in accordance with the present invention, there can be provided a wide-angle null-fill antenna permitting little decrease in reception or input level at the foot of the antenna, an omni antenna using the same, and radio communication equipment.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A null-fill antenna comprising:

a first antenna array including antenna elements arranged with a prescribed point as the center; and a second antenna array with an excitation amplitude substantially equal to or less than that of the antenna elements forming the first antenna array; wherein:

the first antenna array is excited so that the excitation amplitude distribution is to have symmetry with respect to the prescribed point, while the excitation phase distribution is to have substantially point symmetry with respect to the prescribed point; and the phase center of the first antenna array is substantially coincident with that of the second antenna array, wherein the antenna elements forming the second antenna array are arranged in a line with the phase center as the center to intersect the first antenna array as the axis of symmetry at right angles.

2. The null-fill antenna claimed in claim 1, wherein the excitation amplitude of the second antenna array is substantially equal to or less than that of the antenna elements adjacent to the phase center among those forming the first antenna array.

3. The null-fill antenna claimed in claim 1, wherein the prescribed point is the phase center of the first antenna array.

4. The null-fill antenna claimed in claim 1, wherein the second antenna array includes at least two antenna elements, and the antenna element closer to the phase center is provided with larger excitation amplitude.

5. The null-fill antenna claimed in claim 1, wherein the antenna elements forming the second antenna array are arranged not to overlap the phase center of the first antenna array.

6. The null-fill antenna claimed in claim 1, wherein dipole antennas are used as the antenna elements forming the second antenna array.

7. The null-fill antenna claimed in claim 1, wherein the second antenna array is provided with an electromagnetic wave absorber around it.

8. The null-fill antenna claimed in claim 7, wherein the electromagnetic wave absorber is arranged along the direction of arrangement of the antenna elements forming the first antenna array with each of the antenna elements forming the second antenna array as the center.

9. The null-fill antenna claimed in claim 8, wherein the electromagnetic wave absorber has a length, in the direction of arrangement of the antenna elements forming the first antenna array, longer than the spacings between the phase center and antenna elements adjacent thereto among those forming the first antenna array.

10. The null-fill antenna claimed in claim 1, wherein the antenna elements forming the second antenna array are arranged so that the maximum radiation direction of the second antenna array is tilted along the direction of arrangement of the antenna elements forming the first antenna array.

11. The null-fill antenna claimed in claim 1, wherein, among the antenna elements forming the first antenna array, antenna elements closest to the phase center are spaced apart by a distance more than the spacing between other antenna elements of the first antenna array.

12. The null-fill antenna claimed in claim 1, wherein the antenna elements forming the first antenna array are arranged with unequal spacing.

13. The null-fill antenna claimed in claim 1, wherein, when one of the antenna elements forming the first antenna array is placed at the phase center of the first antenna array, the phase difference between electromagnetic waves radiated from the antenna element and the second antenna array is within ±60 degrees.

14. The null-fill antenna claimed in claim 1, wherein the second antenna array has directivity along the direction of arrangement of the antenna elements forming the first antenna array.

15. The null-fill antenna claimed in claim 1, wherein the maximum radiation direction of the first antenna array is tilted along the direction of arrangement of the antenna elements forming the first antenna array.

16. The null-fill antenna claimed in claim 15, wherein the maximum radiation direction of at least antenna elements in the vicinity of the center among those forming the first antenna array are tilted along the direction of arrangement of the antenna elements, in the maximum radiation direction of the first antenna array.

17. The null-fill antenna claimed in claim 1, wherein a substrate, on which the first antenna array is formed, is provided with flares on both sides thereof in the direction of arrangement of the antenna elements forming the first antenna array.

18. The null-fill antenna claimed in claim 1, wherein the null-fill antenna is a wide-angle null-fill antenna.

19. The null-fill antenna claimed in claim 1, wherein the first antenna array has cosecant squared pattern directivity in the direction of arrangement of the antenna elements.

20. The null fill antenna claimed in claim 1, wherein the null fill antenna is provided in radio communication equipment.

21. The null fill antenna claimed in claim 20, wherein the null-fill antenna is placed in a high position so that the first antenna array is in the vertical direction.

22. The null fill antenna claimed in claim 20, wherein the null-fill antenna is placed in a high position so that a substrate, on which the first antenna array is formed, is substantially horizontal, and electromagnetic waves are radiated in the nadir direction.

23. The null fill antenna claimed in claim 20, wherein the null-fill antenna is placed in a low position so that a substrate, on which the first antenna array is formed, is tilted at a prescribed angle with respect to the horizontal plane.

24. The null fill antenna claimed in claim 20, wherein the radio communication equipment is base station equipment.

* * * * *